United States Patent
Nakagawa et al.

(10) Patent No.: US 9,204,154 B2
(45) Date of Patent: Dec. 1, 2015

(54) IMAGE ENCODING DEVICE AND IMAGE DECODING DEVICE

(75) Inventors: Akira Nakagawa, Sagamihara (JP);
Kimihiko Kazui, Kawasaki (JP);
Hidenobu Miyoshi, Kawasaki (JP);
Junpei Koyama, Shibuya (JP)

(73) Assignee: FUJITSU LIMITED, Kawasaki (JP)

( * ) Notice: Subject to any disclaimer, the term of this patent is extended or adjusted under 35 U.S.C. 154(b) by 680 days.

(21) Appl. No.: 13/570,566

(22) Filed: Aug. 9, 2012

(65) Prior Publication Data

US 2013/0044808 A1    Feb. 21, 2013

Related U.S. Application Data

(63) Continuation of application No. PCT/JP2010/000888, filed on Feb. 12, 2010.

(51) Int. Cl.
| | |
|---|---|
| *H04N 19/167* | (2014.01) |
| *H04N 19/105* | (2014.01) |
| *H04N 19/13* | (2014.01) |
| *H04N 19/182* | (2014.01) |
| *H04N 19/593* | (2014.01) |

(52) U.S. Cl.
CPC ......... *H04N 19/167* (2013.01); *H04N 19/105* (2013.01); *H04N 19/13* (2013.01); *H04N 19/182* (2013.01); *H04N 19/593* (2013.01)

(58) Field of Classification Search
CPC .................................................... H04N 19/167
See application file for complete search history.

(56) References Cited

U.S. PATENT DOCUMENTS

| | | | |
|---|---|---|---|
| 2,632,058 A | 11/1947 | Gray | |
| 2007/0086516 A1* | 4/2007 | Lee et al. | 375/240.1 |

FOREIGN PATENT DOCUMENTS

| | | |
|---|---|---|
| JP | 2001-16588 | 1/2001 |
| JP | 2001-016588 | 1/2001 |
| JP | 2002-344323 | 11/2002 |

OTHER PUBLICATIONS

Hiroshi Kondo, Keiko Yamahara and Jun Liao, "Identification of DCT signs for sub-block coding", 2001 International Symposium on Signal Processing and its Applications (ISSPA), Aug. 13, 2001, vol. 2, p. 569-572.*

(Continued)

*Primary Examiner* — Sath V Perungavoor
*Assistant Examiner* — James Pontius
(74) *Attorney, Agent, or Firm* — Staas & Halsey LLP

(57) ABSTRACT

A encoding device includes a boundary pixel prediction value generation unit, boundary pixel prediction error estimation unit, and a quantized coefficient encoding unit. The boundary pixel prediction value generation unit generates a boundary pixel prediction value as a prediction value of a boundary pixel adjacent to an encoded block in the encoding block from a locally decoded image of a plurality of encoded blocks adjacent to the encoding block. The boundary pixel prediction error estimation unit generates boundary pixel prediction error estimation information from the boundary pixel prediction value and the encoding block prediction image with respect to the boundary pixel. The quantized coefficient encoding unit generates encoding block entropy encoded data from the quantized coefficients and the boundary pixel prediction error estimation information.

15 Claims, 50 Drawing Sheets

| NUMBER OF VALID COEFFICIENT | 1 | 2 | 3 | 4 | 5 | 6 | 7 | 8 |
|---|---|---|---|---|---|---|---|---|
| VALID COEFFICIENT POSITION INFORMATION (ZIGZAG SCANNING POSITION) | 1 | 2 | 3 | 4 | 5 | 7 | 9 | 10 |
| VALID COEFFICIENT ABSOLUTE VALUE INFORMATION | 2 | 3 | 2 | 1 | 1 | 1 | 1 | 1 |
| VALID COEFFICIENT SIGN INFORMATION (0: POSITIVE / 1: NEGATIVE) | 1 | 0 | 0 | 0 | 1 | 0 | 0 | 0 |

(56) References Cited

OTHER PUBLICATIONS

International Preliminary Report on Patentability issued Aug. 23, 2012 (English Translation issued Sep. 27, 2012) in corresponding International Patent Application No. PCT/JP2010/000888.

Hiroshi Kondo, Keiko Yamahara and Jun Liao, "Identification of DCT signs for sub-block coding", 2001 International Symposium on Signal Processing and its Applications (ISSPA), Aug. 13, 2001, vol. 2, p. 569-572, "3. Determination of DCT Signs".

Ian H.Witten et.al., "Arithmetic coding for data compression", Communication of the ACM, Jun. 1987, vol. 30, No. 6, pp. 520-540.

Takahiro Saitoh et al, "Design of Pel Adaptive DPCM Coding Based upon Image Partition", DPCM, vol. J65-B No. 1, 1982, pp. 23-30.

International Search Report mailed Apr. 20, 2010 issued in corresponding International Patent Application No. PCT/JP2010/000888.

Japanese Notice of Rejection mailed Jan. 7, 2014 in corresponding Japanese Patent Application No. 2011-553652.

* cited by examiner

|   | PIXEL 0 | PIXEL 1 | PIXEL 2 | PIXEL 3 |
|---|---|---|---|---|
| FREQUENCY 0 | 0.5 | 0.5 | 0.5 | 0.5 |
| FREQUENCY 1 | 0.5 | 0.5 | -0.5 | -0.5 |
| FREQUENCY 2 | 0.5 | -0.5 | -0.5 | 0.5 |
| FREQUENCY 3 | 0.5 | -0.5 | 0.5 | -0.5 |

301

$$\underbrace{\begin{bmatrix} 0.5 & 0.5 & 0.5 & 0.5 \\ 0.5 & 0.5 & -0.5 & -0.5 \\ 0.5 & -0.5 & -0.5 & 0.5 \\ 0.5 & -0.5 & 0.5 & -0.5 \end{bmatrix}}_{\text{HADAMARD ORTHOGONAL TRANSFORM MATRIX}} \cdot \underbrace{\begin{bmatrix} 4 & 2 & 0 & -3 \\ 0 & 0 & -1 & -3 \\ -2 & -2 & -4 & -6 \\ 1 & 0 & -7 & -8 \end{bmatrix}}_{\text{IMAGE}} \cdot \underbrace{\begin{bmatrix} 0.5 & 0.5 & 0.5 & 0.5 \\ 0.5 & 0.5 & -0.5 & -0.5 \\ 0.5 & -0.5 & -0.5 & 0.5 \\ 0.5 & -0.5 & 0.5 & -0.5 \end{bmatrix}^t}_{\substack{\text{HADAMARD ORTHOGONAL} \\ \text{TRANSFORM MATRIX}}} = \begin{bmatrix} -7.25 & 8.75 & -1.25 & 2.75 \\ 6.75 & -2.25 & -0.25 & 0.75 \\ 1.75 & 3.75 & 0.75 & 0.75 \\ 1.75 & -1.25 & -0.25 & 0.75 \end{bmatrix}$$

HORIZONTAL HADAMARD TRANSFORM

VERTICAL HADAMARD TRANSFORM

F I G. 3

| 1 | 2 | 6 | 7 |
|---|---|---|---|
| 3 | 5 | 8 | 1 |
| 4 | 9 | 1 | 1 |
| 1 | 1 | 1 | ► |

F I G. 5

| NUMBER OF VALID COEFFICIENT | 1 | | | | | | | |
|---|---|---|---|---|---|---|---|---|
| VALID COEFFICIENT POSITION INFORMATION (ZIGZAG SCANNING POSITION) | 1 | 2 | 3 | 4 | 5 | 6 | 7 | 8 |
| VALID COEFFICIENT ABSOLUTE VALUE INFORMATION | 2 | 3 | 2 | 1 | 1 | 1 | 1 | 1 |
| VALID COEFFICIENT SIGN INFORMATION (0: POSITIVE / 1: NEGATIVE) | 1 | 0 | 0 | 0 | 1 | 0 | 0 | 0 |

FIG. 6

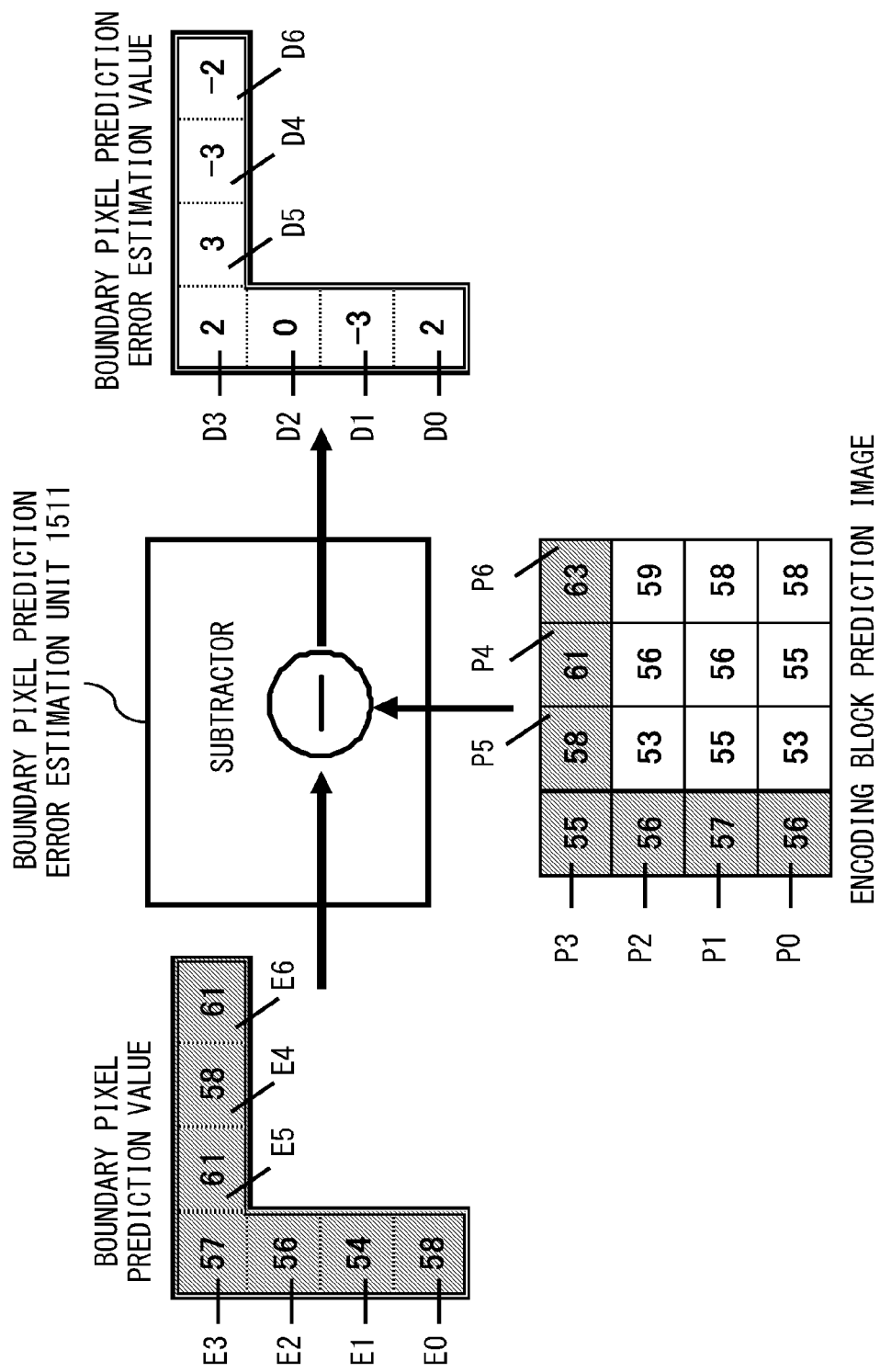
F I G. 18

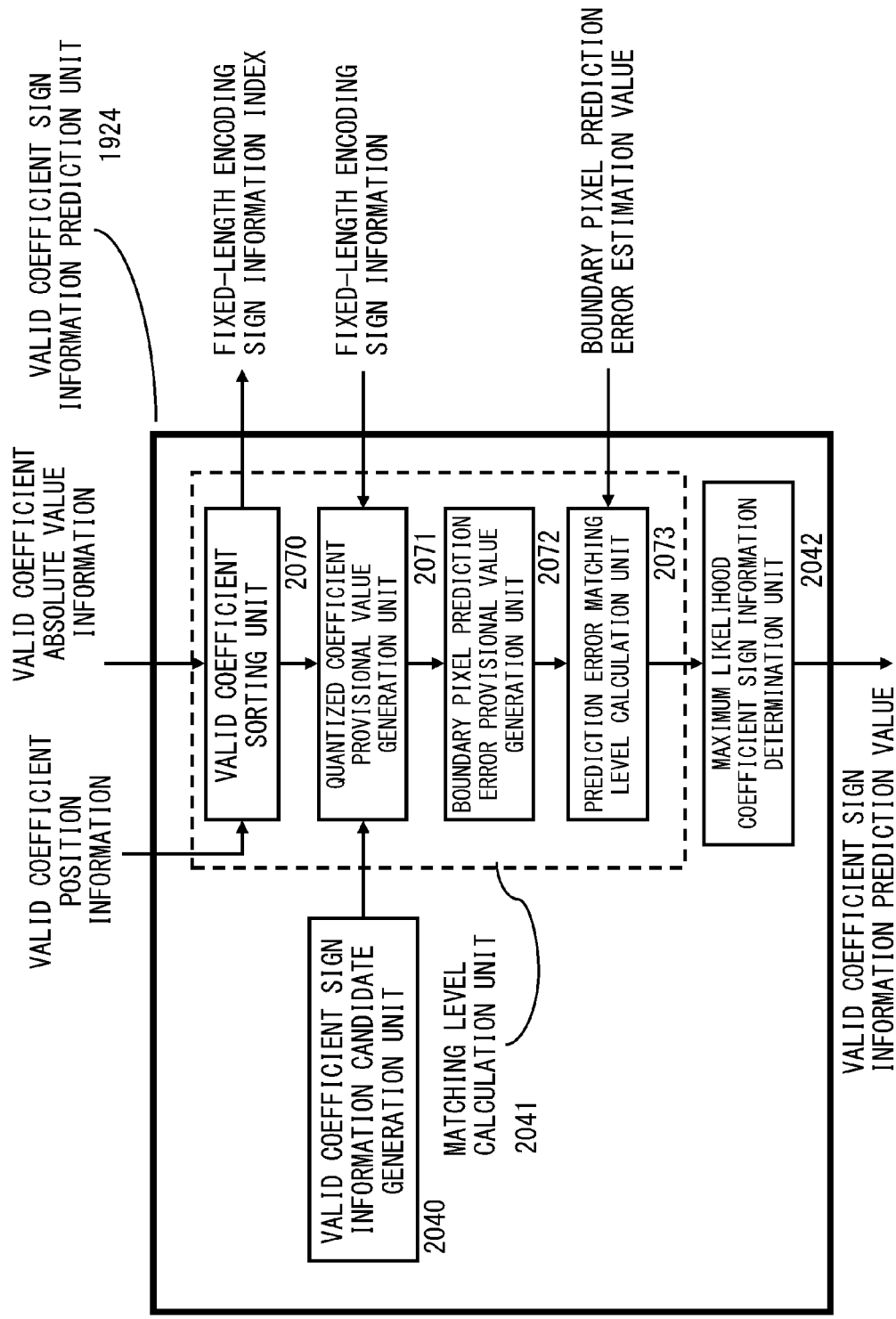
F I G. 20

FIG. 22

| VALID COEFFICIENT SIGN INFORMATION CANDIDATE INDEX | VALID COEFFICIENT SIGN INFORMATION CANDIDATE OF VALID COEFFICIENT AT SELECTED POSITION | | | | | | | |
|---|---|---|---|---|---|---|---|---|
| | 2 | 3 | 1 | 10 | 9 | 7 | | |
| 0 | 0 | 0 | 0 | 0 | 0 | 0 | | |
| 1 | 0 | 0 | 0 | 0 | 0 | 1 | | |
| 2 | 0 | 0 | 0 | 0 | 1 | 0 | | |
| 3 | 0 | 0 | 0 | 0 | 1 | 1 | | |
| ... | ... | ... | ... | ... | ... | ... | | |
| 8 | 0 | 0 | 1 | 0 | 0 | 0 | | |
| ... | ... | ... | ... | ... | ... | ... | | |
| 13 | 0 | 0 | 1 | 1 | 0 | 1 | | |
| ... | ... | ... | ... | ... | ... | ... | | |
| 61 | 1 | 1 | 1 | 1 | 0 | 1 | | |
| 62 | 1 | 1 | 1 | 1 | 1 | 0 | | |
| 63 | 1 | 1 | 1 | 1 | 1 | 1 | | |

Column header "2 3 1 10 9 7": VALID COEFFICIENT POSITION INFORMATION

Data cells: VALUE OF SIGN INFORMATION CANDIDATE FOR VALID COEFFICIENT
0: POSITIVE CODE / 1: NEGATIVE CODE 2200 — VALID COEFFICIENT SIGN INFORMATION CANDIDATE INDEX column
2201 — data block

F I G. 2 3

| VALID COEFFICIENT SIGN INFORMATION CANDIDATE INDEX | QUANTIZED COEFFICIENT PROVISIONAL VALUE OF VALID COEFFICIENT ENCODED USING VALID COEFFICIENT SIGN INFORMATION PREDICTION VALUE | | | | | | | | QUANTIZED COEFFICIENT USING FIXED-LENGTH CODE | VALID COEFFICIENT POSITION INFORMATION |
|---|---|---|---|---|---|---|---|---|---|---|
| | 2 | 3 | 1 | 10 | 9 | 7 | | | 5 | 4 |
| 0 | 3 | 2 | 2 | 1 | 1 | 1 | | | -1 | 1 |
| 1 | 3 | 2 | 2 | 1 | 1 | -1 | | | -1 | 1 |
| 2 | 3 | 2 | 2 | 1 | -1 | 1 | | | -1 | 1 |
| 3 | 3 | 2 | 2 | 1 | -1 | -1 | | | -1 | 1 |
| ... | ... | ... | ... | ... | ... | ... | | | ... | ... |
| 8 | 3 | 2 | -2 | 1 | 1 | 1 | | | -1 | 1 |
| ... | ... | ... | ... | ... | ... | ... | | | ... | ... |
| 13 | 3 | 2 | -2 | -1 | 1 | 1 | | | -1 | 1 |
| ... | ... | ... | ... | ... | ... | ... | | | ... | ... |
| 61 | -3 | -2 | -2 | -1 | -1 | 1 | | | -1 | 1 |
| 62 | -3 | -2 | -2 | -1 | -1 | -1 | | | -1 | 1 |
| 63 | -3 | -2 | -2 | -1 | -1 | -1 | | | -1 | 1 |

SETTING CODE BY VALID COEFFICIENT SIGN INFORMATION CANDIDATE

FIXEDLY SETTING ORIGINAL SIGN INFORMATION

QUANTIZED COEFFICIENT PROVISIONAL VALUE OF VALID COEFFICIENT

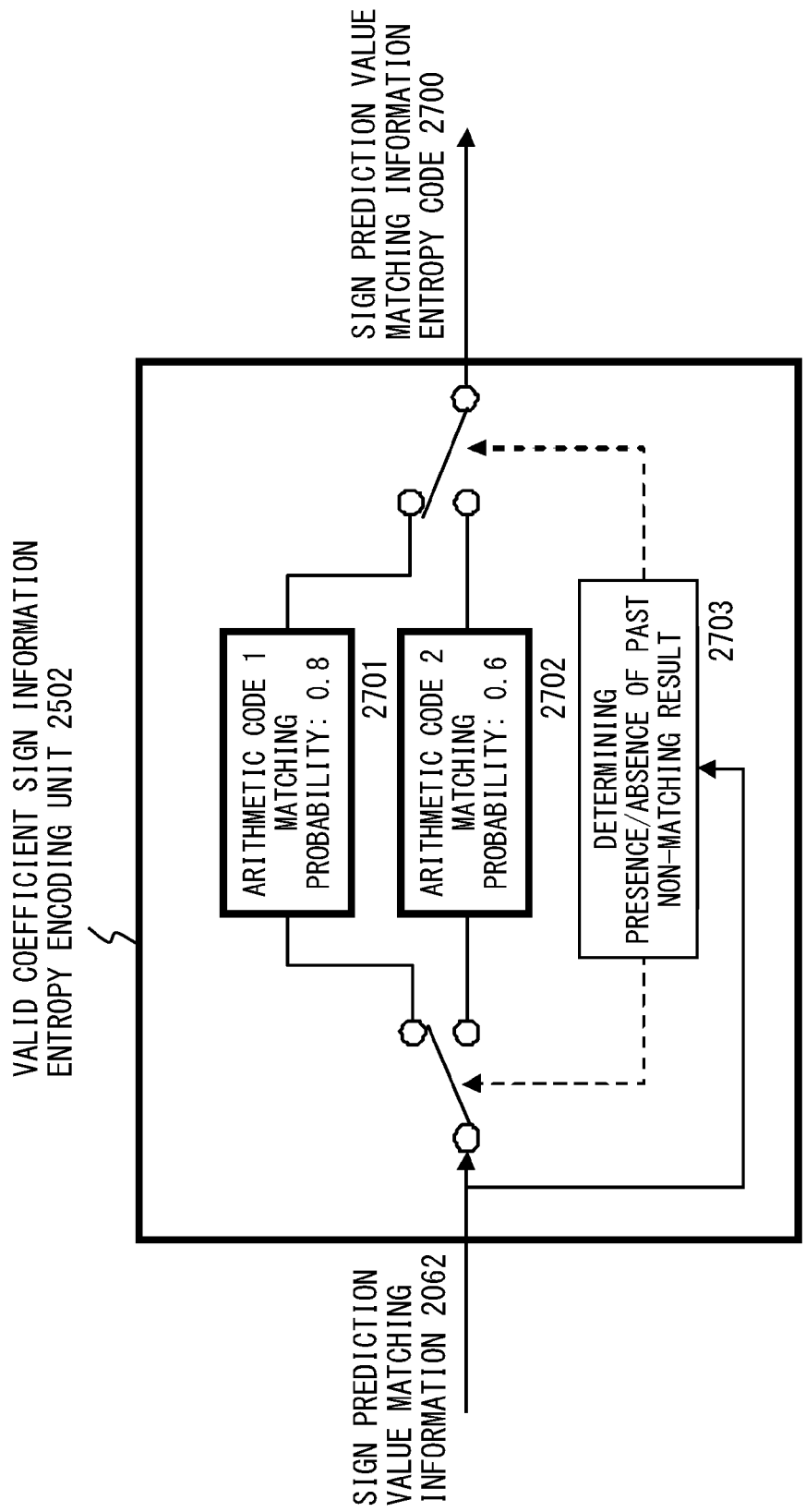
F I G. 27

| POSITION OF VALID COEFFICIENT | 2 | 3 | 1 | 10 | 9 | 7 |
|---|---|---|---|---|---|---|
| SIGN PREDICTION VALUE MATCHING INFORMATION | 0 | 0 | 0 | 1 | 0 | 1 |
| PRESENCE/ABSENCE OF PAST NON-MATCHING RESULT | NO | NO | NO | NO | YES | YES |
| ENCODER | ARITHMETIC CODE 1 | ARITHMETIC CODE 1 | ARITHMETIC CODE 1 | ARITHMETIC CODE 1 | ARITHMETIC CODE 2 | ARITHMETIC CODE 2 |

F I G. 2 8

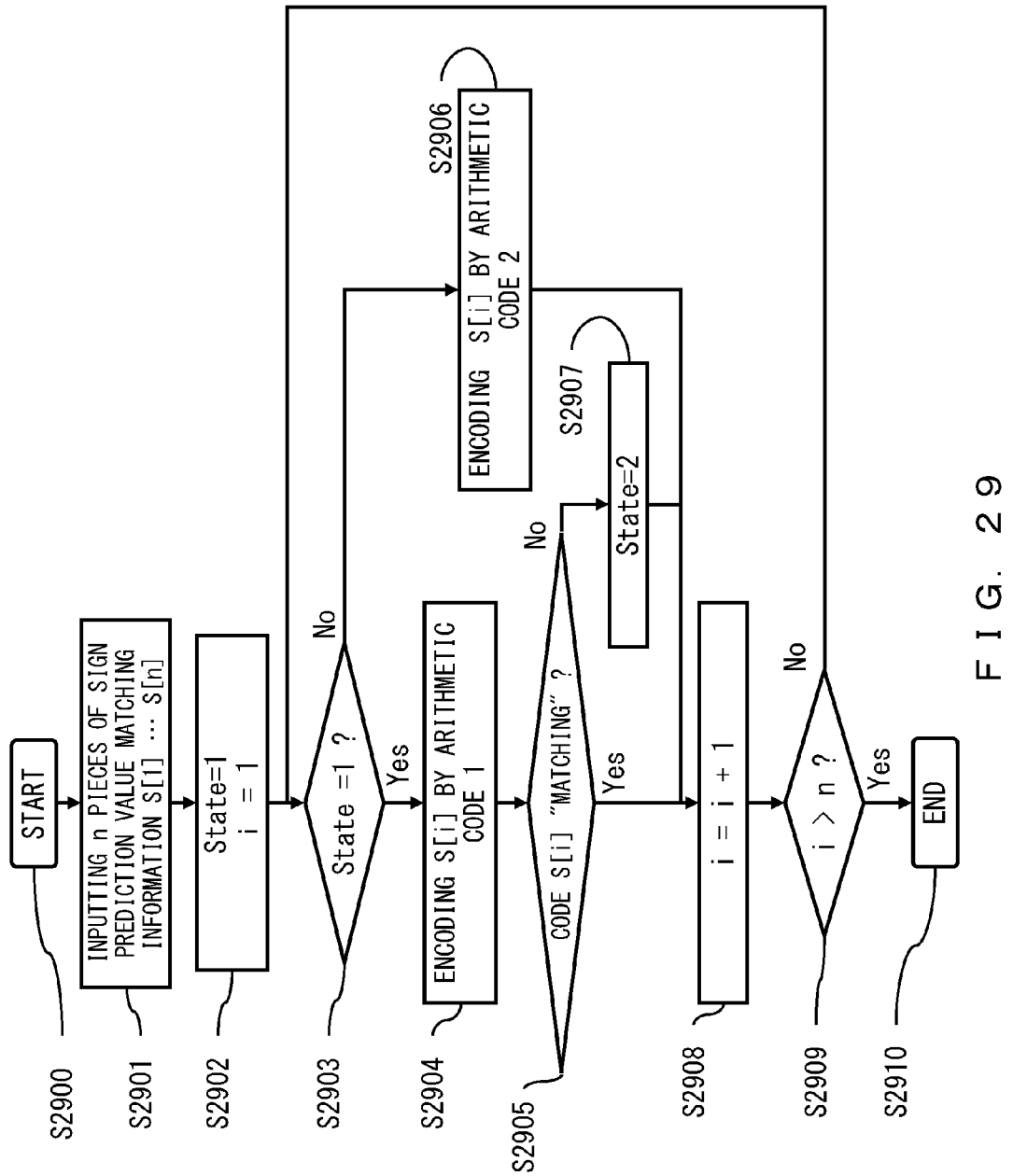
F I G. 29

| POSITION OF VALID COEFFICIENT | 2 | 3 | 1 | 10 | 9 | 7 |
|---|---|---|---|---|---|---|
| SIGN PREDICTION VALUE MATCHING INFORMATION | 0 | 0 | 0 | 1 | 0 | 1 |
| PRESENCE/ABSENCE OF PAST NON-MATCHING RESULT | NO | NO | NO | NO | YES | YES |
| DECODER | ARITHMETIC DECODE 1 | ARITHMETIC DECODE 1 | ARITHMETIC DECODE 1 | ARITHMETIC DECODE 1 | ARITHMETIC DECODE 2 | ARITHMETIC DECODE 2 |

F I G. 35

|  | PIXEL 0 | PIXEL 1 | PIXEL 2 | PIXEL 3 |
|---|---|---|---|---|
| FREQUENCY 0 | 0.5 | 0.5 | 0.5 | 0.5 |
| FREQUENCY 1 | 0.5 | 0.5 | −0.5 | −0.5 |
| FREQUENCY 2 | 0.5 | −0.5 | −0.5 | 0.5 |
| FREQUENCY 3 | 0.5 | −0.5 | 0.5 | −0.5 |

$$\begin{bmatrix} r_{00} & r_{10} & r_{20} & r_{30} \\ r_{01} & r_{11} & r_{21} & r_{31} \\ r_{02} & r_{12} & r_{22} & r_{32} \\ r_{03} & r_{13} & r_{23} & r_{33} \end{bmatrix} = \begin{bmatrix} 0.5 & 0.5 & 0.5 & 0.5 \\ 0.5 & 0.5 & -0.5 & -0.5 \\ 0.5 & -0.5 & -0.5 & 0.5 \\ 0.5 & -0.5 & 0.5 & -0.5 \end{bmatrix} \cdot \begin{bmatrix} x_{00} & x_{10} & x_{20} & x_{30} \\ x_{01} & x_{11} & x_{21} & x_{31} \\ x_{02} & x_{12} & x_{22} & x_{32} \\ x_{03} & x_{13} & x_{23} & x_{33} \end{bmatrix} \cdot \begin{bmatrix} 0.5 & 0.5 & 0.5 & 0.5 \\ 0.5 & 0.5 & -0.5 & -0.5 \\ 0.5 & -0.5 & -0.5 & 0.5 \\ 0.5 & -0.5 & 0.5 & -0.5 \end{bmatrix}$$

- Reproduced prediction error matrix 3956
- Transposed matrix of Hadamard transform: $T_0^t$ 3900, $T_1^t$ 3901, $T_2^t$ 3902, $T_3^t$ 3903 (3911)
- Reproduced frequency coefficient matrix 3955
- Hadamard transform matrix: $T_0$ 3800, $T_1$ 3801, $T_2$ 3802, $T_3$ 3803 (3910)
- Inverse Hadamard transform in vertical direction
- Inverse Hadamard transform in horizontal direction $$= \sum_{i,j} x_{ij} \cdot (T_j^t \cdot T_i)$$

Cumulative sum expression of 4-point Hadamard transform 3920

- $x_{ij}$ — Reproduced frequency coefficient having horizontal frequency i, vertical frequency j (3921)
- $(T_j^t \cdot T_i)$ — 4×4 2-dimensional orthogonal basis having horizontal frequency i and vertical frequency j (3922)

F I G. 3 9

REPRODUCED PREDICTION
ERROR MATRIX $$\begin{bmatrix} r_{00} & r_{10} & r_{20} & r_{30} \\ r_{01} & r_{11} & r_{21} & r_{31} \\ r_{02} & r_{12} & r_{22} & r_{32} \\ r_{03} & r_{13} & r_{23} & r_{33} \end{bmatrix}$$ 4056

LEFTDIFF VECTOR 4000: $[r_{00}\ r_{01}\ r_{02}\ r_{03}]$

CUMULATIVE SUM EXPRESSION OF LEFTDIFF VECTOR 4010:
$$= \sum_{i,j}(x_{ij} \cdot t0_i) \cdot T_j^t$$

REPRODUCED PREDICTION
ERROR MATRIX $$\begin{bmatrix} r_{00} & r_{10} & r_{20} & r_{30} \\ r_{01} & r_{11} & r_{21} & r_{31} \\ r_{02} & r_{12} & r_{22} & r_{32} \\ r_{03} & r_{13} & r_{23} & r_{33} \end{bmatrix}$$ 4056

TOPDIFF VECTOR 4001: $[r_{00}\ r_{10}\ r_{20}\ r_{30}]$

CUMULATIVE SUM EXPRESSION OF TOPDIFF VECTOR 4011:
$$= \sum_{i,j}(x_{ij} \cdot t0_j) \cdot T_i$$

F I G. 4 0

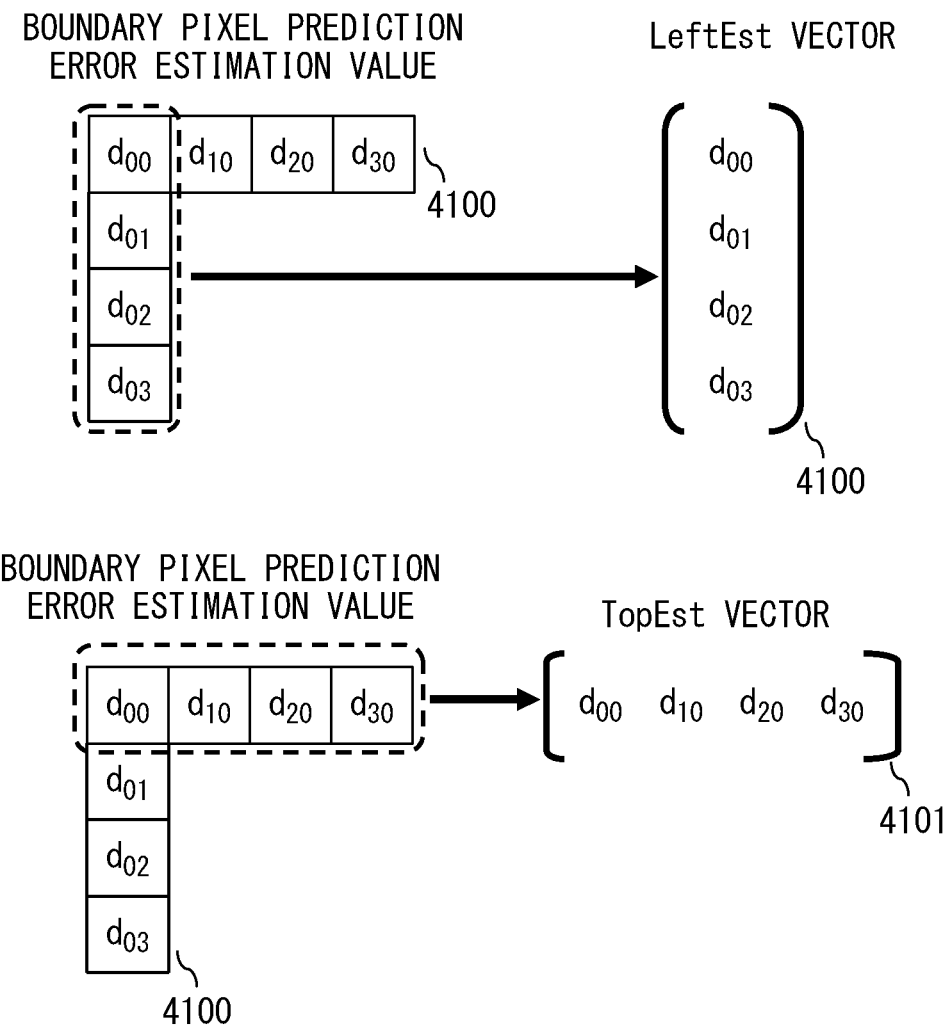
F I G. 4 1

| VALID COEFFICIENT SIGN INFORMATION CANDIDATE INDEX | GRAY CODE OF CANDIDATE INDEX | VALID COEFFICIENT SIGN INFORMATION CANDIDATE (0: POSITIVE / 1: NEGATIVE) | | | | DIFFERENCE FROM IMMEDIATELY PREVIOUS SIGN INFORMATION CANDIDATE | |
|---|---|---|---|---|---|---|---|
| | | VALID COEFFICIENT 0 | VALID COEFFICIENT 1 | VALID COEFFICIENT 2 | VALID COEFFICIENT 3 | VALID COEFFICIENT WITH CHANGE | CODE CHANGE (0: NEGATIVE ⇒ POSITIVE / 1: POSITIVE ⇒ NEGATIVE) |
| 0 | 0000 | 0 | 0 | 0 | 0 | — | — |
| 1 | 0001 | 1 | 0 | 0 | 0 | 0 | 1 |
| 2 | 0011 | 1 | 1 | 0 | 0 | 1 | 1 |
| 3 | 0010 | 0 | 1 | 0 | 0 | 0 | 0 |
| 4 | 0110 | 0 | 1 | 1 | 0 | 2 | 1 |
| 5 | 0111 | 1 | 1 | 1 | 0 | 0 | 1 |
| 6 | 0101 | 1 | 0 | 1 | 0 | 1 | 0 |
| 7 | 0100 | 0 | 0 | 1 | 0 | 0 | 0 |
| 8 | 1100 | 0 | 0 | 1 | 1 | 3 | 1 |
| 9 | 1101 | 1 | 0 | 1 | 1 | 0 | 1 |
| 10 | 1111 | 1 | 1 | 1 | 1 | 1 | 1 |
| 11 | 1110 | 0 | 1 | 1 | 1 | 0 | 0 |
| 12 | 1010 | 0 | 1 | 0 | 1 | 2 | 0 |
| 13 | 1011 | 1 | 1 | 0 | 1 | 0 | 1 |
| 14 | 1001 | 1 | 0 | 0 | 1 | 1 | 0 |
| 15 | 1000 | 0 | 0 | 0 | 1 | 0 | 0 |

F I G. 4 3

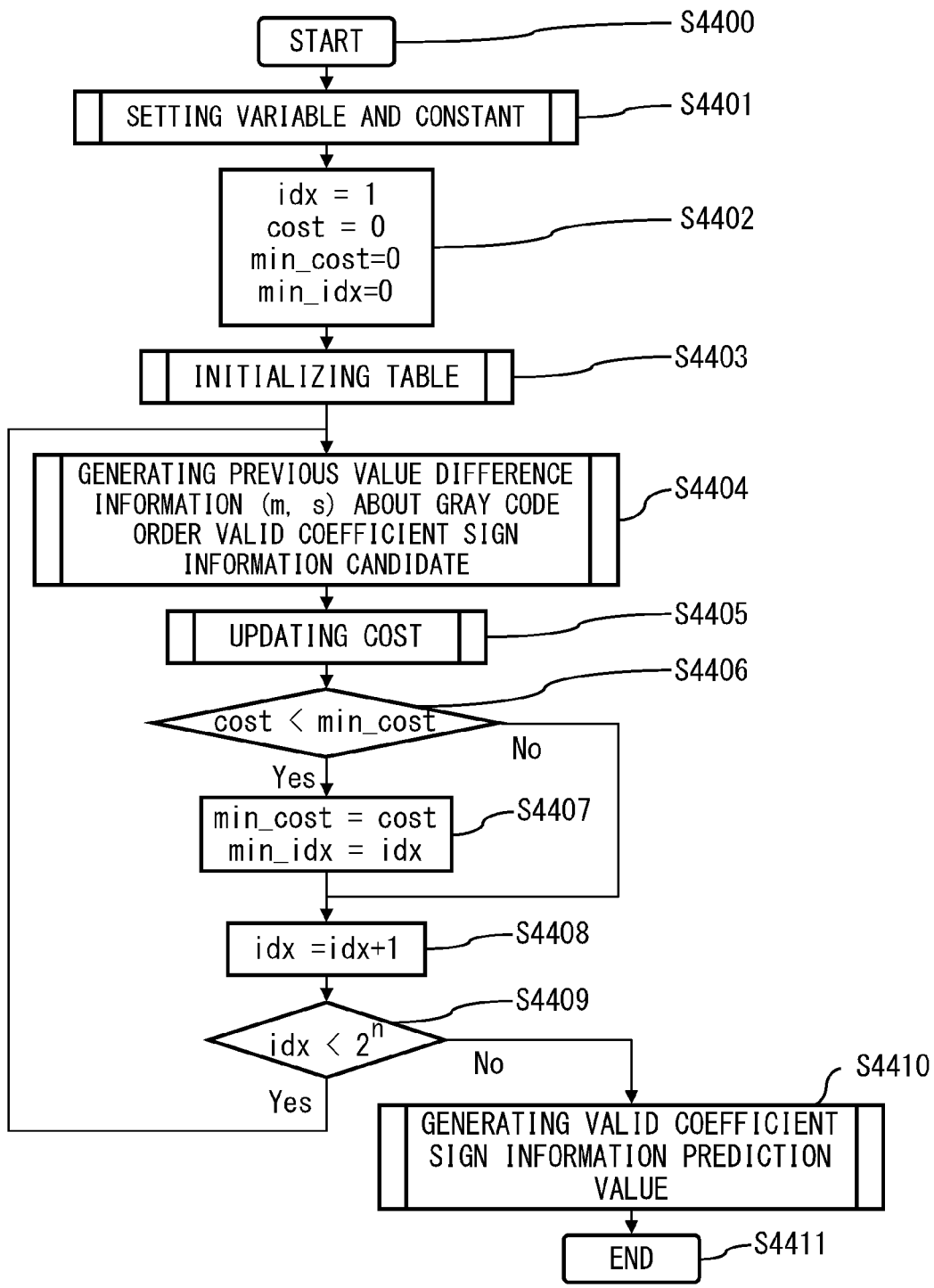
F I G. 44

S4501

START OF SETTING STEP OF VARIABLE AND CONSTANT — S4500

| | | |
|---|---|---|
| L | : | GRADE OF ORTHOGONAL BASIS (4 IN 4x4 TRANSFORM) |
| Q | : | VALUE OF QUANTIZER |
| $t0_x$ | : | COEFFICIENT OF PIXEL 0 OF ORTHOGONAL BASIS OF FREQUENCY x |
| n | : | NUMBER OF CHECK TARGET COEFFICIENTS |
| $(i_k, j_k)$ | : | HORIZONTAL AND VERTICAL FREQUENCIES OF k-TH CHECK TARGET COEFFICIENT |
| $Ci_k j_k$ | : | k-TH CHECK TARGET COEFFICIENT ABSOLUTE VALUE |
| Weight_H[0···L-1], Weight_V[0···L-1] | = 0 | TABLE STORING WEIGHT OF HORIZONTAL AND VERTICAL FREQUENCY ORTHOGONAL BASIS |
| Table_H[1···n], Table_HV[1···n] | : | TABLE STORING VALUE OF COST UPDATE AT CHECK TARGET COEFFICIENT CODE CHANGE |
| m | : | VARIABLE STORING POSITION HAVING DIFFERENT SIGN INFORMATION FROM VALID COEFFICIENT SIGN INFORMATION CANDIDATE IMMEDIATELY BEFORE |
| s | : | SIGN INFORMATION CHANGE (0: NEGATIVE ⇒ POSITIVE / 1: POSITIVE ⇒ NEGATIVE) AT DIFFERENT POSITION OF SIGN INFORMATION FROM VALID COEFFICIENT SIGN INFORMATION CANDIDATE IMMEDIATELY BEFORE |
| idx | : | INDEX OF VALID COEFFICIENT SIGN INFORMATION CANDIDATE TO BE CHECKED |
| min_idx | : | INDEX OF VALID COEFFICIENT SIGN INFORMATION CANDIDATE ASSIGNED COST OF LOWEST MATCHING LEVEL |
| cost | : | COST OF MATCHING LEVEL AT INDEX OF VALID COEFFICIENT SIGN INFORMATION CANDIDATE TO BE CHECKED |
| min_cost | : | COST OF LOWEST MATCHING LEVEL |
| PredSign[1...n] | : | VALID COEFFICIENT SIGN INFORMATION PREDICTION VALUE |

END OF SETTING STEP OF VARIABLE AND CONSTANT — S4502

F I G. 4 5

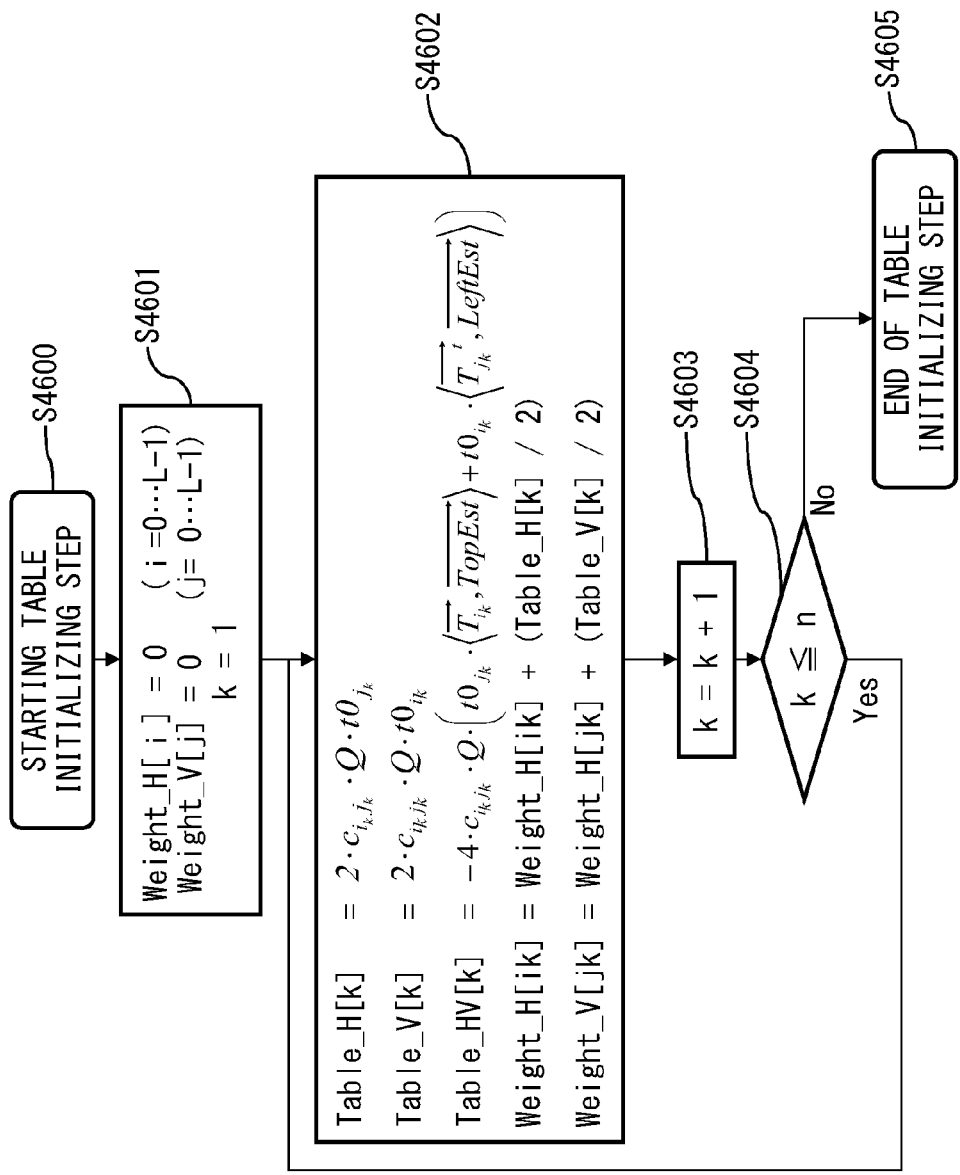
F I G. 4 6

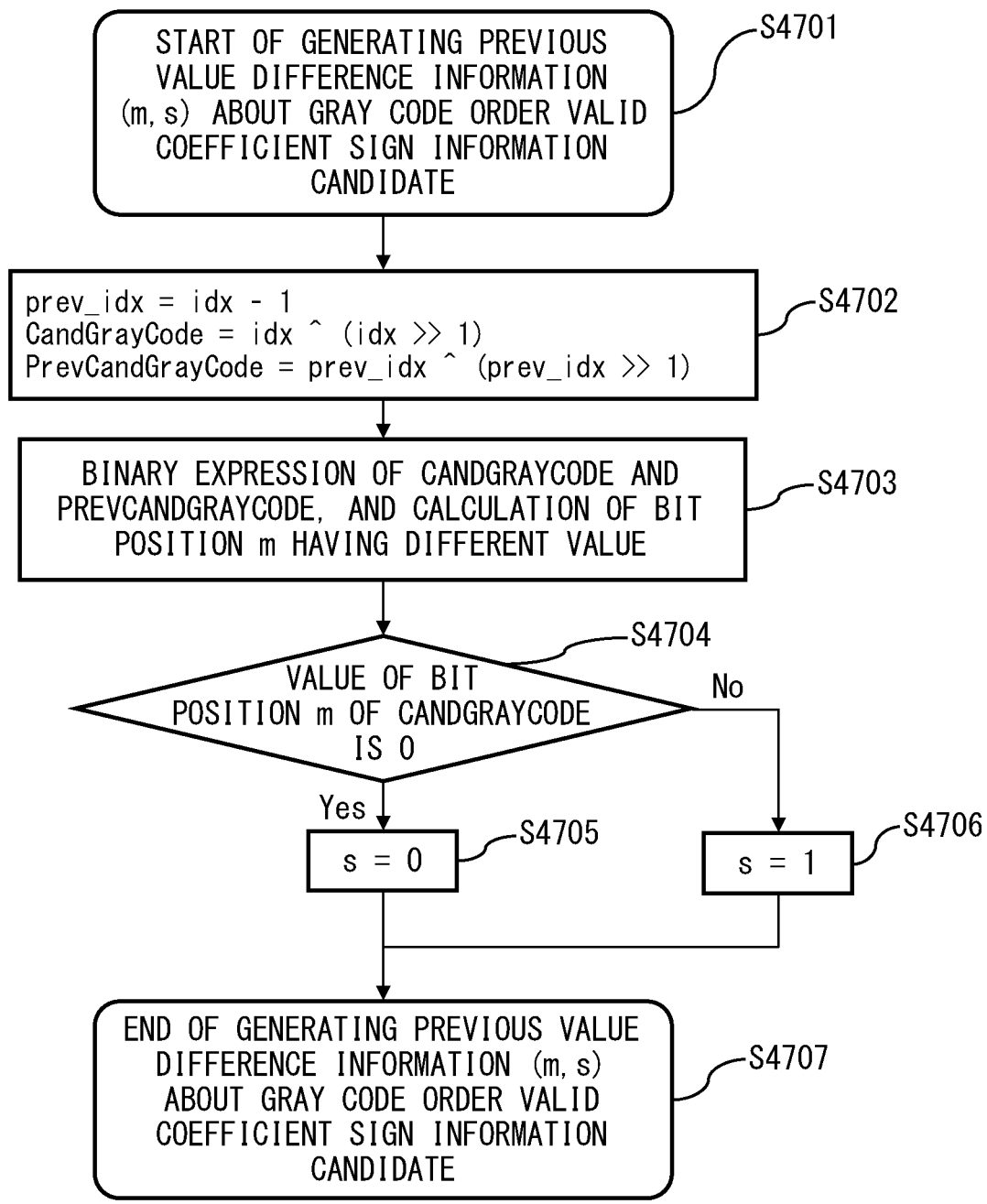
F I G. 4 7

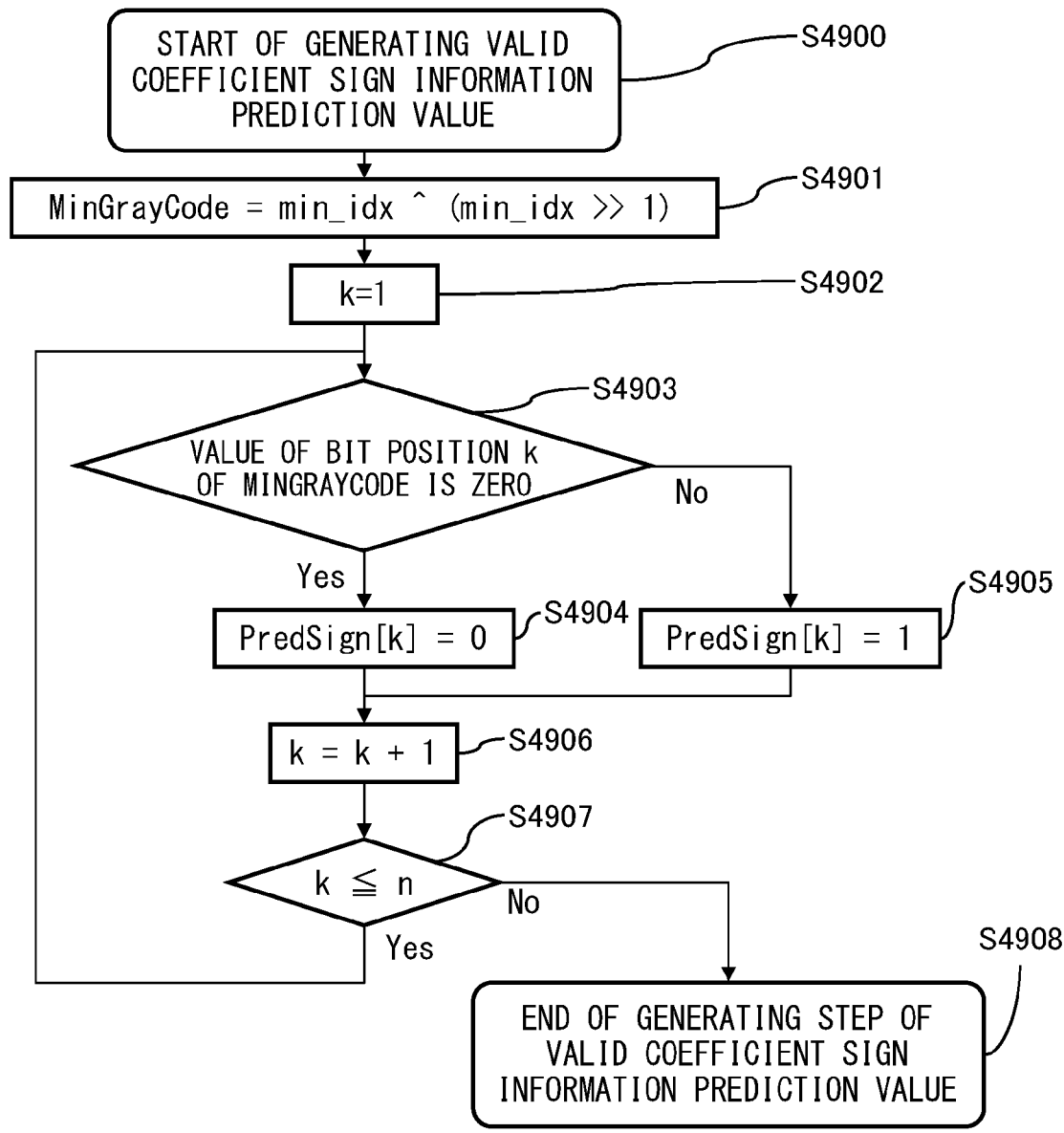
F I G. 4 9

IMAGE ENCODING DEVICE AND IMAGE DECODING DEVICE

CROSS-REFERENCE TO RELATED APPLICATION

This application is a continuation application of International Application PCT/JP2010/000888 filed on Feb. 12, 2010 and designated the U.S., the entire contents of which are incorporated herein by reference.

FIELD

The embodiments described herein are related to a device, a method, and a program for encoding an image using a frequency transformation, and a device, a method, and a program for decoding an image using the same.

BACKGROUND

Since image data, especially moving image data, is large in volume, a high efficiency encoding is performed when the data is transmitted from a transmission apparatus to a receiving apparatus, or when the data is stored in a storage device. The "high efficiency encoding process" refers to a process of transforming a data sequence into another data sequence, and compressing the volume of data.

One of a method for a high efficiency image encoding process is a prediction encoding. The prediction encoding calculates a difference between each encoding target block obtained by dividing an encoding target image into a plurality of blocks and a corresponding prediction image generated based on a locally decoding process, and generates a prediction error image. The frequency coefficients obtained by performing an orthogonal transformation on the prediction error image is quantized, and resultant quantized coefficients are encoded and transmitted to the decoding side.

In addition, since large portion of coefficients obtained by converting an image into a frequency domain are distributed in low frequency area, an entropy coding may be performed.

However, with recent high image quality, a higher efficiency image encoding technique is demanded.

As related art, following documents are known.
(1) Patent Document 1: U.S. Pat. No. 2,632,058
(2) Non-patent Document 1: Academic Papers of the Institute of Electronics, Information and Communication Engineers B Vol. J65-B No. 1 pp. 23-30, "Method of Designing a Pixel Adaptive DPCM Encoding based on the region segmentation of a screen"
(3) Non-patent Document 2: Ian H. Witten et. al., "Arithmetic coding for data compression, Communication of the ACM, June 1987, Vo. 30, No. 6, pp. 520-530"

SUMMARY

According to an aspect of the embodiments, a moving image encoding device encodes each encoding block obtained by dividing an encoding target image into a plurality of blocks. The moving image encoding device includes: an encoding block prediction image generation unit configured to generate an encoding block prediction image of the encoding block; a prediction error image generation unit configured to generate a prediction error image as a difference between the encoding block and the encoding block prediction image; a transform unit configured to transform the prediction error image into frequency coefficients; a quantization unit configured to quantize the frequency coefficients to generate quantized coefficients; an inverse quantization unit configured to inversely quantize the quantized coefficients to generate reproduced frequency coefficients; an inverse transform unit configured to inversely transform the reproduced frequency coefficients into a reproduced prediction error image; a locally decoded image generation unit configured to generate a locally decoded image from the reproduced prediction error image and the encoding block prediction image; a boundary pixel prediction value generation unit configured to generate a boundary pixel prediction value as a prediction value of a boundary pixel adjacent to an encoded block in the encoding block from a locally decoded image of a plurality of encoded blocks adjacent to the encoding block; a boundary pixel prediction error estimation unit configured to generate boundary pixel prediction error estimation information from the boundary pixel prediction value and the encoding block prediction image with respect to the boundary pixel; and a quantized coefficient encoding unit configured to generate encoding block entropy encoded data from the quantized coefficients and the boundary pixel prediction error estimation information. The quantized coefficient encoding unit includes: a valid coefficient information generation unit configured to extract non-zero coefficient as a valid coefficient from the quantized coefficients, and generate valid coefficient position information indicating a frequency position of the valid coefficient, valid coefficient absolute value information as an absolute value of the valid coefficient, and valid coefficient sign information indicating a positive/negative code of the valid coefficient; a valid coefficient sign information prediction unit configured to generate a valid coefficient sign information prediction value as a prediction value of sign information indicating whether the valid coefficient is positive or negative from the boundary pixel prediction error estimation information, the valid coefficient position information, and the valid coefficient absolute value information; a valid coefficient position information encoding unit configured to entropy encode the valid coefficient position information and generate a valid coefficient position code; a valid coefficient absolute value encoding unit configured to entropy encode the valid coefficient absolute value information and generate a valid coefficient absolute value code; and a valid coefficient sign information prediction encoding unit configured to entropy encode sign prediction value matching information indicating whether or not the valid coefficient sign information prediction value matches the valid coefficient sign information, and generate a valid coefficient sign code. The quantized coefficient encoding unit generates the encoding block entropy encoded data from the valid coefficient position code, the valid coefficient absolute value code, and the valid coefficient sign code.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory view of a coefficient for Hadamard transform;

FIG. 5 is an example of a zigzag order of quantized coefficients;

FIG. 6 is an example of zigzag scanning a quantized coefficient and transforming it into valid coefficient information;

FIG. 18 illustrates the process of the boundary pixel prediction error estimation unit according to the fourth embodiment;

FIG. 20 illustrates a valid coefficient sign information prediction unit according to the fourth embodiment;

FIG. 22 illustrates the process of the valid coefficient sign information candidate generation unit according to the fourth embodiment;

FIG. 23 illustrates the process of the quantized coefficient provisional value generation unit according to the fourth embodiment;

FIG. 27 illustrates the valid coefficient sign information entropy encoding unit according to the fourth embodiment;

FIG. 28 is an example of sign prediction value matching information and an example of an encoder;

FIG. 29 is a flowchart of the arithmetic sign selecting process used in encoding the sign prediction value matching information;

FIG. 35 illustrates an example of the decoding device for the sign prediction value matching information;

FIG. 38 is an explanatory view of the orthogonal basis vector configuring 4-point Hadamard transform according to the sixth embodiment;

FIG. 39 is an explanatory view of the expression of a cumulative sum of the 4-point Hadamard transform;

FIG. 40 is an explanatory view of the relationship between the four upper boundary pixels/four left boundary pixels of the reproduced prediction error and the reproduced frequency coefficient;

FIG. 41 is an explanatory view of the definition of the vector expression of the upper/left boundary pixel of the boundary pixel prediction error estimation value;

FIG. 43 is an example of a valid coefficient sign information candidate according to the Gray code when four coefficients are checked;

FIG. 44 is a flowchart of the process of deriving a valid coefficient sign information prediction value according to the sixth embodiment;

FIG. 45 is a flowchart of a variable/constant setting step according to the sixth embodiment;

FIG. 46 is a flowchart of a table initializing step according to the sixth embodiment;

FIG. 47 is a flowchart of a Gray code order valid coefficient sign information candidate previous value difference information generating step according to the sixth embodiment;

FIG. 49 is a flowchart of a valid coefficient sign information prediction value generating step according to the sixth embodiment.

DESCRIPTION OF EMBODIMENTS

The embodiments of the present invention are described below in detail with reference to the attached drawings.

Figure 1:
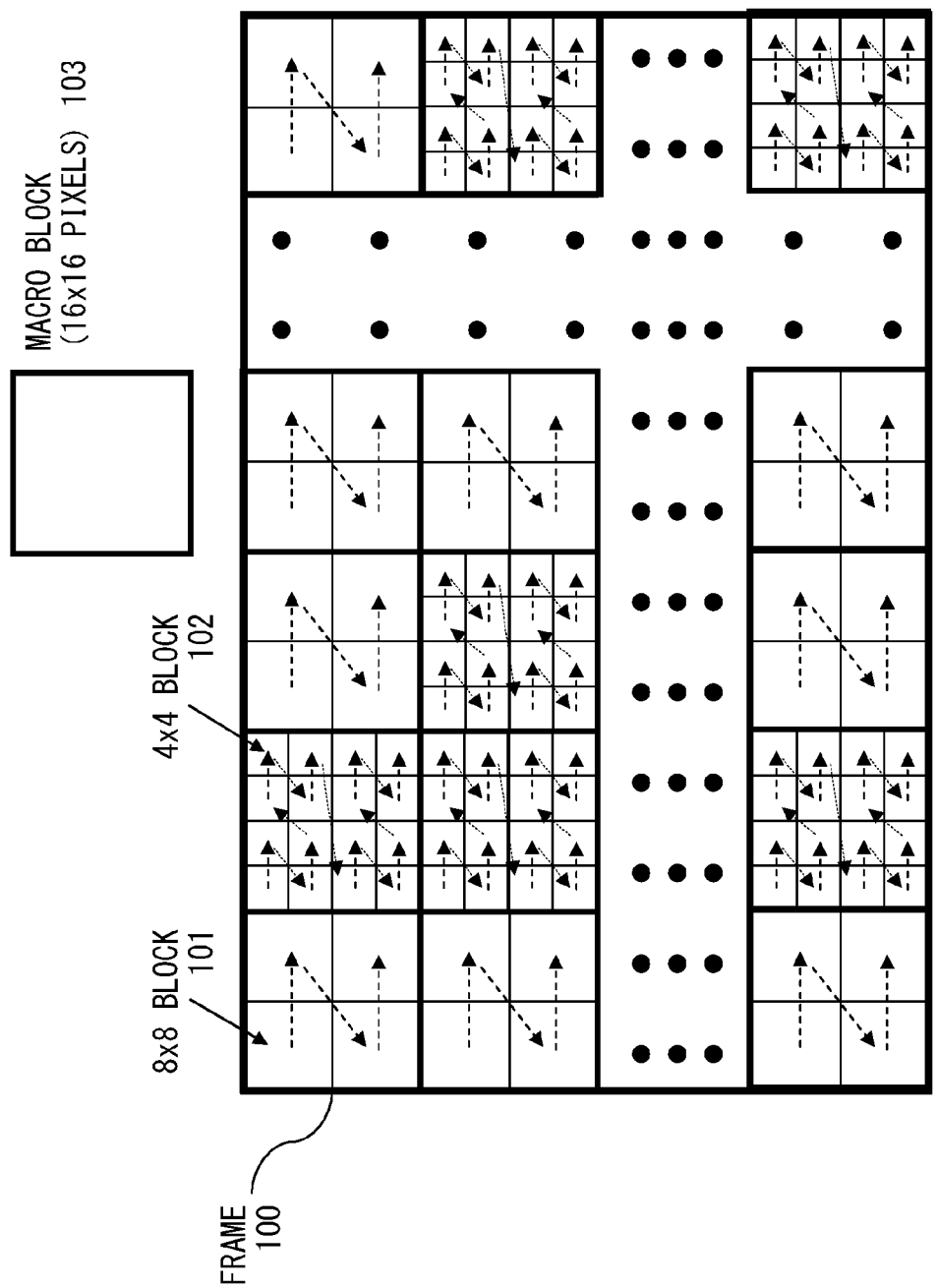
FIG. 1 is an explanatory view of segmenting an encoding target image into macro blocks and sub-blocks.

FIG. 1 is an explanatory view of the ITU-T H.264 as an international moving picture encoding standard. In FIG. 1, a moving image is encoded for each block or for a plurality of blocks after dividing an input frame 100 into a plurality of blocks. FIG. 1 illustrates an example of a block segmentation in the H.264. In the ITU-T H.264, the image frame 100 is first divided into macro blocks 103, each macro block has 16×16 pixels. To encode the macro block, one of 4×4 and 8×8 is selected for an orthogonal transformation. Depending on the selected orthogonal transformation, the macro block 103 is divided into 4×4 blocks (102) or 8×8 blocks (101), and the resultant blocks are encoded.

Figure 2:
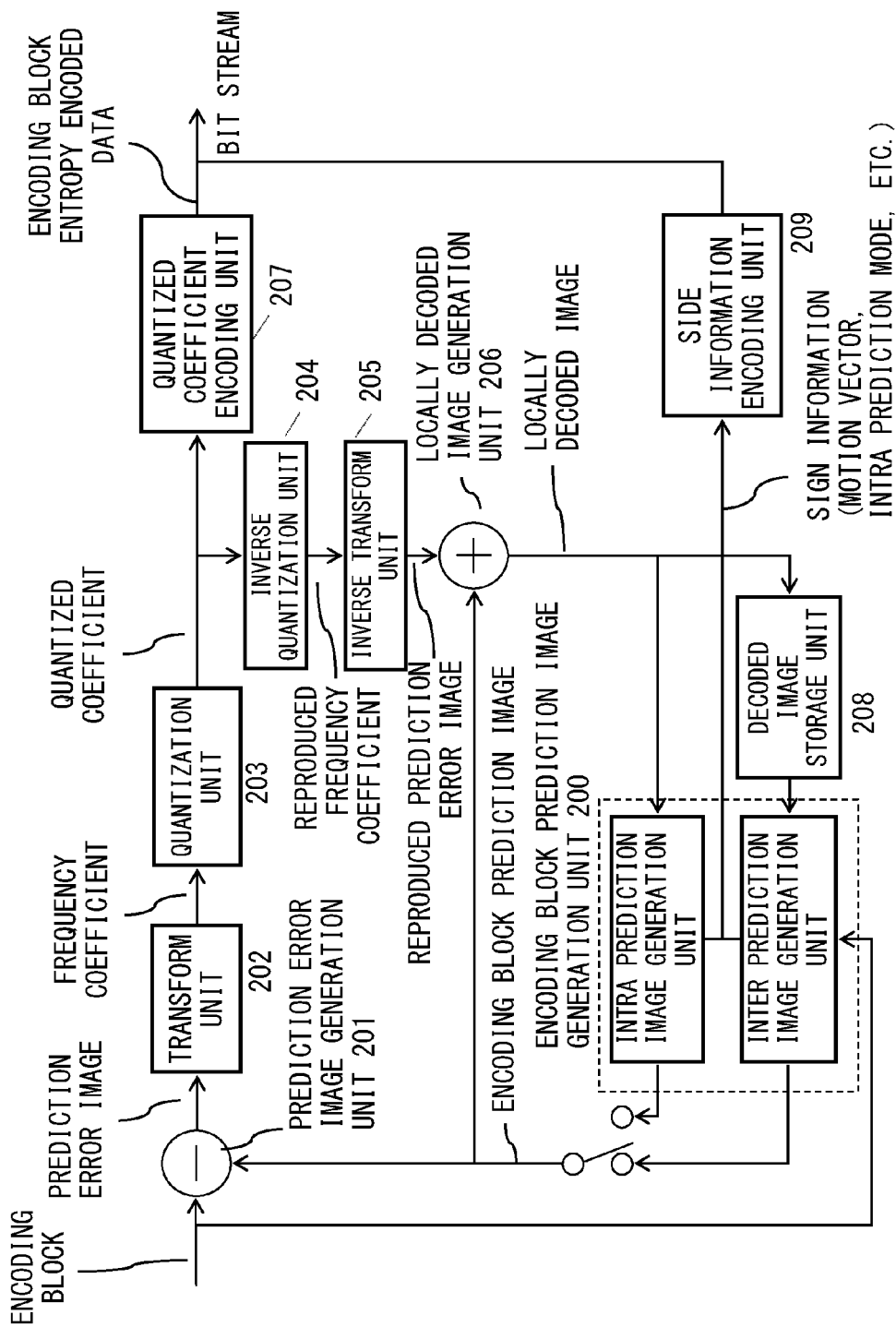
FIG. 2 illustrates an image encoding device.

FIG. 2 illustrates an image encoding device for dividing an image into a plurality of blocks and encoding the blocks. In the case of ITU-T H.264, an encoding block is configured by 4×4 or 8×8 pixels.

First, to encode an encoding block as an encoding target block, an encoding block prediction image as a prediction image closely related to the encoding block is generated. In the ITU-T H.264, an inter prediction image generation unit and an intra prediction image generation unit are provided. The inter prediction image generation unit selects an area similar to the encoding block from among the decoded images which were previously decoded, and outputs the selected area as an encoding block prediction image. The intra prediction image generation unit generates an image similar to the encoding block by an extrapolation prediction from among the locally decoded images of the neighboring encoded blocks of the current encoding image, and outputs the generated image as an encoding block prediction image. Afterwards, the inter prediction image generation unit and the intra prediction image generation unit are collectively referred to as an encoding block prediction image generation unit 200. The motion vector information indicating the relative position of the encoding target block and the decoded image block used in the inter prediction image generation unit and the side information such as the mode of the intra prediction etc. used in the intra prediction image generation unit are entropy-encoded by a side information encoding unit 209 and superimposed on a bit stream. The entropy encoding is a technique of optimally compressing data using a frequency of occurrences of data.

A prediction error image generation unit 201 calculates the difference between the encoding block and the encoding block prediction image, and generates a prediction error image.

A transform unit 202 transforms the prediction error image into frequency coefficients using a frequency transformation such as a discrete cosine transform, an Hadamard transform, etc.

A quantization unit 203 quantizes the frequency coefficients, and generates quantized coefficients. The quantization may be realized by dividing a frequency coefficient by an appropriate quantizer, obtaining an integer, and outputting the resultant integer as a quantized coefficient. According to the MPEG-2 as another international moving picture encoding standard and the above-mentioned H.264, a quantizer can be switched at each frequency component position of a coefficient.

An inverse quantization unit 204 inversely quantizes the quantized coefficients, and generates reproduced frequency coefficients. In this example, the inverse quantization is realized by the quantizer used in the quantization unit 203 performing multiplication on the quantized coefficients.

An inverse transform unit 205 applies to the reproduced frequency coefficients an inverse frequency transformation corresponding to the frequency transformation used by the transform unit, and generates a reproduced prediction error image.

A locally decoded image generation unit 206 adds an encoding block prediction image to a reproduced prediction error image to generate a locally decoded image.

The locally decoded image is stored in a decoded image storage unit 208, to be used in generating an inter prediction image in and after the next frame, and also used in generating an intra prediction image of the encoding target frame.

The quantized coefficients are entropy encoded by a quantized coefficient encoding unit 207, and encoding block entropy encoded data is generated for each encoding block.

FIG. 3 is an explanatory view of the operation of the transform unit 202 in FIG. 2. In FIG. 3, a Hadamard orthogonal transform basis 301 is an example of a transform used by the transform unit 202. The transform converts a 4-pixel image into four frequencies. The values of the coefficients of the pixels 0 through 3 of the basis of the frequency 0 are 0.5, 0.5, 0.5, and 0.5. The values of the coefficients of the pixels 0 through 3 of the basis of the frequency 1 are 0.5, 0.5, −0.5, and −0.5. Similarly, the values of the coefficients of the pixels 0 through 3 of the frequencies 2 and 3 are defined as with the Hadamard orthogonal transform basis 301.

The frequency transformation of the 4×4 block prediction error image can be realized by, for example, transforming the image vertically and horizontally in the Hadamard orthogonal transform. The vertical frequency transformation can be realized by expressing the matrix of a 4×4 image to be transformed, and multiplying the matrix by an Hadamard orthogonal transform matrix from the left. The horizontal transformation can be realized by multiplying the above-mentioned result by the transposed Hadamard orthogonal transform matrix from the right. As a result, frequency coefficients can be obtained for the 4×4 block prediction error image.

Figure 4:
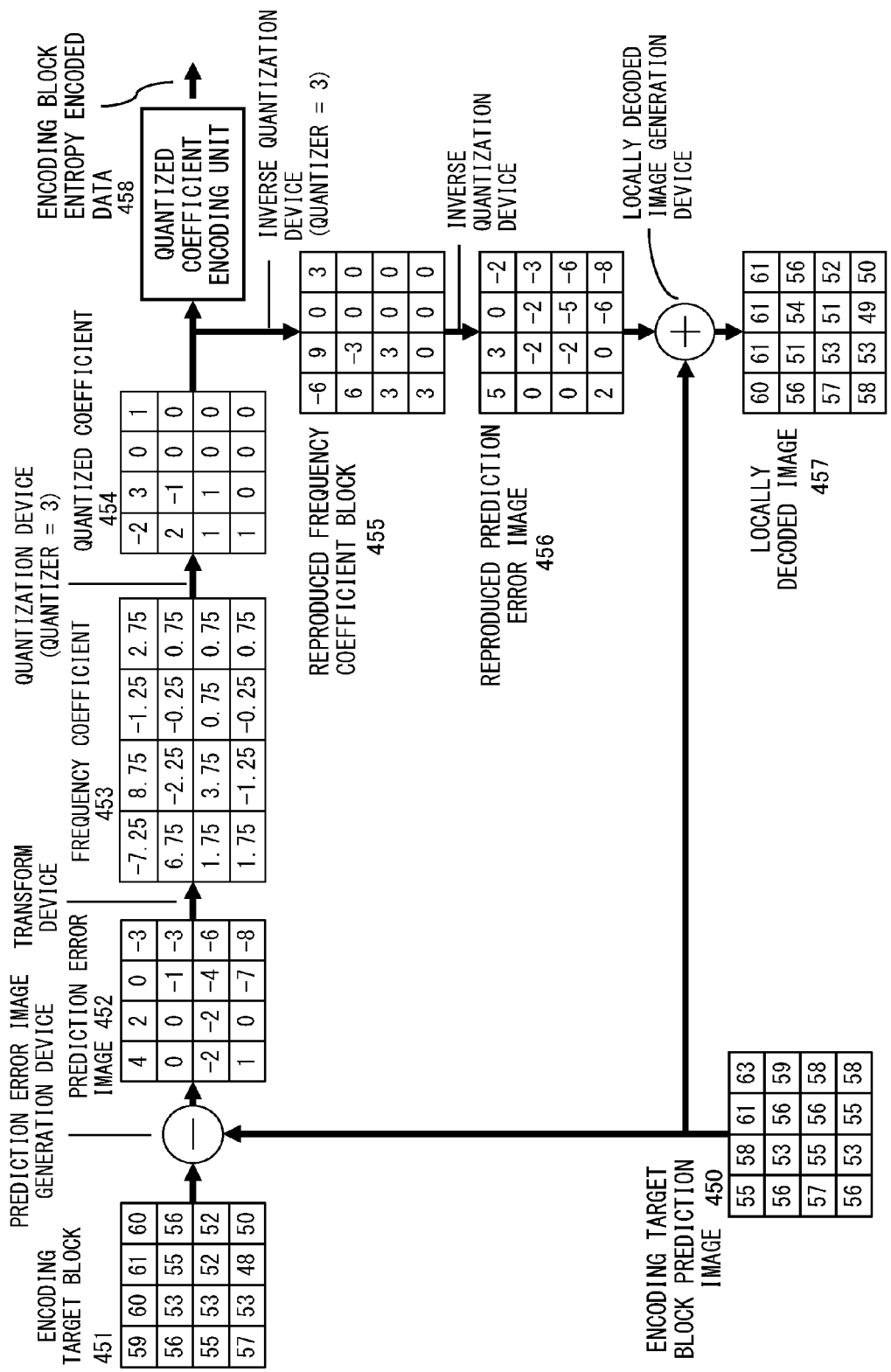
FIG. 4 is an example of a value of 4×4 blocks.

FIG. 4 is an explanatory view of the process operation of the encoding device illustrated in FIG. 2, and illustrates the change of the value of the data in the example of each pixel of the 4×4 block as an example of the process of a 4×4 block transformation. In this example, the Hadamard transform in FIG. 3 is used as a transform unit.

An encoding target block 451 corresponds to one of the 4×4 blocks 102 in FIG. 1, and includes 16 pixels. For the pixel value of the encoding target block (corresponding to the encoding block in FIG. 2) 451, for example, a pixel value of an encoding target block prediction image block 450 is generated from a previous frame or from a spatially adjacent image, the difference between the pixel values is calculated by the prediction error image generation unit, and the pixel value of a prediction error image block 452 is generated. The pixel value indicates the gray scale of each pixel.

The pixel values of the prediction error image block 452 of the 4×4 block are converted into a frequency by the Hadamard transform basis, and the value of a frequency coefficient block 453 is obtained. In FIG. 4, the horizontal direction of the frequency coefficient indicates the horizontal frequency component, the vertical direction indicates the vertical frequency component, the left and upper parts respectively indicate the low frequency of the horizontal and vertical components, and the right and lower parts respectively indicate the high frequency of the horizontal and vertical components.

The values of the frequency coefficient block 453 are quantized by the quantization unit. Generally, the quantization is performed by dividing a frequency coefficient by a constant which is a quantizer. The method of the quantization is performed by, for example, the following equation where f is each coefficient, Q is a quantizer, and C is a quantized coefficient.

$$C = \text{sign}(f) \cdot \text{int}(\text{abs}(f)/Q + 0.5) \quad \text{[Formula 1]}$$

In this equation, sign (x) is a function for returning 1 if x is positive, and −1 if x is negative. Also in this equation, int (x) is a function for truncating the decimal positions of x and obtaining an integer, and abs (x) is a function for returning an absolute value of x.

In the case of the example, a quantizer Q is 3. Therefore, the value of the frequency coefficient block 453 of the DC component is −7.25, and the calculation is performed.

$$C = \text{sign}(-7.25) \cdot \text{int}(\text{abs}(-7.25)/3 + 0.5) = (-1) \cdot 2 = -2 \quad \text{[Formula 2]}$$

The converted value of −2 is obtained as a quantized coefficient. The coefficients of other frequencies are similarly quantized, and the values of a quantized coefficient block 454 are obtained.

The quantized coefficient is converted by the quantized coefficient encoding unit into a value of an encoding block entropy encoded data block 458.

The quantized coefficient is further inverse quantized by an inverse quantization unit. The method of the inverse quantization is performed by, for example, multiplying the quantization coefficient by an inverse quantizer used in the quantization. That is, when C is quantized coefficient, Q is quantizer, and f' is reproduced frequency coefficient, the following equation holds.

$$f' = Q \cdot C \qquad \text{[Formula 3]}$$

According to the Formula 3, for example, since the value of the quantized coefficient block 454 of the DC component is −2, the following calculation is performed.

$$f' = 3 \cdot (-2) = -6 \qquad \text{[Formula 4]}$$

The value is converted into −6 as a reproduced frequency coefficient. The coefficients of other frequencies are similarly processed, and the values of a reproduced frequency coefficient block 455 are obtained.

The inverse transform unit inversely converts the reproduced frequency coefficient, and the pixel values of a reproduced prediction error image block 456 are generated. Then, the reproduced prediction error image is added to the pixel values of the encoding target block prediction image block 450 of the encoding target block by the locally decoded image generation unit, and the pixel values of a locally decoded image block 457 are generated. Each pixel value of the reproduced prediction error image block 456 is slightly different from corresponding pixel value of the prediction error image block 452.

Next, the method of encoding a quantized coefficient is described below. Generally, it can be said that the value of the low frequency of the coefficient which has been converted into a frequency is large. Therefore, there is a high probability that there is a quantized coefficient having a frequency lower than the quantizer for the higher frequency. According to the Formula 1, when the frequency coefficient is smaller than ½ of the quantizer, that is, smaller than Q/2, the quantized coefficient is 0. Practically, the value of the quantized coefficient block 454 in higher frequency region becomes 0.

Figure 5:
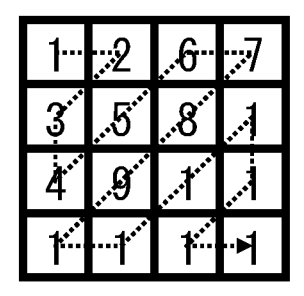

Based on the above-mentioned characteristic, when a quantized coefficient is encoded, the method of sorting the coefficients from low frequencies to high frequencies, and specifically encoding only non-zero coefficients are widely used in image encoding standards. The sorting order is generally referred to as zigzag scanning. FIG. 5 is an example of the zigzag scanning. The example indicates the sorting order of 16 quantized coefficients corresponding to 16 pixels forming one block (encoding target block 451) of 4×4 pixels, and the coefficients are sorted by zigzag scanning from lower frequencies to higher frequencies in the order of 1, 1, 3, . . . , 16 in FIG. 5.

FIG. 6 is an example of zigzag scanning the values of the quantized coefficient block 454 in FIG. 4, and converting the values into valid coefficient information.

The valid coefficients as non-zero coefficients are extracted, and the position information in the zigzag scanning, the absolute value of the valid coefficient, the sign information indicating a positive or negative state of the valid coefficient are obtained from the valid coefficients. In the example in FIG. 6, when the quantized coefficient is a positive value, 0 is assigned as sign information, and when it is a negative value, 1 is assigned. In the quantized coefficient in FIG. 6, the first number of the valid coefficients in the zigzag scanning has the valid coefficient position information of 1, the valid coefficient absolute value information of 2, and the valid coefficient sign information of 1. Similarly, the valid coefficient of the second number has the valid coefficient position information of 2, the valid coefficient absolute value information of 3, and the valid coefficient sign information of 0. Sequentially, the conversion is performed in the same manner, thereby obtaining the information on the table in FIG. 6.

Figure 7:
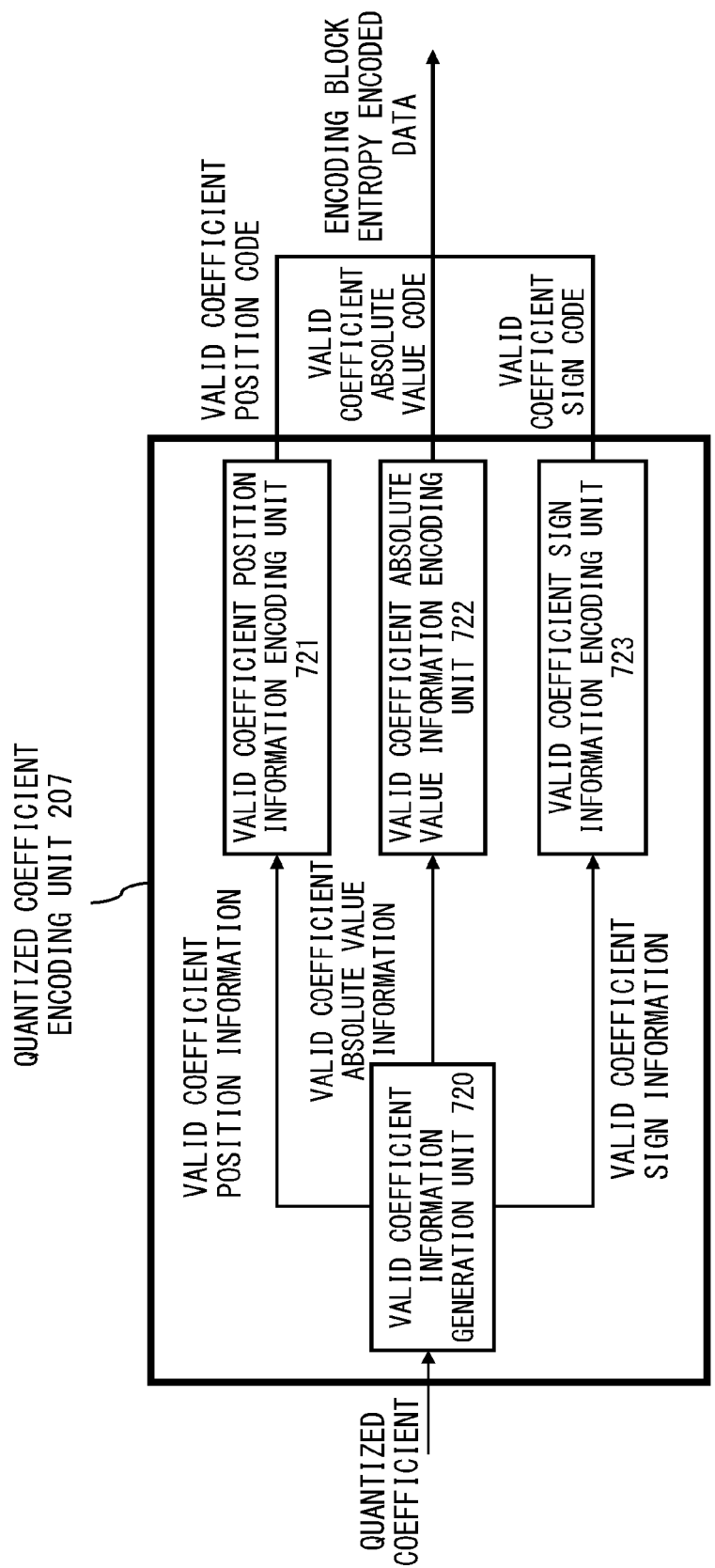
FIG. 7 illustrates a configuration of the quantized coefficient encoding unit in FIG. 2.

FIG. 7 illustrates a configuration of the quantized coefficient encoding unit 207 in FIG. 2.

First, the quantized coefficients are input in a block unit to the quantized coefficient encoding unit 207. Then, the valid coefficient position information, the valid coefficient absolute value information, and the valid coefficient sign information indicating a positive or negative as described above with reference to FIG. 6 are obtained by a valid coefficient information generation unit 720 from the input quantized coefficients. The valid coefficient position information is assigned the optimum entropy code by a valid coefficient position information encoding unit 721 based on the strong bias toward the coefficient at a lower frequency, and is efficiently encoded as a valid coefficient position code. Similarly, the coefficient absolute value information closer to the DC component easily indicates a larger value, and the information with a higher frequency easily indicates a smaller value, based on which a valid coefficient absolute value information encoding unit 722 assigns the optimum entropy code, thereby efficiently performing the encoding process as a valid coefficient absolute value code. For example, in the CABAC mode of the H.264, the optimum probability table is assigned to an arithmetic code depending on the position in the zigzag scanning of coefficients with the fact reflected that the lower frequency, the larger coefficient, and the higher frequency, the more hardly a coefficient is assigned.

On the other hand, relating to the valid coefficient sign information as a positive or negative code of a coefficient, positive and negative symbols occur at the substantially same probability of 0.5. Therefore, efficient encoding is not performed with any entropy code assigned. Accordingly, with all moving image encoding standard including the ITU-T H.261/H.263/H.264, the ISO/IEC MPEG-1, MPEG-2, MPEG-4, etc., 1-bit information is used for the valid coefficient sign information, and is output as a valid coefficient sign code from a valid coefficient sign information encoding unit 723. Then, the valid coefficient position code, the valid coefficient absolute value code, and the valid coefficient sign code are combined and output as encoding block entropy encoded data.

Figure 8:
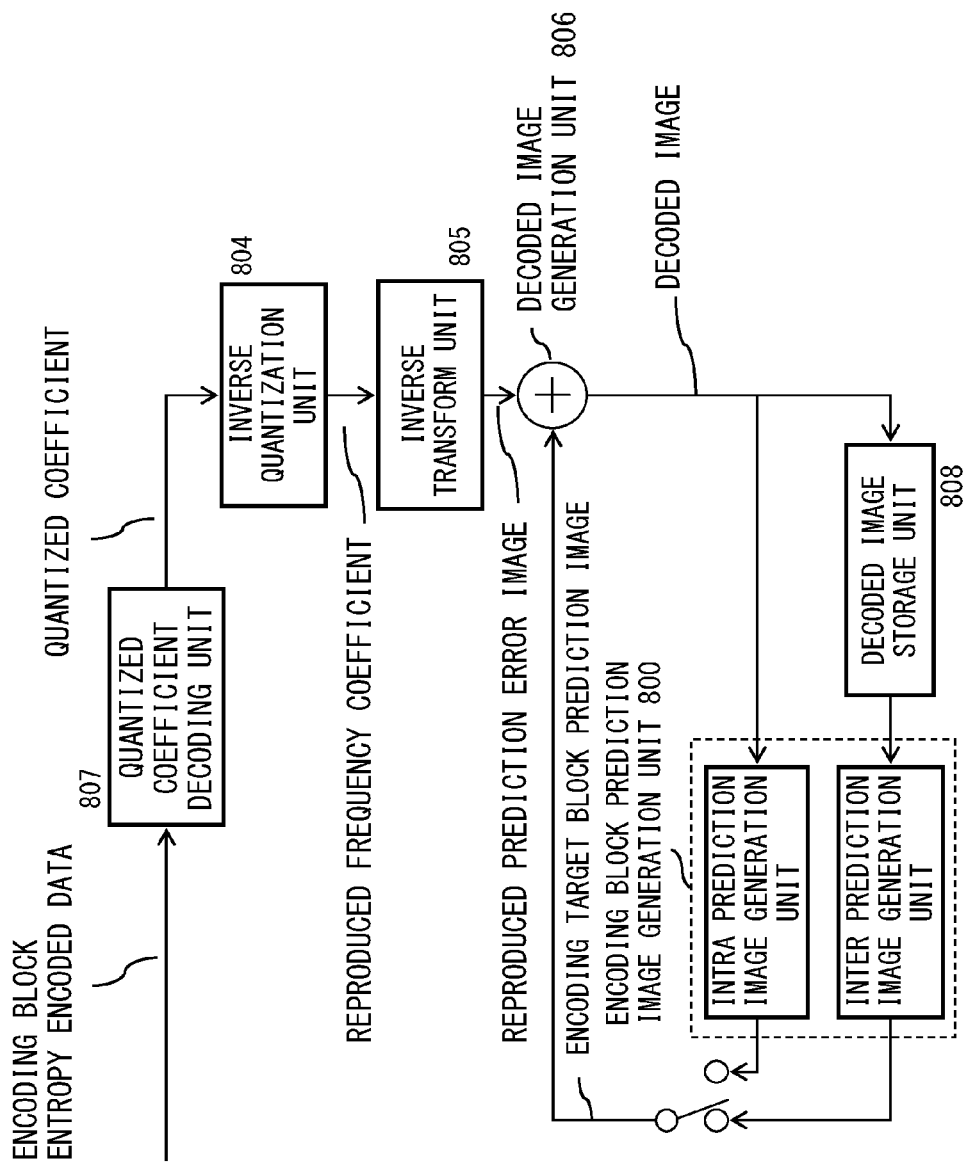
FIG. 8 illustrates a configuration of the image decoding device corresponding to FIG. 2.

FIG. 8 illustrates a configuration of the image decoding device corresponding to FIG. 2.

First, a quantized coefficient decoding unit 807 performs inverse entropy encoding on the encoding block entropy encoded data to obtain the quantized coefficient, then an inverse quantization unit 804 performs inverse quantization as with the encoder, an inverse transform unit 805 performs an inverse transformation, and a reproduced prediction error image is generated. Then, an encoding block prediction image generation unit 800 generates an encoding block prediction image, a decoded image generation unit 806 adds the encoding target block prediction image to the reproduced prediction error image to generate a decoded image. Then, the decoded image is stored in a decoded image storage unit 808, and output for display.

In the moving image encoding process, the locally decoding unit of the encoding device and a part of the decoding device perform substantially the same operation. That is, the inverse quantization unit 804, the inverse transform unit 805, the encoding block prediction image generation unit 800, the decoded image generation unit 806, and the decoded image storage unit 808 in the decoding device in FIG. 8 perform substantially the same operations as the inverse quantization unit 204, the inverse transform unit 205, the encoding block prediction image generation unit 200, the locally decoded image generation unit 206, and the decoded image storage unit 208 in the encoding device in FIG. 2.

As described above, generally 1 bit is to be used in each coefficient for the sign information indicating a positive or negative valid quantized coefficient. Since the sign information occupies 10 percent or more of the amount of information about all target images, it is necessary to reduce the volume of the sign information to realize a further improvement in compression rate.

In each of the embodiments described below, considering the fact that the pixel adjacent to the boundary pixel of the block to be encoded is similar to the pixel to be encoded in the pixels included in the decoded blocks, a prediction value of the valid coefficient sign information is generated, and the matching state between the prediction value and the actual sign information is encoded, thereby efficiently encoding the sign information.

Generally, the existence of a quantized coefficient indicates the difference between an original image and a prediction image, that is, the accuracy of the prediction image is low.

It is generally known that, in an image, spatially adjacent pixels have similar values. Therefore, it is expected that the values of the boundary pixels adjacent to the encoded block in the encoding target block are similar to the values of the pixels adjacent to the encoding target block in the encoded block. Therefore, the value of the boundary pixel of the original image in the encoding target block can be estimated from the pixel adjacent to the encoding target block in the encoding block.

Similarly, the difference between the original image and the prediction image in the boundary pixel of the encoding block can also be estimated from the pixel adjacent to the encoding target block in the encoded block and the prediction image. Assume that the estimation value of the difference in the boundary pixel is a boundary pixel prediction error estimation value.

Therefore, it is expected that the boundary pixel value in the reproduced prediction error obtained by inversely quantizing and transforming the quantized coefficient corresponding to the encoding target block is close to the boundary pixel prediction error estimation value. If the absolute value and the position (frequency) are known about the quantized coefficient, the set of the sign information of each coefficient whose boundary pixel of the reproduced prediction error image is close to the boundary pixel prediction error estimation value is limited. Therefore, the sign information of each coefficient whose boundary pixel of the reproduced prediction error image is the closest to the boundary pixel prediction error estimation value is a prediction value having preferable sign information about each of the practical coefficients. When a preferable prediction value is obtained, the sign information can be efficiently encoded.

In each of the embodiments below, an estimation value of the prediction error of the boundary pixel adjacent to the encoded block in the encoding block is obtained from the locally decoded image of the encoded block for which the encoding process has been completed before encoding the block adjacent to the encoding block, and from the encoding block prediction image as a prediction value of the encoding block. Next, the set of sign information for generation of the reproduced prediction error closest to the estimation value of the prediction error in the sets of sign information common to all valid coefficients under the conditions that the absolute value and the position (frequency) of the valid coefficient are known, is defined as a sign information prediction value of the valid coefficient. Then, "matching"/"non-matching" information is generated as the information (matching information) about whether or not the sign information prediction value about the valid coefficient matches the sign information about the actual valid coefficient, and the matching information is entropy encoded. Thus, an encoding device for efficiently encoding the sign information and a decoding device for decoding the entropy code encoded by the encoding device are realized. The higher the accuracy of the sign information prediction value of the valid coefficient is, the higher the probability of the "matching" result as the matching information becomes. Generally, in the entropy encoding, the higher the occurrence probability of a specific symbol is, the more efficiently the encoding process is performed. Therefore, while it is generally necessary to assign 1 bit to one piece of sign information, the entropy encoding can be efficiently performed with less than 1 bit by encoding the matching information about the sign information.

Figure 9:
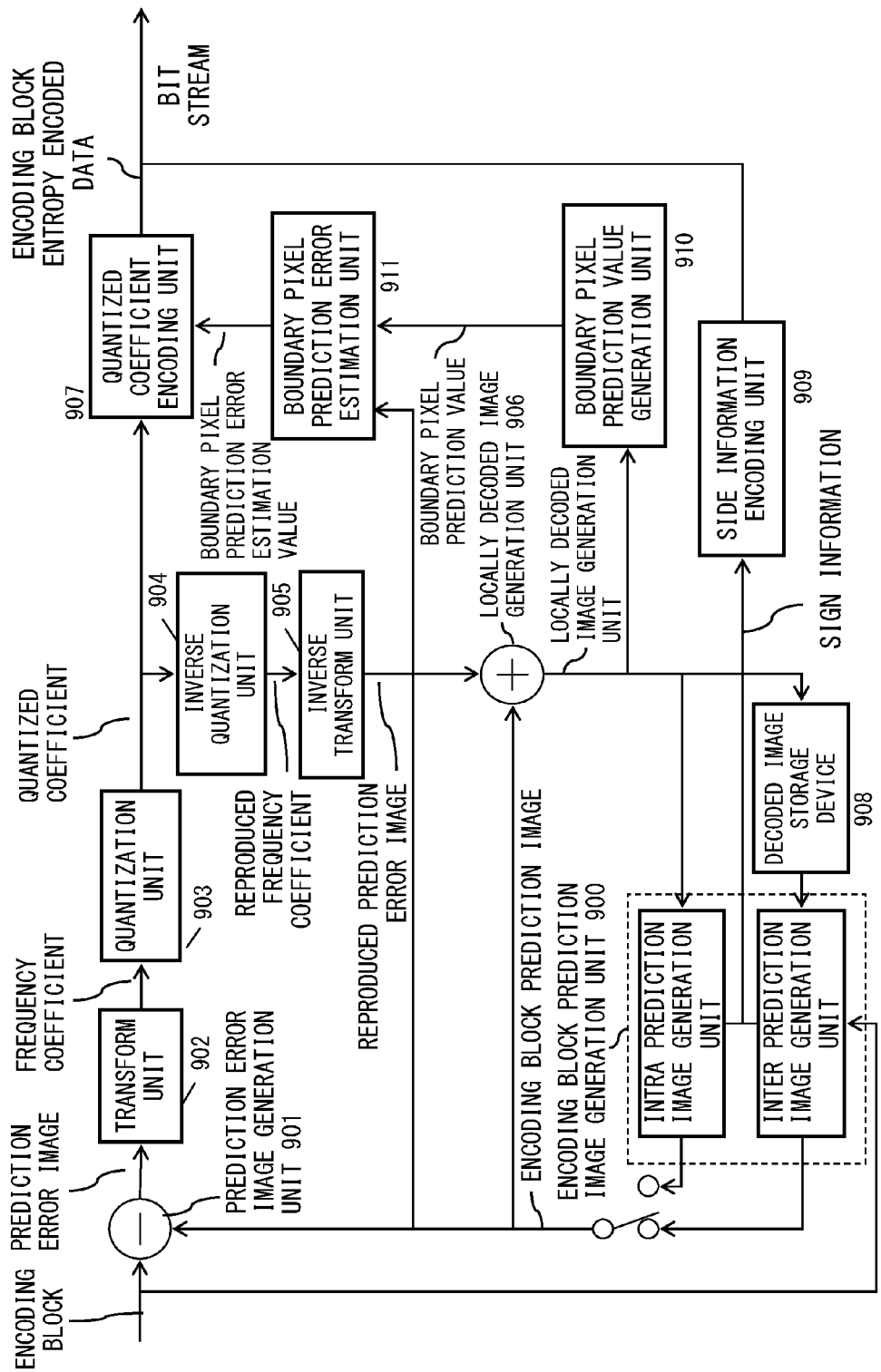
FIG. 9 illustrates the encoding device according to the first embodiment.

FIG. 9 illustrates the encoding device according to the first embodiment. The first embodiment relates to a moving image encoding device for dividing an encoding target image into a plurality of block images, and encoding each encoding block.

In the first embodiment, as with the encoding device in FIG. 2, quantized coefficients and a locally decoded image are generated from a prediction image and a encoding block as a encoding target block.

That is, an encoding block prediction image generation unit 900 generates an encoding block prediction image as a prediction value of the encoding block. Next, a prediction error image generation unit 901 generates a prediction error image as a difference between the encoding block and the encoding block prediction image. Then, a transform unit 902 transforms the prediction error image into frequency coefficients. Furthermore, a quantization unit 903 quantizes the frequency coefficients to generate quantized coefficients.

An inverse quantization unit 904 inversely quantizes the quantized coefficients to generate reproduced frequency coefficients. An inverse transform unit 905 inversely transforms the reproduced frequency coefficients into a reproduced prediction error image. A locally decoded image generation unit 906 generates a locally decoded image from the reproduced prediction error image and the encoding block prediction image.

A boundary pixel prediction value generation unit 910 generates a boundary pixel prediction value as a prediction value of the boundary pixel adjacent to the encoded block in the encoding block from the locally decoded images of a plurality of encoded blocks adjacent to the encoding block.

A boundary pixel prediction error estimation unit 911 generates a boundary pixel prediction error estimation value as a difference between the value of the boundary pixel in the encoding target block prediction pixels and the boundary pixel prediction value for the boundary pixel from the boundary pixel prediction value and the encoding block prediction image.

Finally, using the quantized coefficient and the boundary pixel prediction error estimation value (boundary pixel prediction error estimation information), a quantized coefficient encoding unit 907 generates encoding block entropy encoded data.

Figure 10:
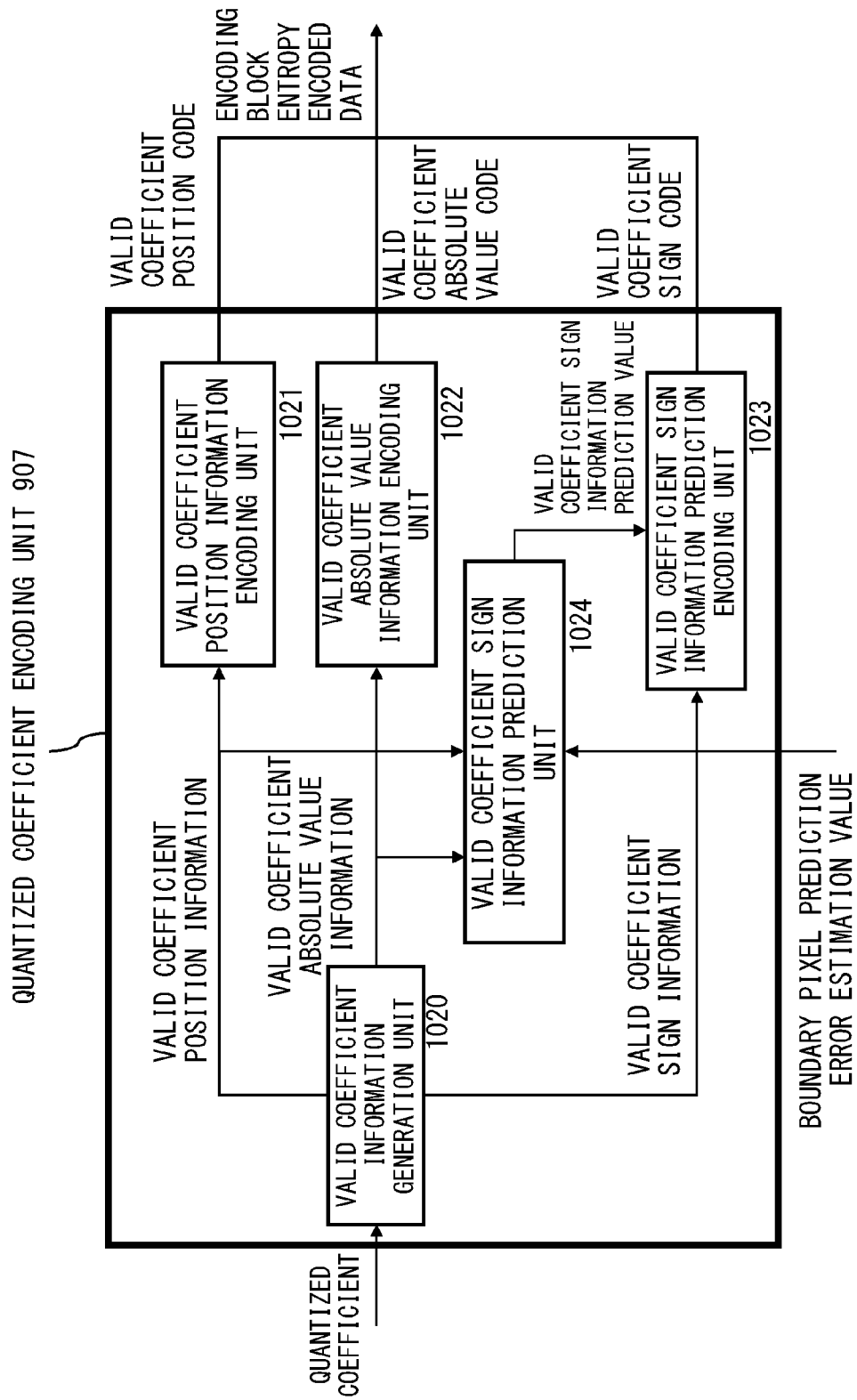
FIG. 10 illustrates a configuration of the quantized coefficient encoding unit in FIG. 9 according to the first embodiment.

FIG. 10 illustrates a configuration of the quantized coefficient encoding unit 907 in FIG. 9 according to the first embodiment.

The quantized coefficient encoding unit 907 first extracts with a valid coefficient information generation unit 1020 a non-zero quantized coefficient as a valid coefficient from the quantized coefficients, and generates the valid coefficient position information indicating the frequency position of the valid coefficient, the valid coefficient absolute value information about the absolute value of the valid coefficient, and the valid coefficient sign information indicating the positive/negative sign of the valid coefficient. The operation is substantially the same as that of the valid coefficient information generation unit 720 in FIG. 7.

The valid coefficient sign information prediction unit 1024 generates a valid coefficient sign information prediction value as a prediction value of the sign information indicating whether the valid coefficient is positive or negative from the boundary pixel prediction error estimation value, the valid coefficient position information, and the valid coefficient absolute value information. The valid coefficient for generation of the valid coefficient sign information prediction value can be all valid coefficients of the encoding block, or apart of the valid coefficients selected based on a specified rule. The configuration of generating a valid coefficient sign information prediction value for only apart of the valid coefficients selected based on the specified rule is described in detail in the fourth through sixth embodiments.

A valid coefficient position information encoding unit 1021 entropy encodes the valid coefficient position information to generate a valid coefficient position code. A valid coefficient absolute value encoding unit 1022 entropy encodes the valid coefficient absolute value information to generate a valid coefficient absolute value code. The valid coefficient position information encoding unit 1021 and the valid coefficient absolute value encoding unit 1022 correspond to the valid coefficient position information encoding unit 721 and the valid coefficient absolute value information encoding unit 722 in FIG. 7, respectively.

A valid coefficient sign information prediction encoding unit 1023 entropy encodes the sign prediction value matching information indicating whether or not the valid coefficient sign information prediction value matches the sign information about the valid coefficient to generate a valid coefficient sign code. Then, encoding block entropy encoded data is generated from the valid coefficient position code, the valid coefficient absolute value code, and the valid coefficient sign code.

According to the first embodiment, a high accuracy prediction value about the valid coefficient sign information can be generated from the valid coefficient position information, the valid coefficient absolute value information, a prediction image, and a decoded image. As a result, most of the matching information indicating whether or not the prediction value has matched the valid coefficient sign information indicates "matching", and the volume of the sign information can be reduced by entropy encoding the matching information.

Figure 11:
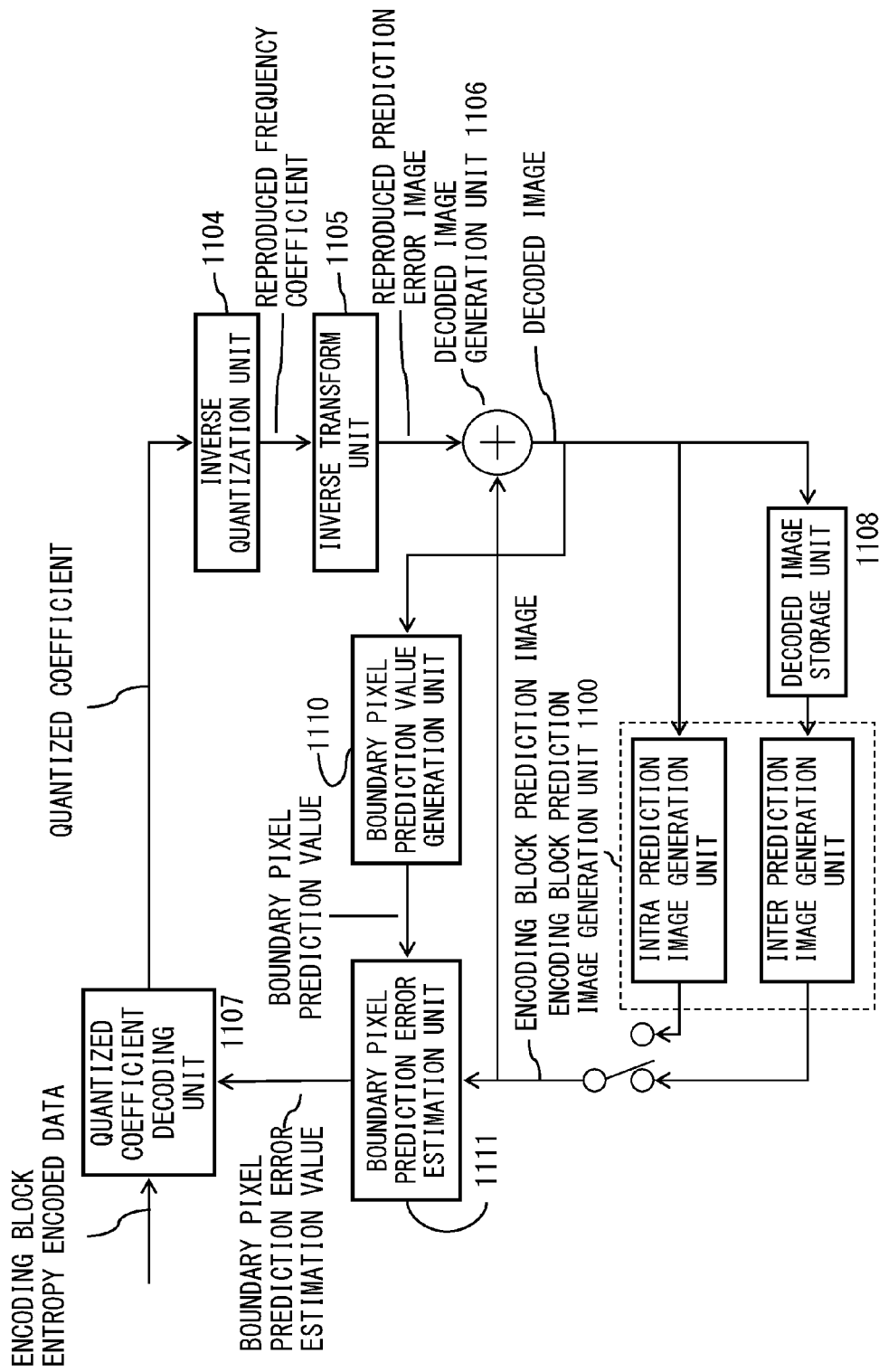
FIG. 11 illustrates the decoding device according to the second embodiment.

FIG. 11 illustrates the decoding device according to the second embodiment. The moving image decoding device according to the second embodiment decodes each block of the encoding block entropy encoded data encoded by the moving image encoding device in FIG. 9.

In the second embodiment, as with the decoding device in FIG. 8, a decoded image is generated from the encoding block entropy encoded data. That is, an encoding block prediction image generation unit 1100 generates an encoding block prediction image as a prediction value of an encoding block. A quantized coefficient decoding unit 1107 decodes the quantized coefficient from the bit stream and the boundary pixel prediction error estimation value. The quantized coefficient is inversely quantized by an inverse quantization unit 1104 to generate a reproduced frequency coefficient. An inverse transform unit 1105 inversely transforms the reproduced frequency coefficient into a reproduced prediction error image, and a decoded image generation unit 1106 generates a decoded image from the reproduced prediction error image and the encoding block prediction image.

Next, a boundary pixel prediction value generation unit 1110 generates a boundary pixel prediction value as a prediction value of the boundary pixel adjacent to the encoded block in the encoding blocks from the decoded image of a plurality of encoded blocks.

Then, a boundary pixel prediction error estimation unit 1111 generates a boundary pixel prediction error estimation value for the boundary pixel from the boundary pixel prediction value and the encoding block prediction image, inputs the resultant value into the quantized coefficient decoding unit 1107. The quantized coefficient decoding unit 1107 generates, as described above, a quantized coefficient from the encoding block entropy encoded data and the boundary pixel prediction error estimation value.

Figure 12:
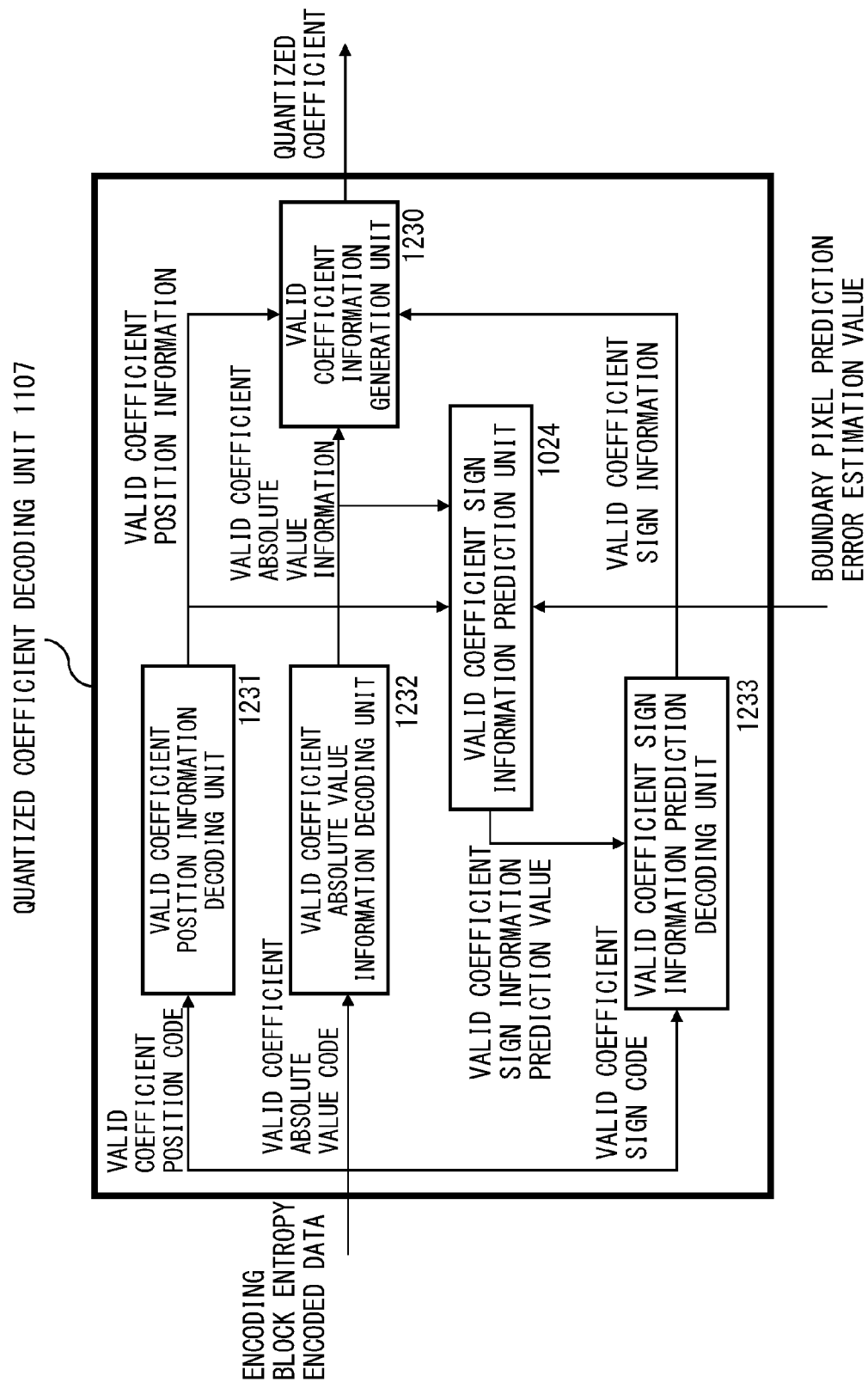
FIG. 12 illustrates a configuration of the quantized coefficient decoding unit in FIG. 11 according to the second embodiment.

FIG. 12 illustrates a configuration of the quantized coefficient decoding unit 1107 in FIG. 11 according to the second embodiment.

A valid coefficient position information decoding unit 1231 retrieves a valid coefficient position code from the encoding block entropy encoded data, and decodes the valid coefficient position information as the frequency position of the valid coefficient of the encoding block.

A valid coefficient absolute value information decoding unit 1232 retrieves a valid coefficient absolute value code from the encoding block entropy encoded data, and decodes the valid coefficient absolute value information as an absolute value of the valid coefficient of the encoding block.

The valid coefficient sign information prediction unit 1024 generates a valid coefficient sign information prediction value as a prediction value of the sign information indicating whether a valid coefficient is positive or negative from the boundary pixel prediction error estimation value, the valid coefficient position information, and the valid coefficient absolute value information. The valid coefficient sign information prediction unit 1024 in FIG. 12 is substantially the same as the valid coefficient sign information prediction unit 1024 in FIG. 10 of the encoding device according to the first embodiment.

A valid coefficient sign information prediction decoding unit 1233 decodes and outputs the valid coefficient sign information as the sign information about the valid coefficient according to the valid coefficient sign information prediction value and the sign prediction value matching information decoded from the valid coefficient sign information of the encoding block entropy encoded data. In this example, when the sign prediction value matching information indicates "matching", the sign information about the valid coefficient sign information prediction value is output, and when the information indicates "non matching", the sign information with the positive/negative code inverse to the valid coefficient sign information prediction value is output.

Finally, a quantized coefficient of the block is generated from the valid coefficient absolute value information, the valid coefficient position information, and the valid coefficient sign information. The quantized coefficient is processed in the same method as the decoding device in FIG. 8 to generate a decoded image.

According to the second embodiment, the encoding block entropy encoded data which has been encoded according to the first embodiment and whose volume of sign information has been reduced can be decoded.

Figure 13:
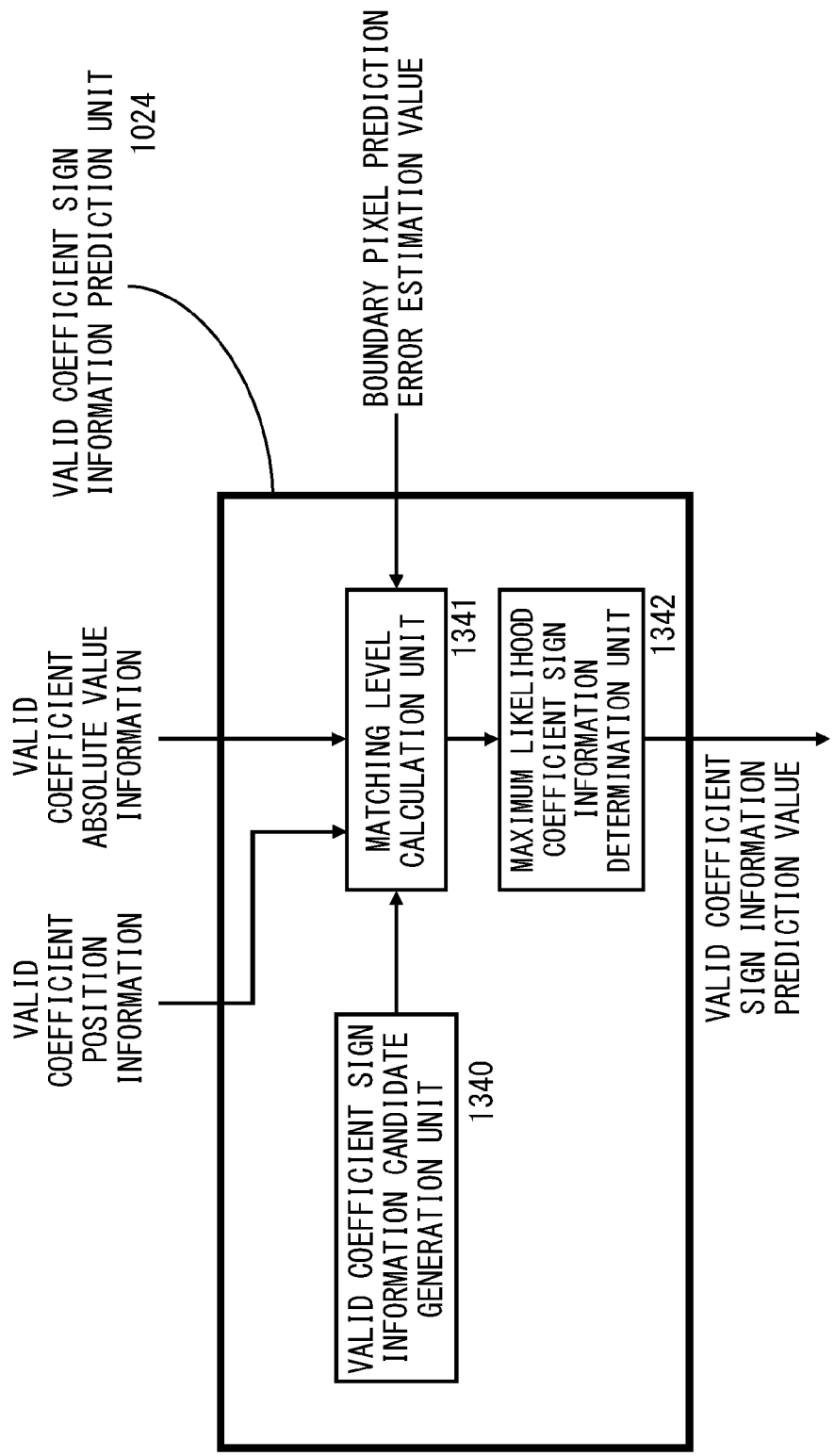
FIG. 13 illustrates a valid coefficient sign information prediction unit in the first and second embodiments.

FIG. 13 illustrates a valid coefficient sign information prediction unit 1024 common between the first and second embodiments. The valid coefficient sign information prediction value is obtained as follows. First, a valid coefficient sign information candidate generation unit 1340 generates a combination of plural pieces of sign information in which a positive or negative code of the valid coefficient sign information for each valid coefficient is provisionally assigned to the coefficient provided by the valid coefficient position information and the valid coefficient absolute value information in the encoding block. It is defined as a valid coefficient sign information candidate. Since the sign information indicating the code of each valid coefficient is one of two candidates, that is, positive or negative, for example, the maximum number of combinations of $2^N$ can be considered.

A matching level calculation unit 1341 calculates the matching level between the reproduced prediction error signal obtained from each valid coefficient sign information candidate, the valid coefficient position information, and the valid coefficient absolute value information and the above-mentioned boundary pixel prediction error estimation value. A maximum likelihood coefficient sign information determination unit 1342 outputs the valid coefficient sign information candidate having the highest matching level as a valid coefficient sign information prediction value. There is a high probability that the valid coefficient sign information prediction value matches the valid coefficient sign information. Thus, by encoding the difference between the valid coefficient sign information and its prediction value, there is a high probability that a "matching" symbol is output, and the volume of the valid coefficient sign information can be reduced by performing the optimum entropy encoding.

Figure 14:
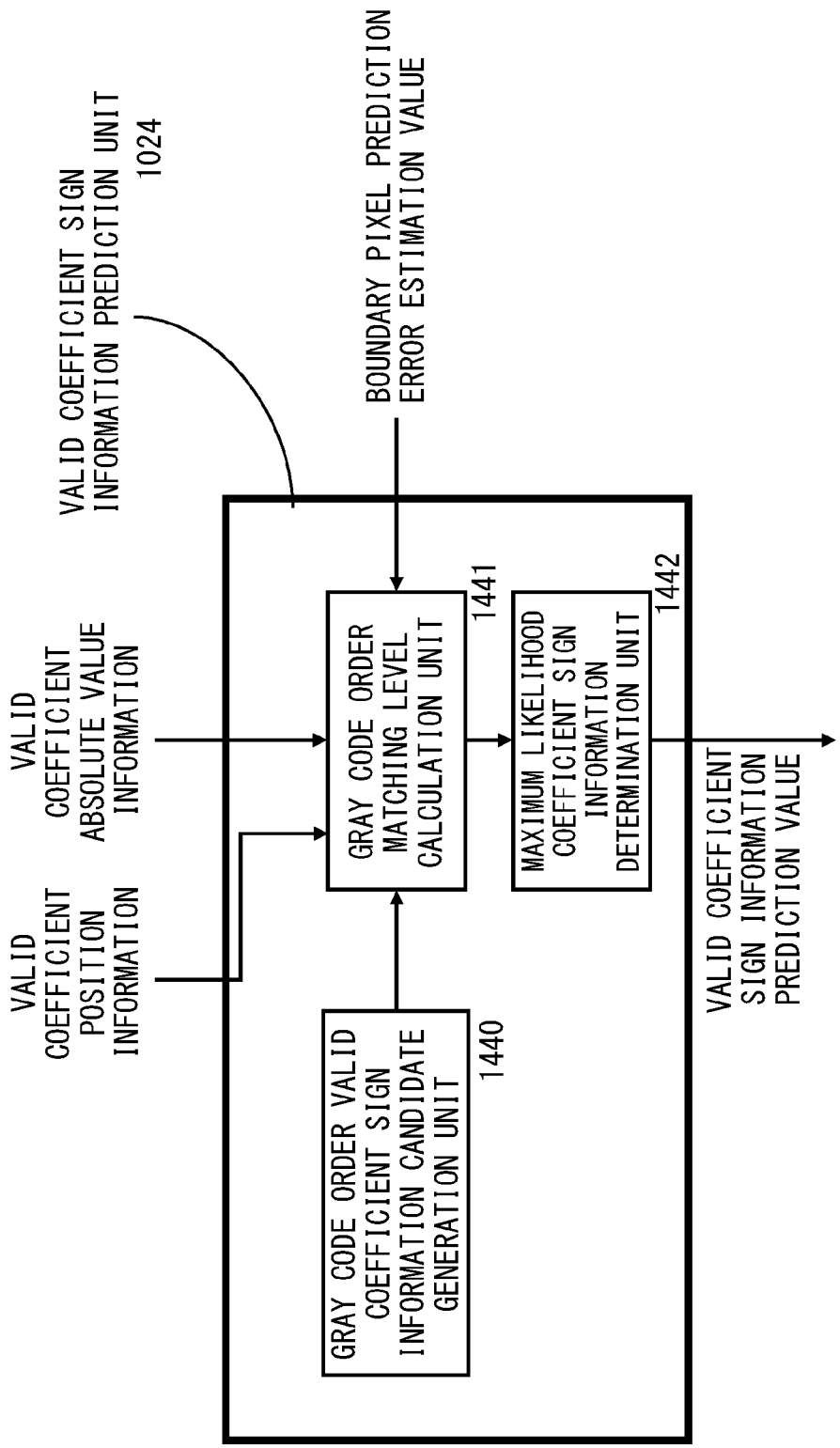
FIG. 14 illustrates another valid coefficient sign information prediction unit in the third embodiment.

FIG. 14 illustrates the third embodiment as another embodiment of the valid coefficient sign information prediction unit 1024 (FIGS. 10 and 12) according to the first and second embodiments.

The valid coefficient sign information prediction value is obtained as follows. First, a Gray code order valid coefficient sign information candidate generation unit 1440 generates a combination of plural pieces of sign information in which a positive or negative code of the valid coefficient sign information for each valid coefficient is provisionally assigned to the coefficient provided by the valid coefficient position information and the valid coefficient absolute value information of the encoding block so that the combination corresponds to 0/1 of each bit position of the Gray code. In this example, the technology described in U.S. Pat. No. 2,632,058 is called a Gray code as it is popularly called so. Since a Gray code indicates at most one different code in two consecutive codes, a valid coefficient sign information candidate indicating only one different sign code of the valid coefficient from immediately previous valid coefficient sign information candidate can be generated by processing the valid coefficient sign information candidate in the Gray code order.

When the cost of the matching level is calculated by a Gray code order matching level calculation unit 1441, a valid coefficient having a different code is specified between a target valid coefficient sign information candidate and immediately previous valid coefficient sign information candidate. Next, from the change of the code of the valid coefficient, the influence on the process of calculating the cost of the matching level is obtained. Then, by considering only the change in the process of calculating the cost of the matching level, the difference between the cost of the matching level of the target valid coefficient sign information candidate and the cost of the matching level of immediately previous valid coefficient sign information candidate is obtained. Furthermore, by adding the difference to the cost of the matching level of the immediately previous valid coefficient sign information candidate, the cost of the matching level of the target valid coefficient sign information candidate is obtained.

Finally, a maximum likelihood coefficient sign information determination unit 1442 outputs the valid coefficient sign information candidate having the highest matching level as a valid coefficient sign information prediction value.

According to the third embodiment, only the difference in cost of the matching level is obtained from the valid coefficient sign information whose code has been changed without calculating the cost of the matching level each time, and the obtained value is reflected on the cost of the matching level of the immediately previous candidate, thereby successfully reducing the computational complexity.

Generally, 1-bit information is required for one valid coefficient as the sign information. On the other hand, according to the first through third embodiments, the valid coefficient sign information prediction unit generates a signal for encoding whether or not the prediction value matches the actual value using the prediction value of the sign information of the valid coefficient. According to each embodiment, the sign information about the valid coefficient of a high prediction accuracy is generated. As a result, there is a high probability that the sign information matches its prediction value. Generally, with the entropy code, the encoding process can be performed more efficiently with a biased occurrence probability of a symbol. By performing appropriate entropy encoding, the matching information can be encoded with less than one bit per symbol on an average. Thus, the volume of the sign information can be reduced by performing appropriate entropy encoding on the sign information matching information.

Figure 15:
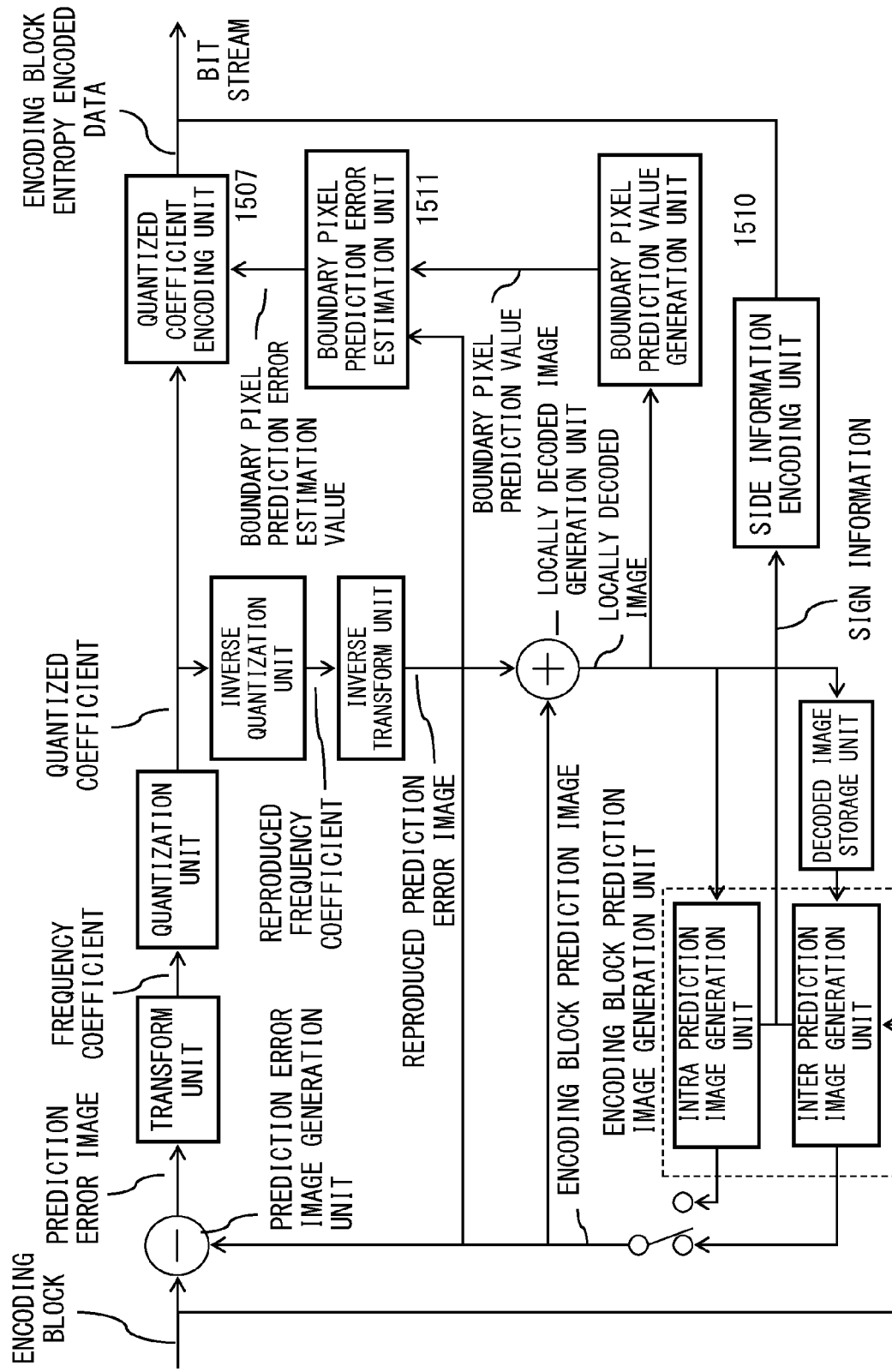
FIG. 15 illustrates the encoding device according to the fourth embodiment.

FIG. 15 illustrates the encoding device according to the fourth embodiment. The fourth embodiment illustrated in FIG. 15 is based on the first embodiment illustrated in FIG. 9, and further discloses in detail a quantized coefficient encoding unit 1507, a boundary pixel prediction error estimation unit 1511, and a boundary pixel prediction value generation unit 1510. The quantized coefficient encoding unit 1507, the boundary pixel prediction error estimation unit 1511, and the boundary pixel prediction value generation unit 1510 correspond to the quantized coefficient encoding unit 907, the boundary pixel prediction error estimation unit 911, and the boundary pixel prediction value generation unit 910 in FIG. 9, respectively. In FIG. 15, each unit having the same name in FIG. 9 performs substantially the same process.

The fourth embodiment exemplifies encoding the blocks having the values of the encoding target block 451 and the encoding target block prediction image block 450 using the transform unit, the quantization unit, the inverse quantization unit, the inverse transform unit, and the local decode generation unit equivalent to those in FIG. 4. Since these operations performed by these units are common to general schemes, the quantized coefficients obtained in FIG. 15 are the same as the quantized coefficient 454 in FIG. 4. The locally decoded image in FIG. 15 is the same as the locally decoded image 457 in FIG. 4. In the fourth embodiment, the boundary pixel prediction value generation unit 1510, the boundary pixel prediction error estimation unit 1511, and the quantized coefficient encoding unit 1507 are described in detail.

Figure 16:
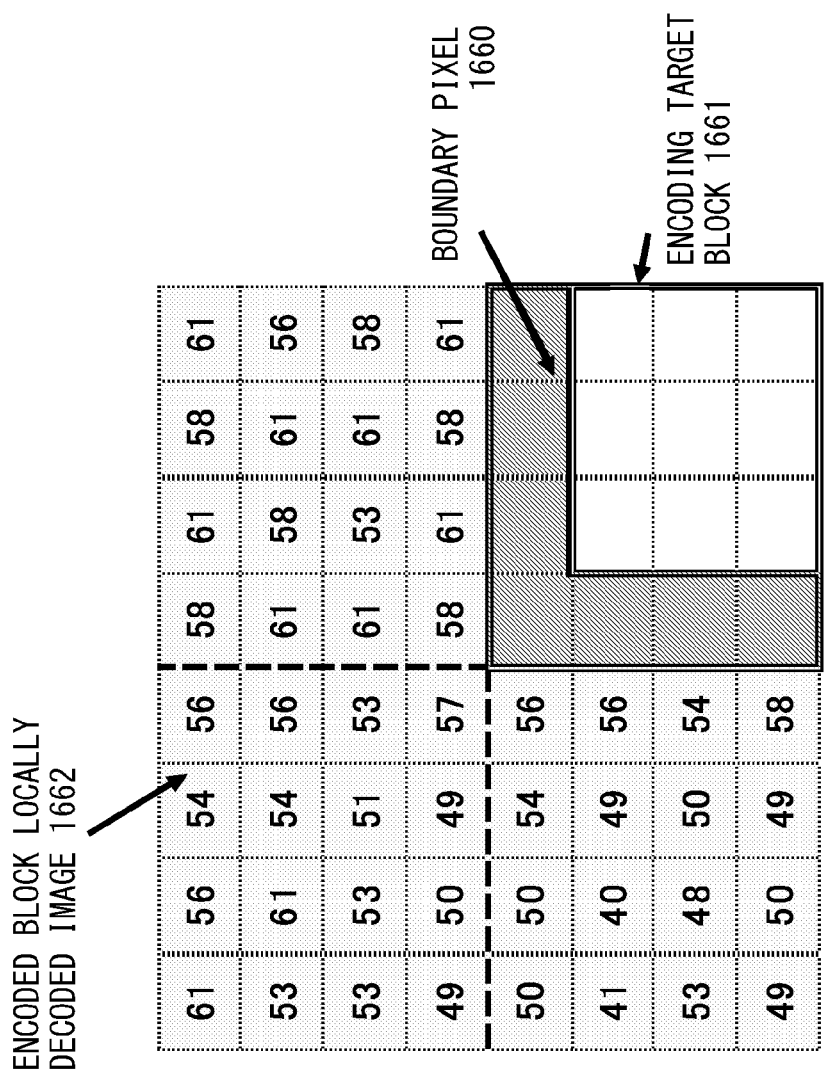
FIG. 16 is an example of a boundary pixel of the encoding target block according to the fourth embodiment.

FIG. 16 is an example of a boundary pixel of the 4×4 encoding target block 1661 (encoding block) when the base size of 4×4 in the orthogonal transformation in the H.264 etc. is used according to the fourth embodiment. Generally, the moving image encoding process is performed in a block unit in the order from upper left to lower right. Therefore, the encoding process is completed on the left and upper blocks to the encoding block before encoding the encoding block. When the encoding blocks are encoded, a block on which the encoding process has been completed is called an encoded block (1662). In this case, the pixels on the upper edge and left edge of the encoding block contact the encoded block. Therefore, the uppermost and leftmost pixels in the encoding target block in FIG. 16 are defined as boundary pixels 1660.

Figure 17:
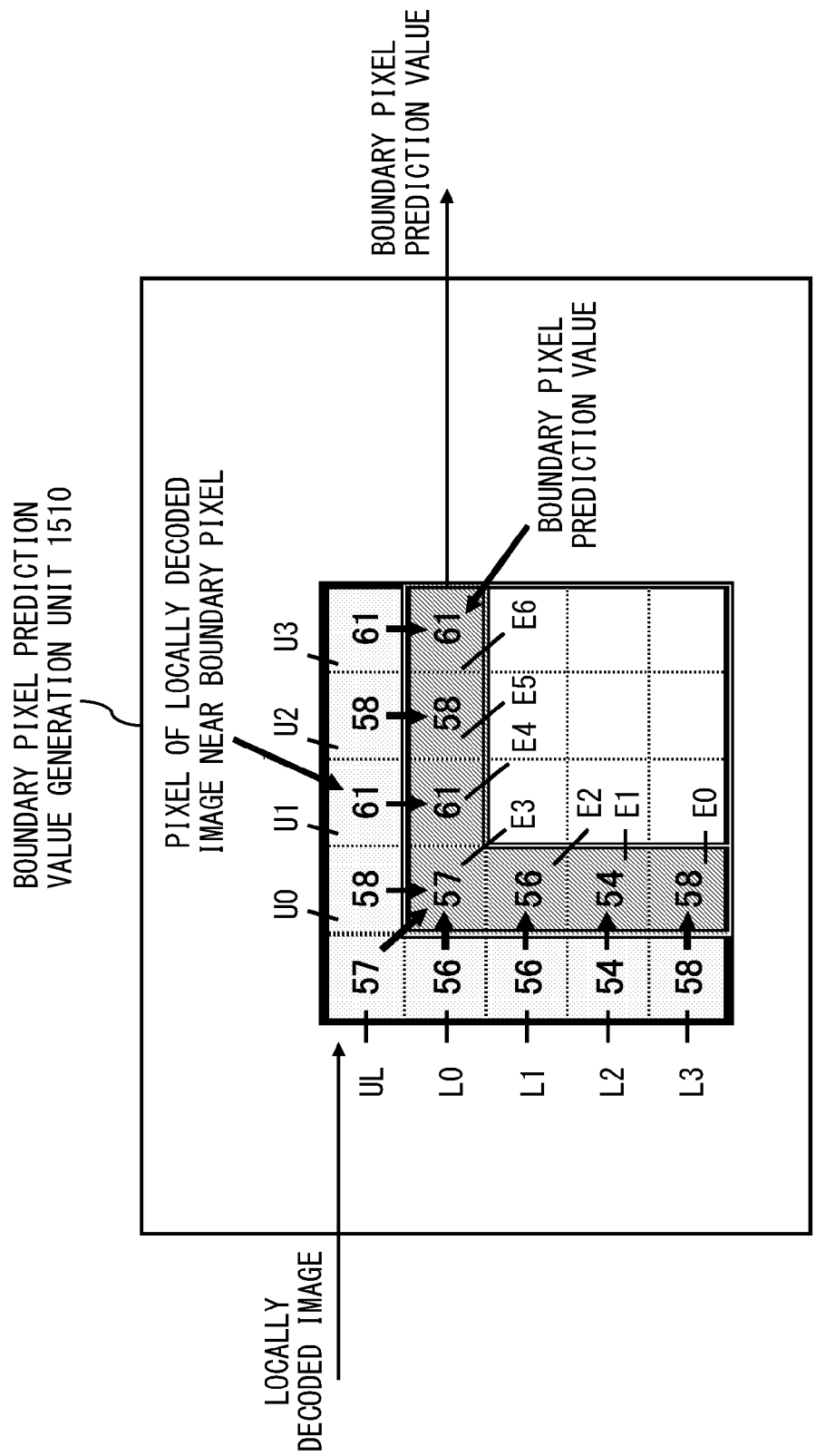
FIG. 17 is an explanatory view of the process of the boundary pixel prediction value generation unit according to the fourth embodiment.

FIG. 17 is an explanatory view of the process of the boundary pixel prediction value generation unit 1510 according to the fourth embodiment. The locally decoded images near the boundaries at the left, upper left, and upper sides of the encoding block are input to the boundary pixel prediction value generation unit 1510, and a boundary pixel prediction value is generated. In FIG. 17, the pixels of the encoded block of the locally decoded image in contact with the boundary pixels are the same as in FIG. 16. In FIG. 17, with respect to the pixels of the input locally decoded image, assume that the pixels in contact with the left side of the image are L0 through L3, the pixels in contact with the upper side of the image are U0 through U3, the pixel in contact with the upper left corner is UL. Also assume that the boundary pixel prediction values of the boundary pixels of the encoding block are E0, E1, E2, E3, E4, E5, and E6 from the lower left to the upper right in order.

In the fourth embodiment, the boundary pixel prediction values E0 through E6 are obtained by the following equations from the pixels L0 through L3, U0 through L3, and UL of the locally decoded image in the encoded block near the boundary pixels.

$$E0=L3$$

$$E1=L2$$

$$E2=L1$$

$$E3=(L0+UL+U0)/3$$

$$E4=U1$$

$$E5=U2$$

$$E6=U3$$

Then, the boundary pixel prediction values are output.

In the example of the fourth embodiment, the value of the nearest pixel is used as is, or after obtaining the average value, but the method of predicting the pixel in the pixel adaptive DPCM encoding etc. using a plurality of pixels near the pixel to be predicted can also be used in generating a boundary pixel prediction value as disclosed by the above specified non-patent document 1.

FIG. 18 is an example of realizing the boundary pixel prediction error estimation unit 1511 according to the fourth embodiment. In this example, a boundary pixel prediction error estimation value is generated from the boundary pixel prediction value generated as illustrated in FIG. 17 and the value of the encoding target block prediction image 450 in FIG. 4. The boundary pixel prediction values E0 through E6 are the boundary pixel prediction values of the boundary pixels of the encoding block corresponding to FIG. 17. The pixels P0 through P6 are the values of the boundary pixels of the encoding block prediction image. The pixels D0 through D6 are the boundary pixel prediction error estimation values. In this example, n indicates the value of 0 through 6, and the boundary pixel prediction error estimation value of each pixel is obtained by the following equation.

$$Dn=En-Pn$$

For example, for the pixel D3, the value of 2 is obtained by subtracting 55 as the value of the pixel P3 from 57 as the value of the pixel E3.

Figure 19:
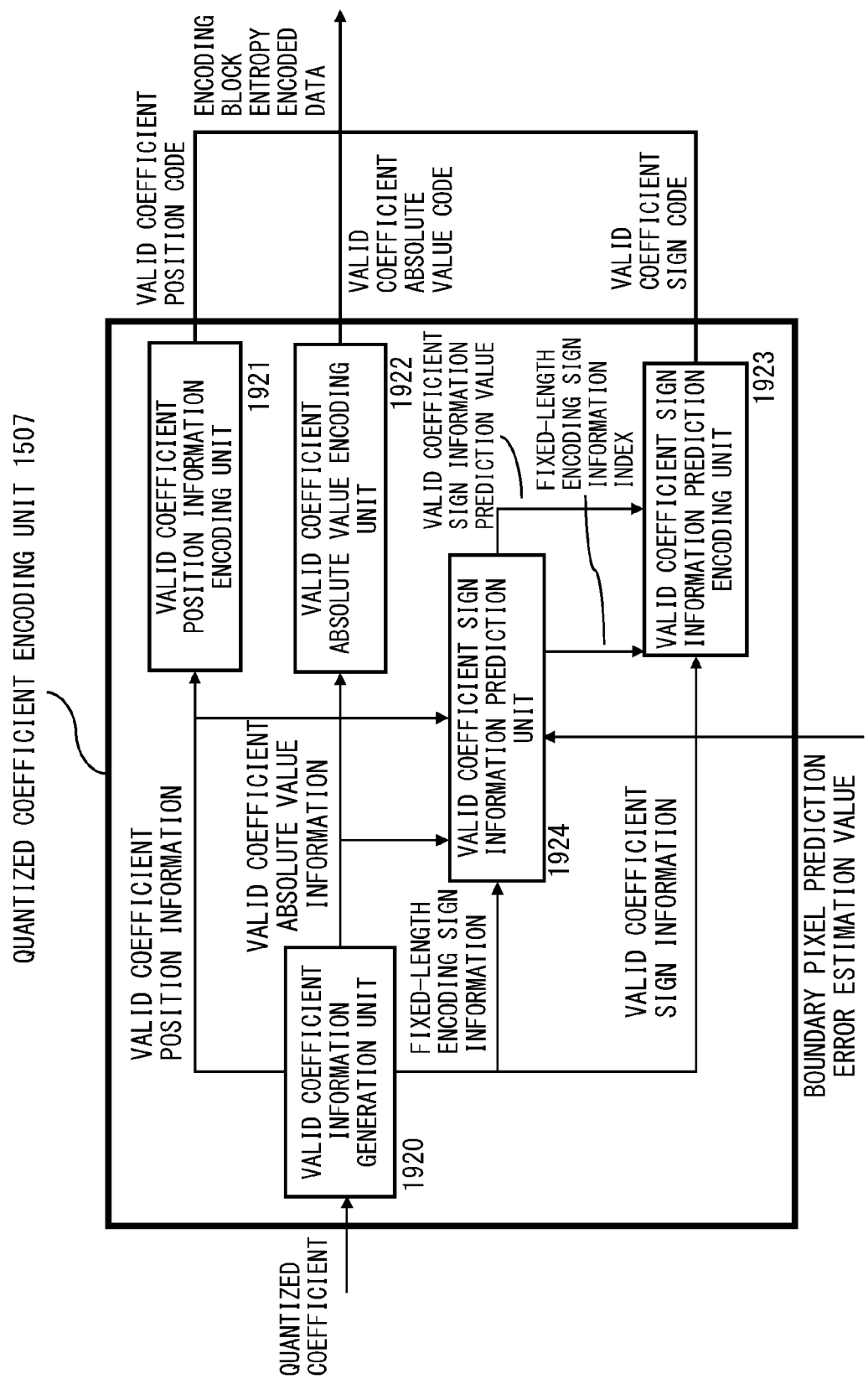
FIG. 19 illustrates the quantized coefficient encoding unit according to the fourth embodiment.

FIG. 19 illustrates an example of the quantized coefficient encoding unit 1507 according to the fourth embodiment. In this example, all valid coefficients are not used, but coefficients using a valid coefficient sign information prediction value are selected, and a combination of a coefficient prediction encoded using a sign information prediction value and a coefficient using a common 1-bit fixed-length code is exemplified.

In the quantized coefficient encoding unit 1507, a valid coefficient information generation unit 1920 first extracts a non-zero quantization coefficient as a valid coefficient from quantized coefficients, and generates valid coefficient position information indicating the frequency position of the valid coefficient, valid coefficient absolute value information indicating an absolute value of the valid coefficient, and valid coefficient sign information indicating whether the valid coefficient is positive or negative. When the quantized coefficient block 454 in FIG. 4 is input to the quantized coefficient encoding unit 1507, the values of the valid coefficient position information, the valid coefficient absolute value information, and the valid coefficient sign information are equivalent to those in FIG. 6.

A valid coefficient sign information prediction unit 1924 first determines the valid coefficient for prediction encoding the sign information using a valid coefficient sign information prediction value, and the valid coefficient for encoding the sign information using a fixed-length encoding, according to the valid coefficient position information and the valid coefficient absolute value information, and outputs an index (fixed-length encoding sign information index) of the valid coefficient for encoding the sign information using the fixed-length encoding.

Then, with respect to the valid coefficient for prediction encoding the sign information using the valid coefficient sign information prediction value, a valid coefficient sign information prediction value as a prediction value of the sign information indicating whether each coefficient is positive or negative is generated according to the sign information of the valid coefficient corresponding to the fixed-length encoding sign information index, the boundary pixel prediction error estimation value, the valid coefficient position information, and the valid coefficient absolute value information.

A valid coefficient position information encoding unit 1921 entropy encodes the valid coefficient position information to generate a valid coefficient position code. A valid coefficient absolute value encoding unit 1922 entropy encodes valid coefficient absolute value information to generate a valid coefficient absolute value code.

Finally, a valid coefficient sign information prediction encoding unit 1923 encodes valid coefficient sign information. First, the valid coefficient sign information indicated by the fixed-length encoding sign information index is encoded using fixed-length encoding. For other valid coefficients, a valid coefficient sign code is generated by entropy encoding the sign information matching information as to whether or not the valid coefficient sign information prediction value has matched the sign information about the valid coefficient.

Then, the valid coefficient position code, the valid coefficient absolute value code, and the valid coefficient sign code are combined to generate encoding block entropy encoded data.

FIG. 20 illustrates an example of the valid coefficient sign information prediction unit 1924 according to the fourth embodiment.

A valid coefficient sign information candidate generation unit 2040 generates a plurality of combinations of sign information in which a positive or negative code of the valid coefficient sign information to each valid coefficient is assigned to the coefficient provided by the valid coefficient position information and the valid coefficient absolute value information in the encoding block. It is defined as a valid coefficient sign information candidate. Since the sign information indicating the code of each valid coefficient is one of two candidates, that is, positive or negative, for example, the maximum number of combinations of $2^N$ can be considered.

A matching level calculation unit 2041 includes a valid coefficient sorting unit 2070, a quantized coefficient provisional value generation unit 2071, a boundary pixel prediction error provisional value generation unit 2072, and a prediction error matching level calculation unit 2073.

The valid coefficient sorting unit 2070 sorts valid coefficients using the valid coefficient position information and the valid coefficient absolute value information about the encoding block. The sorting operation is performed in order from the valid coefficient which is expected to have higher accuracy in generated valid coefficient sign information prediction value to the valid coefficient having lower accuracy. When the number of valid coefficients is large, the coefficient to be encoded by a valid coefficient sign information prediction value using a prediction value may be selected from among those having high accuracy.

The quantized coefficient provisional value generation unit 2071 applies the code of each valid coefficient sign information candidate to the valid coefficient sorted and selected by the valid coefficient sorting unit 2070, and generates a quantized coefficient provisional value as a provisional value of the quantized coefficient for each valid coefficient sign information candidate.

The boundary pixel prediction error provisional value generation unit 2072 generates a boundary pixel prediction error provisional value as a prediction error provisional value of the boundary pixel for each valid coefficient sign information candidate by inversely quantizing and inversely transforming the generated quantized coefficient provisional value and selecting only a boundary pixel The prediction error matching level calculation unit 2073 calculates the matching level between the boundary pixel prediction error provisional value generated for each valid coefficient sign information candidate and the boundary pixel prediction error estimation value.

Then, a maximum likelihood coefficient sign information determination unit 2042 outputs as a valid coefficient sign information prediction value the valid coefficient sign information candidate having the highest matching level generated by the prediction error matching level calculation unit 2073. Since the difference between the valid coefficient sign information prediction value and the valid coefficient sign information generated from the quantized coefficient of the frequency coefficient of the prediction error image of the encoding target block of an original image is small, the difference is encoded by the valid coefficient sign information prediction encoding unit 1923 as illustrated in FIG. 19, thereby obtaining an entropy encoded valid coefficient sign code.

Figure 21:
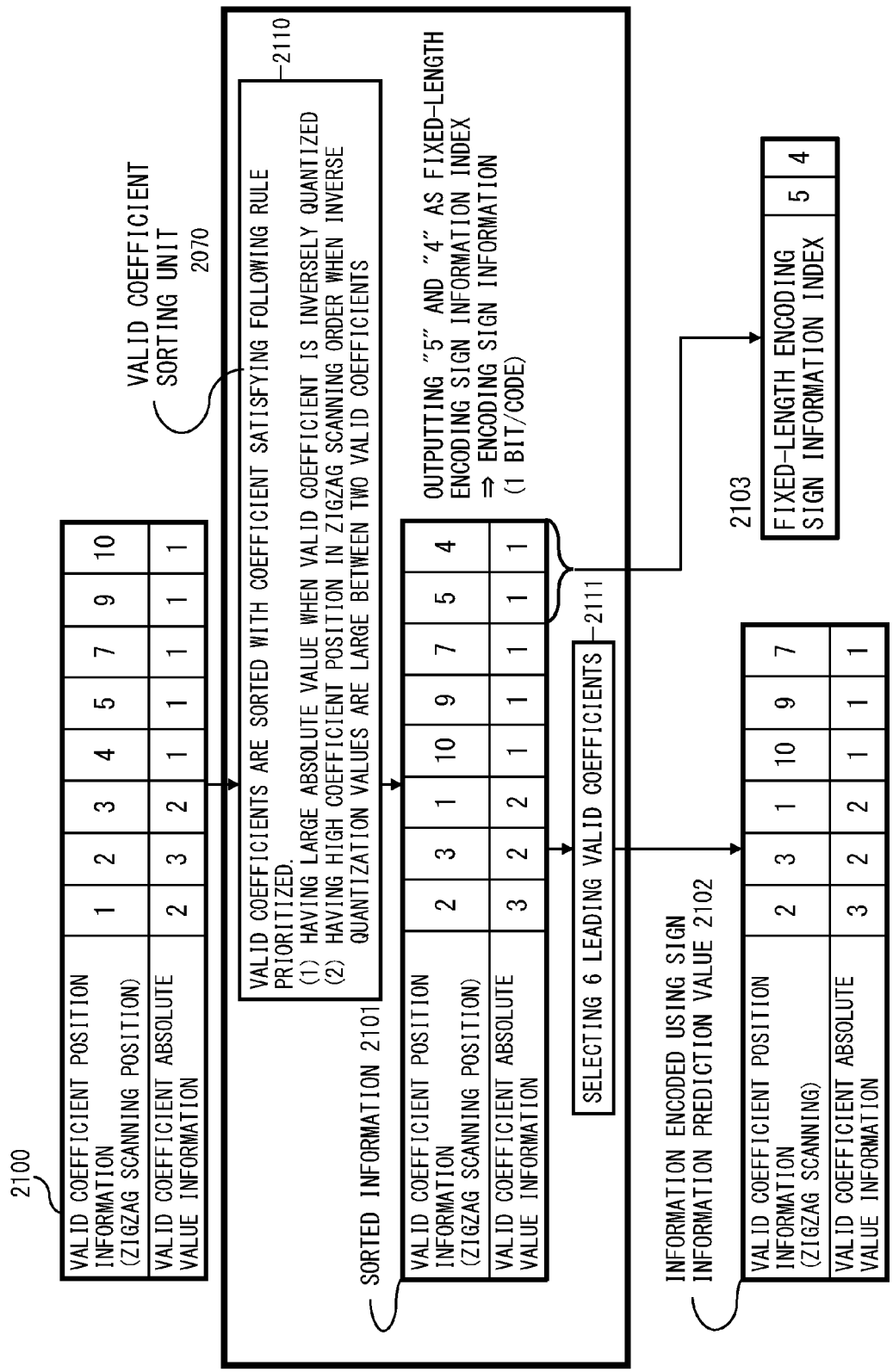
FIG. 21 illustrates the process of the valid coefficient sorting unit according to the fourth embodiment.

FIG. 21 illustrates an example of the process of the valid coefficient sorting unit 2070 according to the fourth embodiment. In this example, it is assumed that the input to the valid coefficient sorting unit 2070 is the same as the valid coefficient position information and the valid coefficient absolute value information about the encoding block in FIG. 6.

First, based on the input valid coefficient position information and valid coefficient absolute value information 2100, the coefficients are sorted by prioritizing what largely changes the matching level of the boundary pixel prediction error provisional value and the boundary pixel prediction error estimation value before and after the codes are inverted when the codes of the coefficients of the input information are inverted between positive and negative states because what largely changes the matching level indicates a high influence on the matching level, or high sensitivity, thereby allowing a user to expect that the accuracy of the valid coefficient sign information prediction value is also high.

In the fourth embodiment, assuming that the inversion of the positive/negative state of the code has a large influence on the matching level, a large valid coefficient absolute value is prioritized for the following reason. That is, the boundary pixel prediction error provisional value is obtained by acquiring the value obtained by multiplying the basis of the orthogonal transformation corresponding to the valid coefficient by an inversely quantized value for all valid coefficients, and the product is stored for a cumulative sum. Thus, the larger the valid coefficient absolute value is, the larger the influence on the boundary pixel prediction error provisional value becomes.

Although not illustrated with reference to the fourth embodiment, a different quantizer is used for each valid coefficient position corresponding to the valid coefficient in the H.264 etc. Therefore, the priority can be determined based on the value obtained by inversely quantizing the valid coefficient absolute value instead of the valid coefficient absolute value itself.

In addition, since it is considered that the more high frequency component the basis of the orthogonal transformation for the valid coefficient includes, the higher the influence on the code inversion becomes, a coefficient having a higher coefficient position in the zigzag scanning in a plurality of valid coefficients having equal values obtained by inversely quantizing the absolute values is prioritized. The second criterion does not have a large influence on the performance, but although there are the same inverse quantization values of two or more coefficients, it may be necessary to provide it for convenience in logically defining the priority.

Therefore, in the fourth embodiment, the valid coefficients are sorted in a sorting process 2110 according to the rule above, and the sorted valid coefficient position information and valid coefficient absolute value information 2101 are obtained.

When the number of valid coefficients is large, the number of valid coefficient sign information candidates increases exponentially, and the matching level calculation is to be frequently performed. Generally, when N coefficients are encoded by using a valid coefficient sign information prediction value, the number of valid coefficient sign information candidates is $2^N$. Therefore, in the four embodiment, 6 leading coefficients are selected from among the sorted coefficients in a selecting process 2111, and determined as coefficients to be encoded using the valid coefficient sign information prediction value. For the two remaining coefficients having 5 and 4 as the valid coefficient position information, the valid coefficient position information of 5 and 4 is output as fixed-length encoding sign information index 2103. These coefficients are encoded using a fixed-length code of 1 bit per code. Apart of valid coefficient sign information is encoded using a fixed-length code because the latter half of the coefficients in the sorted coefficients have low sensitivity in matching level, and the accuracy of the valid coefficient sign information prediction value is also low, thereby not efficiently reducing the volume of information although the encoding process is performed using a valid coefficient sign information prediction value, and exponentially increasing the number of valid coefficient sign information candidate when the number of coefficients using a sign information prediction value is infinitely increased.

Finally, 6 valid coefficients 2102 are output as the sorted coefficients using the valid coefficient sign information prediction value.

FIG. 22 illustrates an example of the process of the valid coefficient sign information candidate generation unit 2040 according to the fourth embodiment.

FIG. 22 is an example of generating valid coefficient sign information candidates for the 6 selected valid coefficients. The valid coefficients are illustrated in FIG. 22 using each piece of valid coefficient position information as an index. Since there are six coefficients, the number of combinations of the positive and negative values of sign information for the six coefficients is 64 as $2^6$. Therefore, the index of the valid coefficient sign information candidate is first prepared as 0 through 63, and the binary expression of the index is defined as a candidate for the sign information for each valid coefficient. The code for each valid coefficient sign information candidate is positive when the value is 0, and negative when it is 1. Valid coefficient sign information candidate indexes 2200 related to valid coefficient sign information candidates 2201 for the 64 valid coefficients are output to the quantized coefficient provisional value generation unit 2071.

In the fourth embodiment, since the valid coefficient sign information having the information in FIG. 6 is encoded, the index of the valid coefficient sign information candidate indicating a correct code is 8.

FIG. 23 illustrates an example of the process of the quantized coefficient provisional value generation unit 2071 according to the fourth embodiment.

Described in this example is the process of generating as a quantized coefficient provisional value each code of the valid coefficient sign information candidate 2201 in FIG. 22 corresponding to the valid coefficient sign information candidate index 2200 set in the coefficient for the valid coefficient absolute value information corresponding to each piece of valid coefficient position information. For example, valid coefficient sign information candidate indexes 0, in which all codes are positive, is generated as quantized coefficient provisional values. For the candidate indexes of 13, the coefficients having the valid coefficient position information of 2, 3, and 9 are assigned a positive code, and the coefficients having the valid coefficient position information of 1, 10, and 7 are assigned a negative code.

For the coefficients having the valid coefficient position information of 5 and 4, a fixed-length code is used as sign information, and therefore the original sign information of each coefficient is constantly and fixedly set. In this case, with reference to FIG. 6, the coefficient having the valid coefficient position of 5 is negative, it is constantly −1, and the coefficient having the valid coefficient position of 4 is positive, it is constantly 1.

Figure 24:
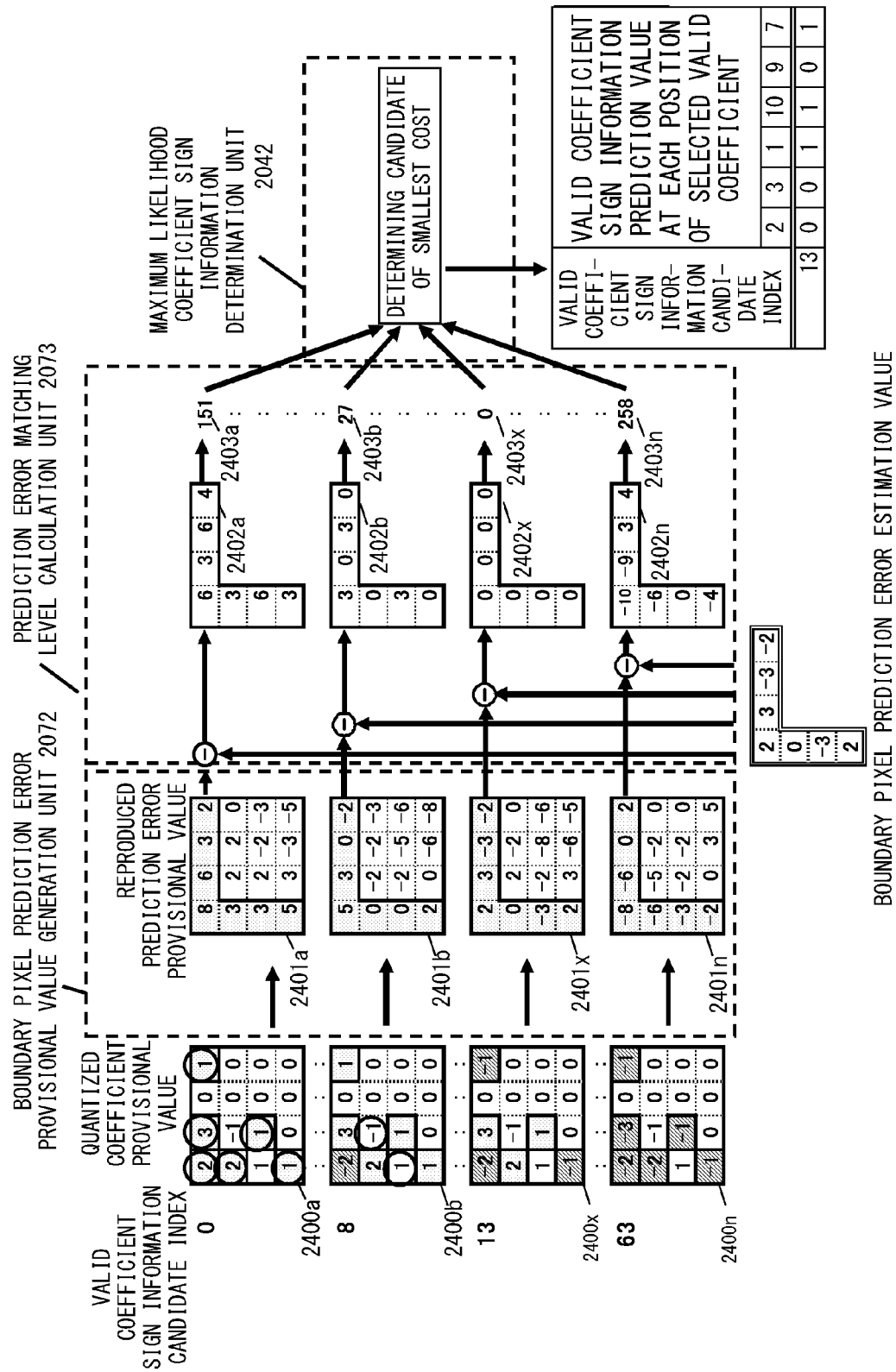
FIG. 24 is an example of the process of the boundary pixel prediction error provisional value generation unit, the prediction error matching level calculation unit, and the maximum likelihood coefficient sign information decision unit according to the fourth embodiment.

FIG. 24 illustrates an example of the process of the boundary pixel prediction error provisional value generation unit 2072, the prediction error matching level calculation unit 2073, and the maximum likelihood coefficient sign information determination unit 2042 according to the fourth embodiment.

First, the boundary pixel prediction error provisional value generation unit 2072 inversely quantizes and inversely transforms the quantized coefficient provisional values 2400$a$ through 2400$n$ generated for each valid coefficient sign information candidate equivalently as in the normal encoding process. For all quantized coefficient provisional values, a coefficient having an original code is set for the coefficient using no valid coefficient sign information prediction value of the valid coefficient position information of 5 and 4 illustrated in FIG. 21. Then, a boundary pixel is selected from among the inversely transformed values, and boundary pixel prediction error provisional values 2401$a$ through 2401$n$ are generated. As described above equivalently, not equally, the calculation does not necessarily require high accuracy, but a calculation may be performed with the accuracy reduced to reduce the computational complexity.

The prediction error matching level calculation unit 2073 generates differences 2402$a$ through 2402$n$ for each valid coefficient sign information candidate between the boundary pixel prediction error provisional values 2401$a$ through 2401$n$ and the boundary pixel prediction error estimation value generated by the boundary pixel prediction error estimation unit 1511, and each of the value is squared and a cumulative sum to obtain cost values 2403$a$ through 2403$n$ as a matching level. The smaller the cost value of the matching level is, the probability of the matching between the original valid coefficient sign information and the target valid coefficient sign information candidate becomes higher.

The maximum likelihood coefficient sign information determination unit 2042 collects the matching level (square error cost) 2403$a$ through 2403$n$ of each valid coefficient sign information candidate, and outputs the valid coefficient sign information corresponding to the valid coefficient sign information candidate index for providing a minimum cost as a valid coefficient sign information prediction value. That is, a reproduced prediction error provisional value is generated by performing the process of inverse quantization and frequency inverse transformation on each value of $2^6$ patterns added to each value of the leading 6 coefficients obtained by arranging the absolute values of the valid coefficients in the descending order and 64 4×4 blocks including two valid coefficients not included in the 6 leading coefficients from the valid coefficients (non-zero components in the quantized coefficient block) of the quantized coefficient of the frequency coefficient corresponding to the difference (prediction error) between the encoding target block and the encoding block prediction image, and the sign pattern corresponding to the boundary pixel whose reproduced prediction error provisional value is closest to the boundary pixel prediction error estimation value is defined as a valid coefficient sign information prediction value. Therefore, since the prediction value of the sign information about all valid coefficients in the block including the boundary pixel is obtained, the sign information about all pixels of the encoding target block can be entropy encoded.

In the case of the fourth embodiment, the valid coefficient sign information candidate having the valid coefficient sign information candidate index of 13 is output as a valid coefficient sign information prediction value.

Figure 25:
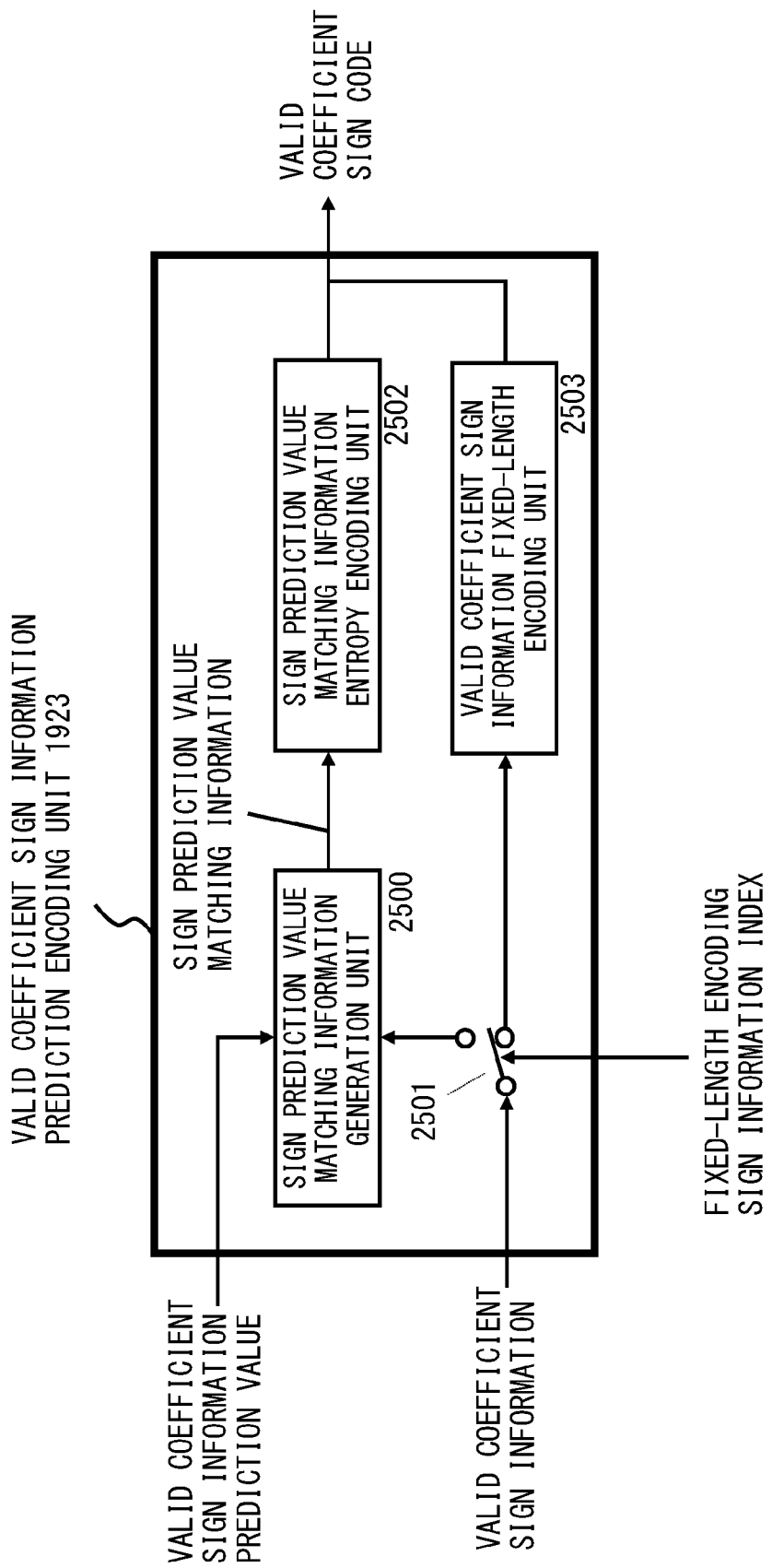
FIG. 25 illustrates the valid coefficient sign information prediction encoding unit according to the fourth embodiment.

FIG. 25 illustrates the valid coefficient sign information prediction encoding unit 1923 according to the fourth embodiment.

First, in the valid coefficient sign information, a switch 2501 selects the valid coefficient sign information for encoding sign information without using the valid coefficient sign information prediction value, that is, with a fixed-length using a fixed-length encoding sign information index. In the fourth embodiment, they are coefficients having the valid coefficient position information of 5 and 4 described with reference to FIG. 21. These pieces of valid coefficient sign information are encoded with a fixed-length coding using 1 bit information per coefficient by the valid coefficient sign information fixed-length encoding unit 2503. For example, the 1-bit code of "0" is assigned to the sign information with a positive code, and the 1-bit code of "1" is assigned to the sign information with a negative code. In the case of the coefficients in FIG. 21, the coefficient having the valid coefficient position information of 5 is negative, and the coefficient having the valid coefficient position information of 4 is positive as illustrated in FIG. 6. Therefore, the codes "1" and "0" are encoded, respectively. According to the fourth embodiment, a fixed-length code is exemplified, but the arithmetic encoding etc. for which the occurrence probability of a symbol of the positive/negative sign information is set to 0.5 can be used instead of a fixed-length code. The 1-bit fixed-length code and the arithmetic code when the occurrence probability of the positive and negative symbols is set to 0.5 are substantially equivalent. As an example of arithmetic encoding, the method disclosed in the above specified non-patent document 2 is applied. Furthermore, an example of arithmetic encoding for encoding the information having two symbols of occurrence probability of 0.5 is the Bypass encoding/decoding mode in the CABAC encoding of the moving image international standard ITU-TH.264, and these common techniques are applicable.

For the valid coefficient sign information which has been determined to be encoded using the valid coefficient sign information prediction value in switch 2501, a sign prediction value matching information generation unit 2500 generates the matching information as to whether or not the valid coefficient sign information prediction value matches the valid coefficient sign information.

A valid coefficient sign information entropy encoding unit 2502 entropy encodes the matching information.

Figure 26:
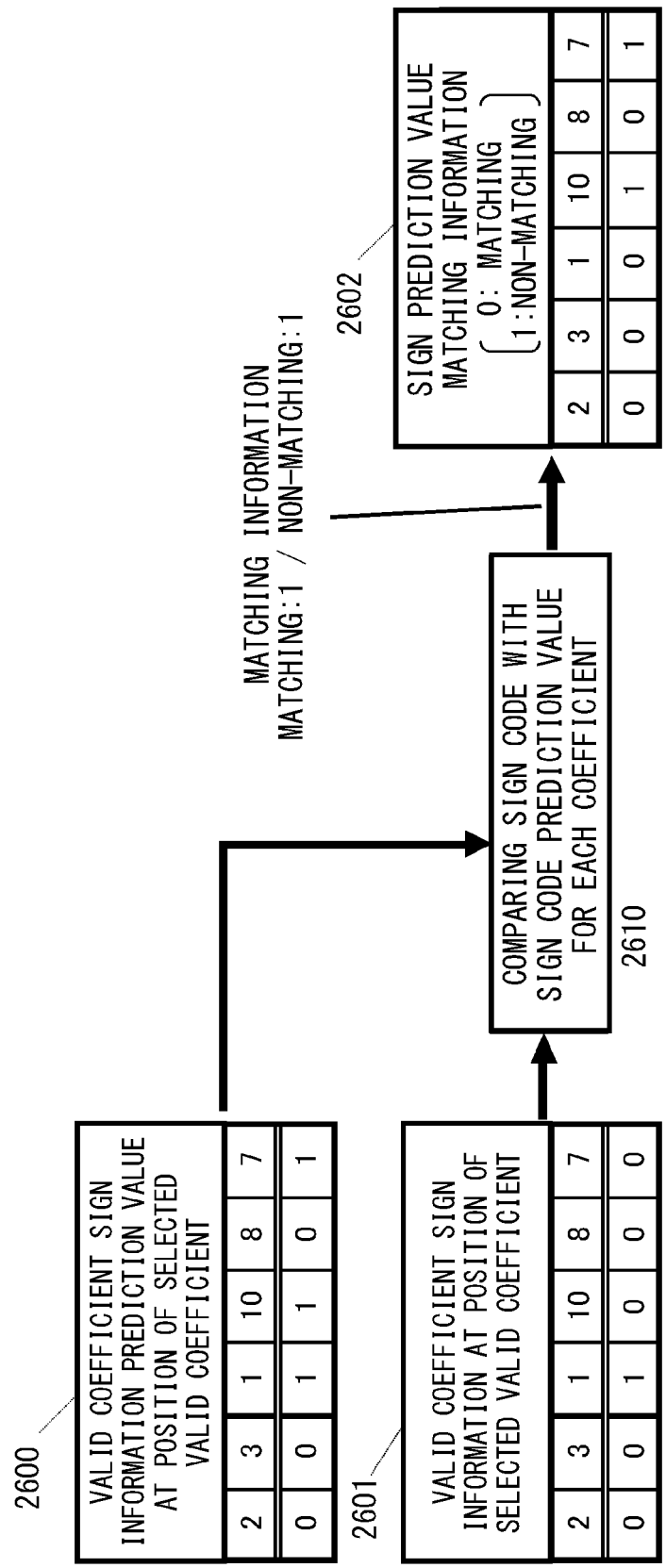
FIG. 26 is an explanatory view of the process of the sign prediction value matching information generation unit according to the fourth embodiment.

FIG. 26 is an explanatory view of the process of the sign prediction value matching information generation unit 2500 according to the fourth embodiment. In FIG. 26, the upper row indicates the valid coefficient position information, the lower row indicates the valid coefficient sign information, the valid coefficient sign information prediction value, and the sign prediction value matching information corresponding to the valid coefficient position information.

In the present embodiment, it is determined for each valid coefficient whether or not valid coefficient sign information 2601 matches valid coefficient sign information prediction value 2600 with respect to the selected 6 valid coefficients. When they match, sign prediction value matching information 2602 of "0" is output for a matching result, and the information of "1" is output for a non-matching result. Since the valid coefficients are sorted in order from the higher predicted accuracy of the valid coefficient sign information prediction value 2600, the higher order coefficient indicates a matching result, and a coefficient in the lower order indicates a non-matching result. Therefore, it is expected that the probability of the "matching" symbol is higher in the first half. In the fourth embodiment, 0 indicates "matching" while 1 indicates "non-matching".

FIG. 27 illustrates the valid coefficient sign information entropy encoding unit 2502 according to the fourth embodiment.

For each encoding block, the order is sorted based on absolute values, and the sign information prediction value matching information is encoded in the sorted order for the sign prediction value matching information 2602 about the selected coefficients. That is, in the fourth embodiment, as indicated by the sign prediction value matching information in FIG. 26, the sign prediction value matching information of 0, 0, 0, 1, 0, and 1 at the coefficient positions 2, 3, 1, 10, 8, and 7 are encoded in this order, a sign prediction value matching information entropy code 2700 is generated.

To encode the sign prediction value matching information, an arithmetic code 1 (2701) and an arithmetic code 2 (2702) are prepared. The arithmetic code 1 is the optimum when the probability (matching probability) of the matching symbol "0" is 0.8, and the probability of the non-matching symbol "1" is 0.2 while the arithmetic code 2 is the optimum when the probability (matching probability) of the matching symbol "0" is 0.6, and the probability of the non-matching symbol "1" is 0.4.

Then, a determination unit 2703 for determining the presence/absence of the non-matching symbol before encoding the sign prediction value matching information switches between the arithmetic code 1 and the arithmetic code 2.

As for the arithmetic code, a general arithmetic code described in the non-patent document 2 can be used. Otherwise, as the CABAC used in the moving image coding international standard ITU-T H.264, the arithmetic code method of updating the probability table for each symbol encoding operation can also be used.

The method of selecting the arithmetic code 1 and the arithmetic code 2 is described below with reference to FIG. 28. The sorted sign prediction value matching information is encoded by the arithmetic code 1 in order from the first valid coefficient of 2. So far as the sign prediction value matching information immediately before indicates "matching", that is, "0", the coding process is performed by the arithmetic code 1. When the sign prediction value matching information about the valid coefficient immediately before is "non-matching", that is, "1", all subsequent sign prediction value matching information is encoded using the arithmetic code 2. In the case illustrated in FIG. 28, the arithmetic code 1 is used for the first valid coefficient (the position of the valid coefficient is 2). When the positions of the valid coefficients are 3, 1, 10, the sign prediction value matching information about the valid coefficient immediately before is "matching" of "0", the encoder uses the arithmetic code 1. Since the sign prediction value matching information whose valid coefficient position is 10 as encoded immediately before the code having the position of the valid coefficient is 9 is "non-matching" of "1", the sign information prediction value matching information having the positions of the valid coefficient are 9 and 7 is encoded by the arithmetic code 2.

It is based on the fact that when the encoding is performed from the valid coefficient highly expected to have high accuracy of sign information prediction value, the occurrence probability tends to be balanced between "non-matching", that is, "1", and "matching", that is, "0" for the sign prediction value matching information for and after the prediction coefficient for which the prediction is erroneous.

FIG. 29 is a flowchart for explanation of the arithmetic sign selecting process used in encoding the sign prediction value matching information.

In step S2901 after the process is started in step S2900, n pieces of sign prediction value matching information are input. In step S2902, the state variable State is initialized to 1. The variable performs control to use the arithmetic code 1 when state=1, and the arithmetic code 2 when state=2. In addition, the counter i is initialized to 1.

In step S2903, it is checked whether or not the variable state is 1. When it is 1, the i-th sign prediction value matching information S[i] is encoded by the arithmetic code 1 in step S2904. Then, in step S2905, it is determined whether S[i] is "matching" or "non-matching". When it is "non-matching", the state variable state is set to 2 in step S2907.

When it is determined in step S2903 that the state is not 1, that is, 2, then the i-th sign prediction value matching information S[i] is encoded by the arithmetic code 2 in step S2906.

The counter i is incremented in step S2908 regardless of the variable state. Then, it is determined in step S2909 whether or not the counter i is larger than n, and the encoding operation is terminated if it is larger than n. Otherwise, control is passed to step S2903.

Figure 30:
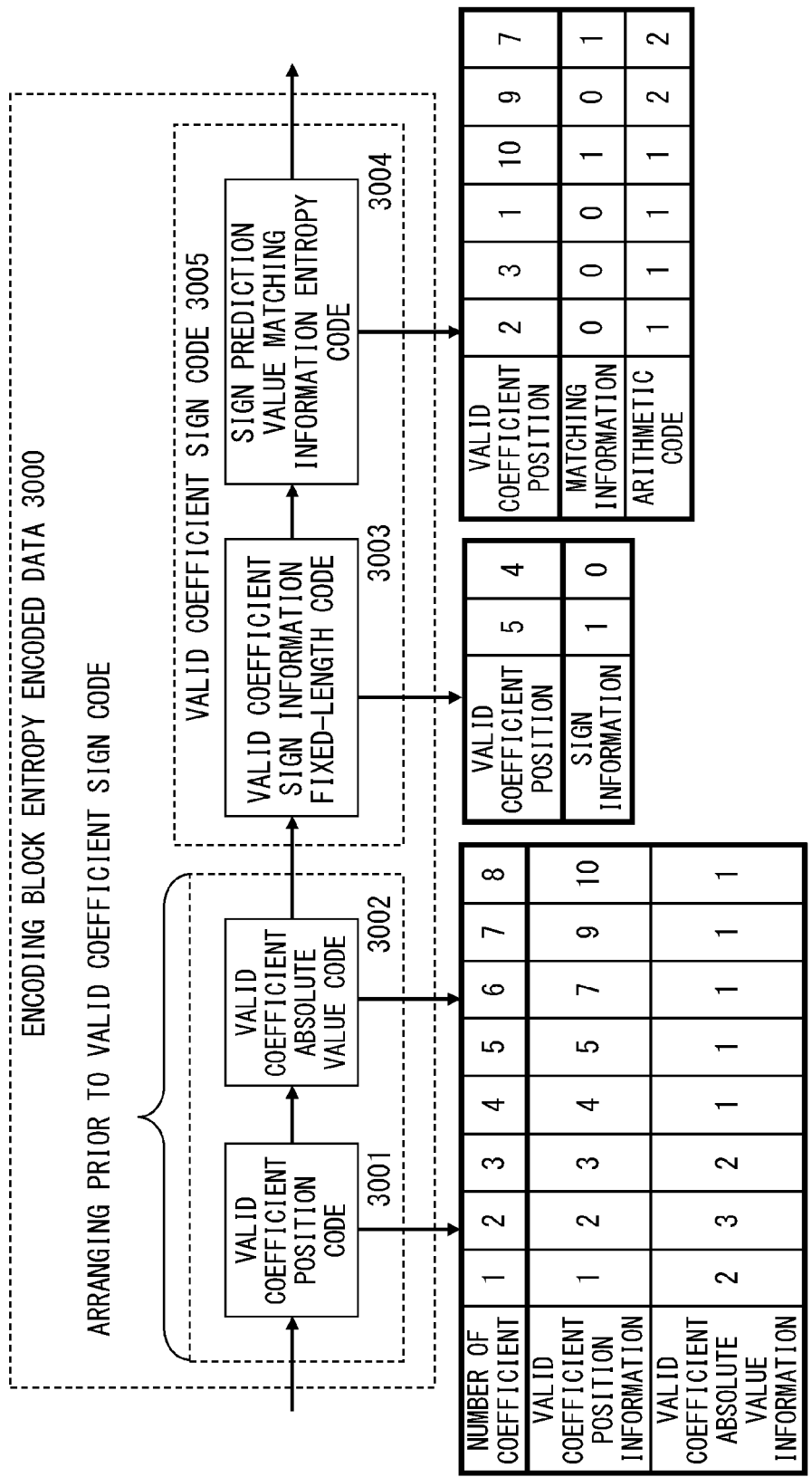
FIG. 30 is an explanatory view of an example of the configuration of generating encoding block entropy encoded data.

FIG. 30 is an explanatory view of the embodiment for generating encoding block entropy encoded data 3000 by combining a valid coefficient position code 3001, a valid coefficient absolute value code 3002, and a valid coefficient sign code 3005.

In the fourth embodiment, the valid coefficient sign information prediction unit 1924 in FIG. 19 generates a fixed-length encoding index from the valid coefficient position information and the valid coefficient absolute value information, and next generates a valid coefficient sign information prediction value from the fixed-length encoding sign information, the valid coefficient position information, the valid coefficient absolute value information, and the boundary pixel prediction error estimation value. Thus, to generate the above-mentioned fixed-length encoding index and the valid coefficient sign information prediction value on the decoding device side, there are the restrictions on the order of codes.

That is, to generate the fixed-length encoding index and the valid coefficient sign information prediction value on the decoding device side, the valid coefficient position code 3001 and the valid coefficient absolute value code 3002 are to be prepared before the valid coefficient sign code 3005.

Finally, the encoding block entropy encoded data in the fourth embodiment is configured by the valid coefficient position code 3001 and the valid coefficient absolute value code 3002 respectively having the value of the valid coefficient position information and the valid coefficient absolute value information, the sign information of "1" and "0" at the valid coefficient positions of 5 and 4 encoded by the 3003, and the sign prediction value matching information entropy code 3004, as illustrated in FIG. 30. The sign prediction value matching information entropy code 3004 is configured by the matching information "0", "0", "0", and "1" about the valid coefficient positions 2, 3, 1, and 10 encoded by the arithmetic code 1, and the matching information "0" and "1" about the valid coefficient positions 9 and 7 encoded by the arithmetic code 2.

The valid coefficient position information and the valid coefficient absolute value information can be applied in the normal encoding method similar to the ITU-T H.264.

Figure 31:
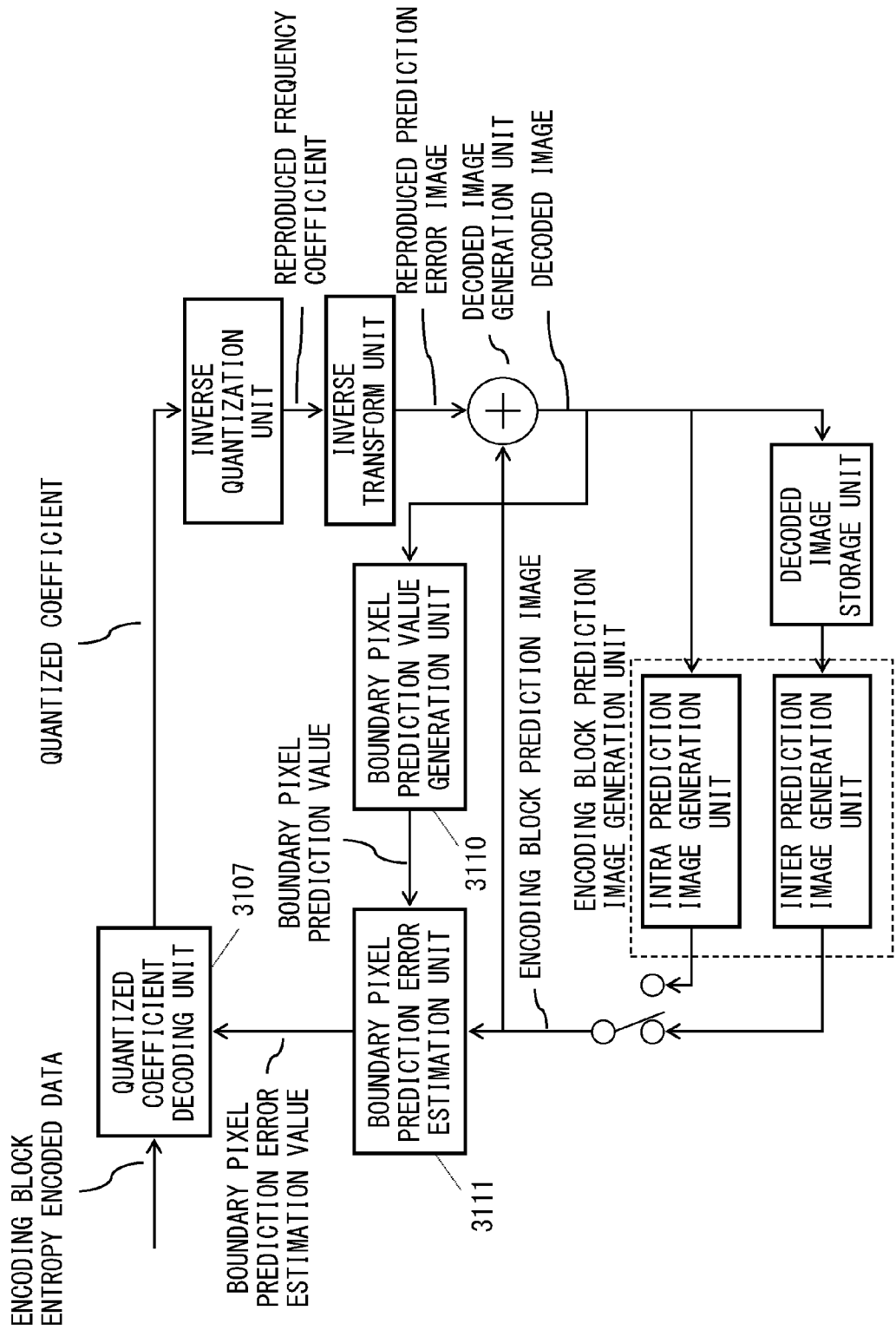
FIG. 31 illustrates the decoding device according to the fifth embodiment.

FIG. 31 illustrates the decoding device according to the fifth embodiment. The fifth embodiment illustrated in FIG. 31 describes further in detail a quantized coefficient decoding unit 3107, a boundary pixel prediction error estimation unit 3111, and a boundary pixel prediction value generation unit 3110 based on the second embodiment illustrated in FIG. 11. The quantized coefficient decoding unit 3107, the boundary pixel prediction error estimation unit 3111, and the boundary pixel prediction value generation unit 3110 respectively correspond to the quantized coefficient decoding unit 1107, the boundary pixel prediction error estimation unit 1111, and the boundary pixel prediction value generation unit 1110. In FIG. 31, the units having the respective names as illustrated in FIG. 11 perform the respective processes as illustrated in FIG. 11. The decoding device according to the fifth embodiment decodes the encoding block entropy encoded data 3000 in FIG. 30 generated by the encoding device according to the fourth embodiment in FIG. 15, and some blocks are the same as those described above with reference to the embodiment in FIG. 15.

In the fifth embodiment, the inverse quantization unit, the inverse transform unit, the decoded image generation unit, and the encoding block prediction image generation unit are substantially the same as the inverse quantization unit, the inverse transform unit, the locally decoded image generation unit, and the encoding block prediction image generation unit described above with reference to the fourth embodiment in FIG. 15. Therefore, the example of the operation of each unit is substantially the same as that according to the fourth embodiment. The locally decoded image described with reference to the fourth embodiment is replaced with a decoded image according to the fifth embodiment. Each unit above is a so-called local decoder, and is common between the encoding device and the decoding device.

The configuration and the operation example of the boundary pixel prediction value generation unit 3110 and the boundary pixel prediction error estimation unit 3111 are similar to those according to the fourth embodiment. In the fifth embodiment, the quantized coefficient decoding unit 3107 different from that in the fourth embodiment in FIG. 15 is described.

Figure 32:
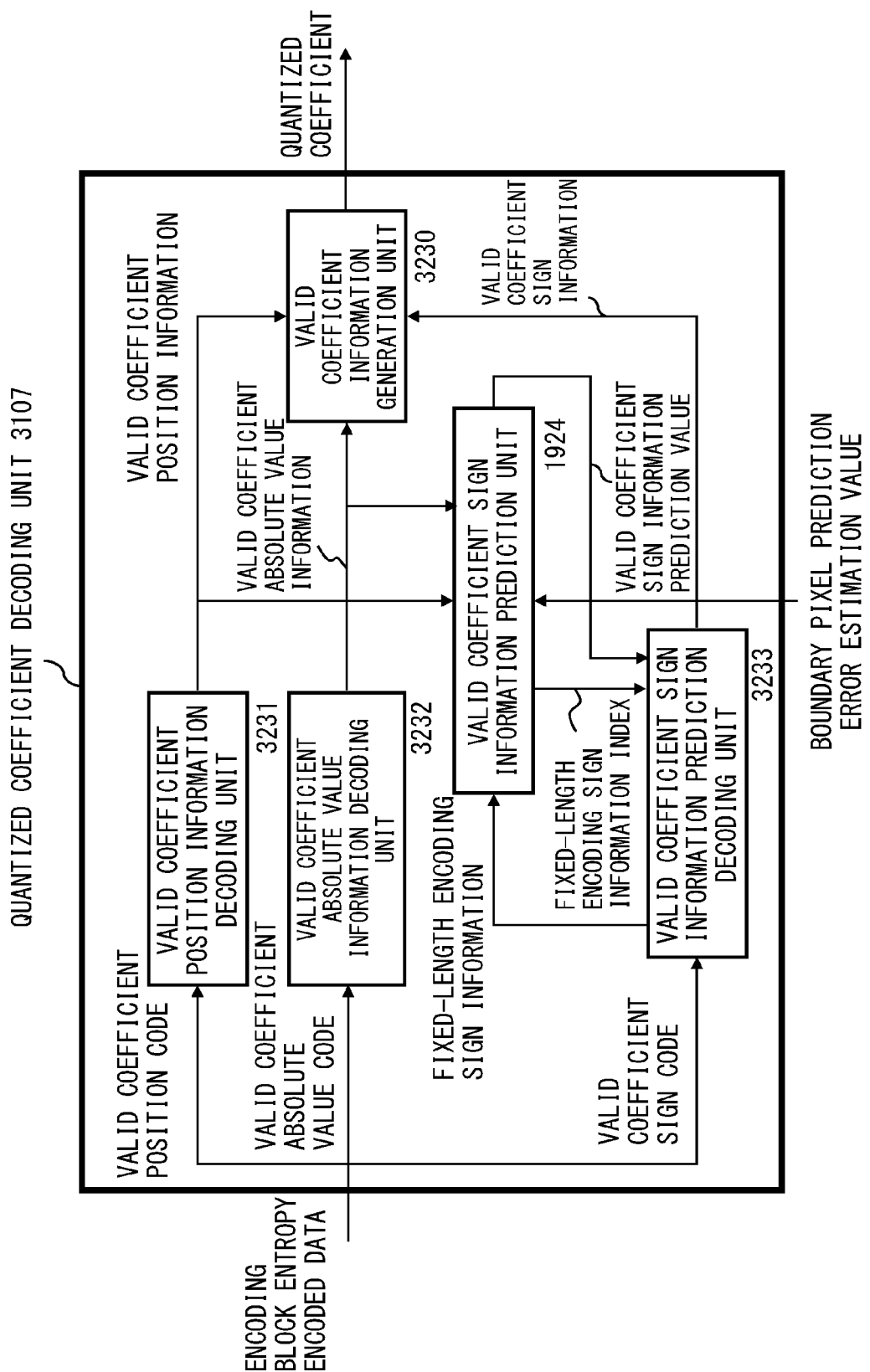
FIG. 32 illustrates the quantized coefficient decoding unit according to the fifth embodiment.

FIG. 32 illustrates the quantized coefficient decoding unit 3107 according to the fifth embodiment. In the fifth embodiment, the operation is described with reference to the process of decoding the encoding block entropy encoded data 3000 in FIG. 30 according to the fourth embodiment.

A valid coefficient position information decoding unit 3231 retrieves the valid coefficient position code 3001 from the encoding block entropy encoded data 3000, and decodes the valid coefficient position information indicating the frequency position of the valid coefficient of an encoding block. As a result, as illustrated in FIG. 30, the valid coefficient positions 1, 2, 3, 4, 5, 7, 9, and 10 are obtained. Simultaneously, the number (8) of valid coefficients is obtained.

A valid coefficient absolute value information decoding unit 3232 retrieves the valid coefficient absolute value code 3002 from the encoding block entropy encoded data 3000, and decodes the valid coefficient absolute value information indicating an absolute value of the valid coefficient of the encoding block. As a result, as illustrated in FIG. 30, the valid coefficient absolute value information listed below is acquired.

2, 3, 2, 1, 1, 1, 1, 1

The valid coefficient sign information prediction unit 1924 first generates a fixed-length encoding sign information index. In the fifth embodiment, the valid coefficient sign information prediction unit 1924 which is substantially the same as the corresponding unit in the fourth embodiment is used because the same valid coefficient sign information prediction value is to be generated in the encoding device and the decoding device. Therefore, explanation for the operation of the valid coefficient sign information prediction unit 1924 is omitted here.

As described above with reference to FIGS. 20 and 21 according to the fourth embodiment, the valid coefficient position information and the valid coefficient absolute value information are input to the valid coefficient sign information prediction unit 1924, and 5 and 4 are output as the fixed-length encoding sign information index.

Figure 33:
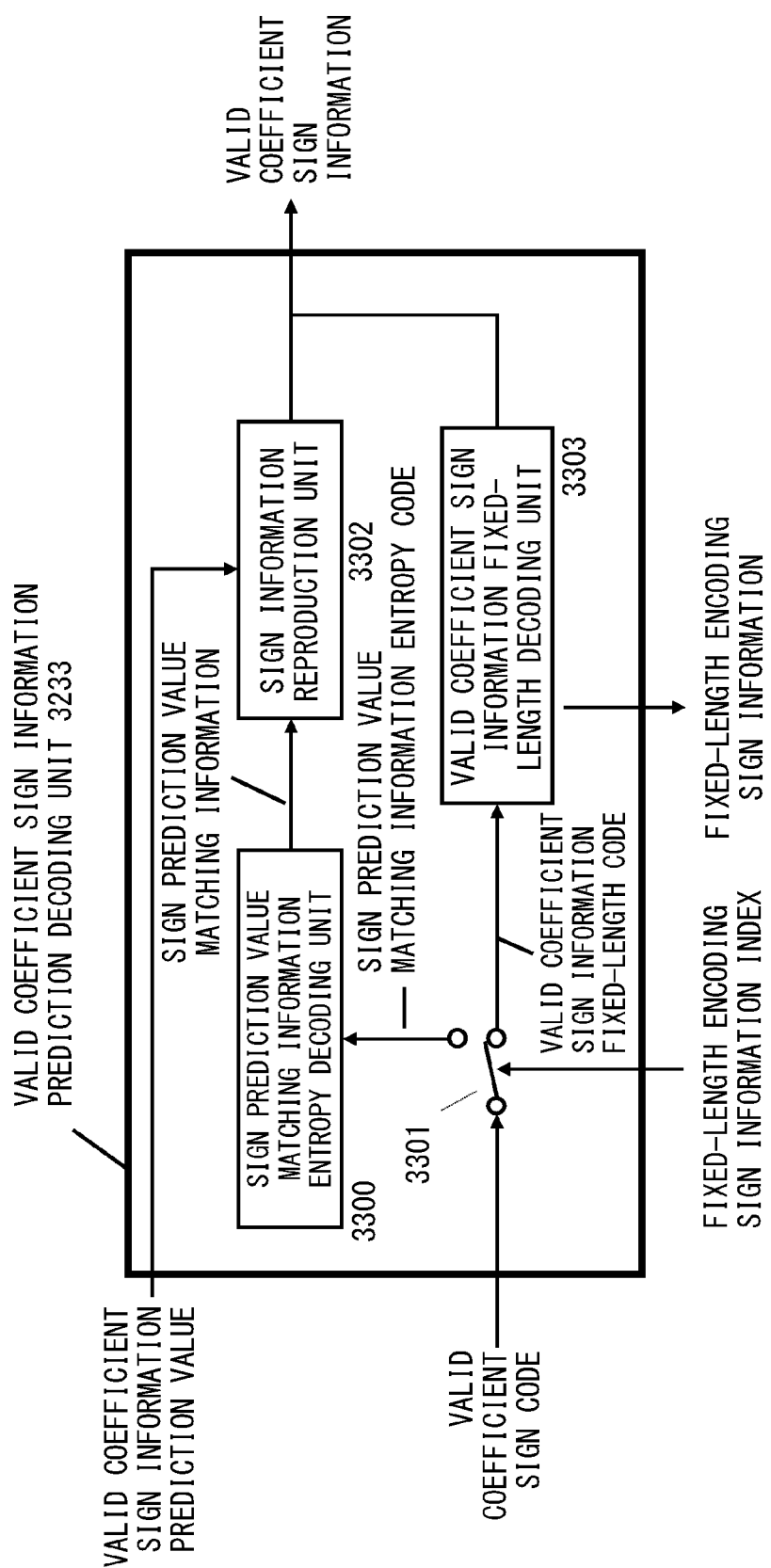
FIG. 33 illustrates the valid coefficient sign information prediction decoding unit according to the fifth embodiment.

A valid coefficient sign information prediction decoding unit 3233 decodes the valid coefficient sign information fixed-length code 3003 in the valid coefficient sign code 3005. FIG. 33 illustrates the valid coefficient sign information prediction decoding unit 3233 according to the fifth embodiment.

First, a switch 3301 selects the valid coefficient sign information fixed-length code 3003 in the valid coefficient sign code 3005 according to the fixed-length encoding sign information index, and the code is decoded by a valid coefficient sign information fixed-length decoding unit 3303. In this case, the number of valid coefficients of the encoding block to be encoded is 8, and the encoding device according to the fourth embodiment encodes 6 valid coefficients using a sign prediction value matching information entropy code 3004. The information about 6 is decided by a rule applied to the encoding device and the decoding device. Thus, the number of valid coefficients (8−6=2) to be decoded by the valid coefficient sign information fixed-length code is obtained. Accordingly, the valid coefficient sign information fixed-length code for two coefficients is decoded, and 1 and 0 are obtained as the fixed-length encoding sign information.

Similarly, the switch 3301 selects the sign prediction value matching information entropy code 3004 by the fixed-length encoding sign information index from the valid coefficient sign code 3005. Then, the sign prediction value matching information entropy decoding unit 3300 decodes the sign prediction value matching information entropy code 3004, and obtains 0, 0, 0, 1, 0, 1 as sign prediction value matching information.

The sign information reproduction unit 3302 compares the valid coefficient sign information prediction value with the matching information, and generates the valid coefficient sign information "0, 0, 0, 1, 0, 1". Thus, valid coefficient sign information 3703 corresponding to FIG. 6 is decoded.

The valid coefficient sign information prediction value 3701 "0, 0, 1, 1, 0, 1" is generated by the valid coefficient sign information prediction unit 1924 illustrated in FIG. 32. The valid coefficient sign information prediction unit 1924 generates the valid coefficient sign information prediction value in the same method as described with reference to FIGS. 20 through 24 according to the fourth embodiment from the fixed-length encoding sign information obtained by the valid coefficient sign information fixed-length decoding unit 3303 and the boundary pixel prediction error estimation value generated by the boundary pixel prediction error estimation unit 3111. The boundary pixel prediction error estimation value 3111 input to the valid coefficient sign information prediction unit is also generated by the boundary pixel prediction error estimation unit 3111 in the same method as described with reference to FIGS. 16 through 18 according to the fourth embodiment.

Figure 34:
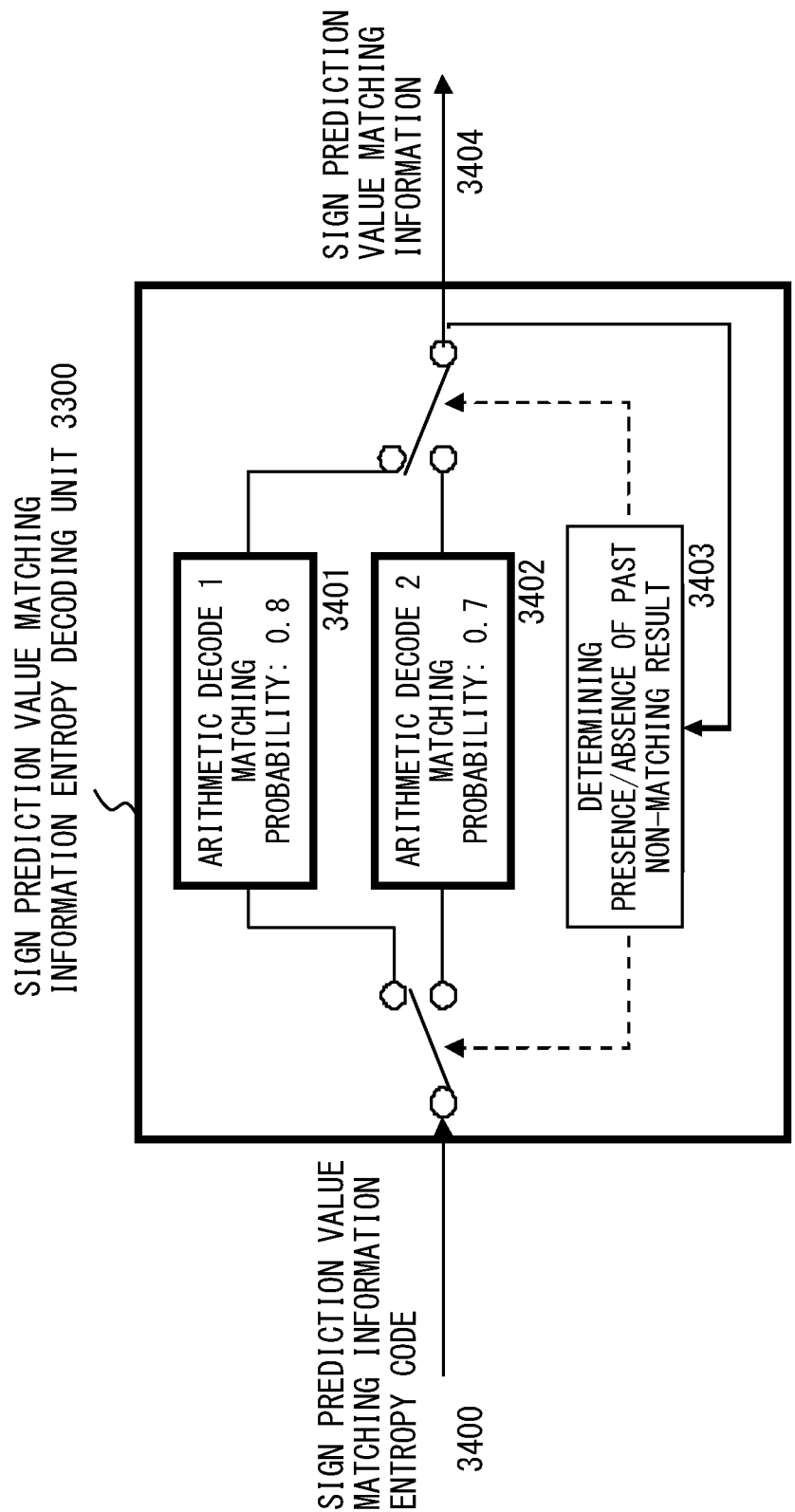
FIG. 34 illustrates the sign prediction value matching information entropy decoding unit according to the fifth embodiment.

FIG. 34 illustrates the sign prediction value matching information entropy decoding unit 3300 according to the fifth embodiment, and corresponds to the sign prediction value matching information entropy encoding unit 2502 according to the fourth embodiment in FIG. 27. According to the fifth embodiment, the sign prediction value matching information entropy decoding unit 3300 includes a arithmetic code 1 (3401) and a arithmetic code 2 (3402) respectively corresponding to the arithmetic code 1 (2701) and the arithmetic code 2 (2702). The arithmetic decodes 1 and 2 are designed to have the highest efficiency when the probability of the "matching" symbol is 0.8 and 0.6, respectively.

The method of selecting the arithmetic decodes 1 and 2 is similar to that of the sign prediction value matching information entropy encoding unit 2502 according to the fourth embodiment. The operation is described below with reference to FIG. 35. In the input sign prediction value matching information entropy code, the codes are sequentially decoded by the arithmetic decode 1 from the code having the first valid coefficient position of 2, and the sign prediction value matching information is obtained. The code is decoded by the arithmetic decode 1 so far as the sign prediction value matching information decoded immediately before is "matching", that is, "0". Then, when the sign prediction value matching information about the valid coefficient decoded immediately before is "non-matching", that is "1", all subsequent sign prediction value matching information entropy codes are decoded using the arithmetic decode 2. In the case in FIG. 35, the arithmetic decode 1 is used for the first sign prediction value matching information entropy code (the position of the valid coefficient is 2). In addition, up to the position of 3, 1, 10 of the valid coefficient, the sign prediction value matching information about the valid coefficient decoded immediately before is "matching", that is, "0". Therefore, the arithmetic decode 1 is used for the decoder. Then, since the sign prediction value matching information whose valid coefficient position is 10 decoded immediately before the sign prediction value matching information entropy code having the position of the valid coefficient is 9 is "non-matching", that is, "1", the sign prediction value matching information entropy code having the position of the valid coefficient of 9 and 7 is encoded by the arithmetic decode 2.

Figure 36:
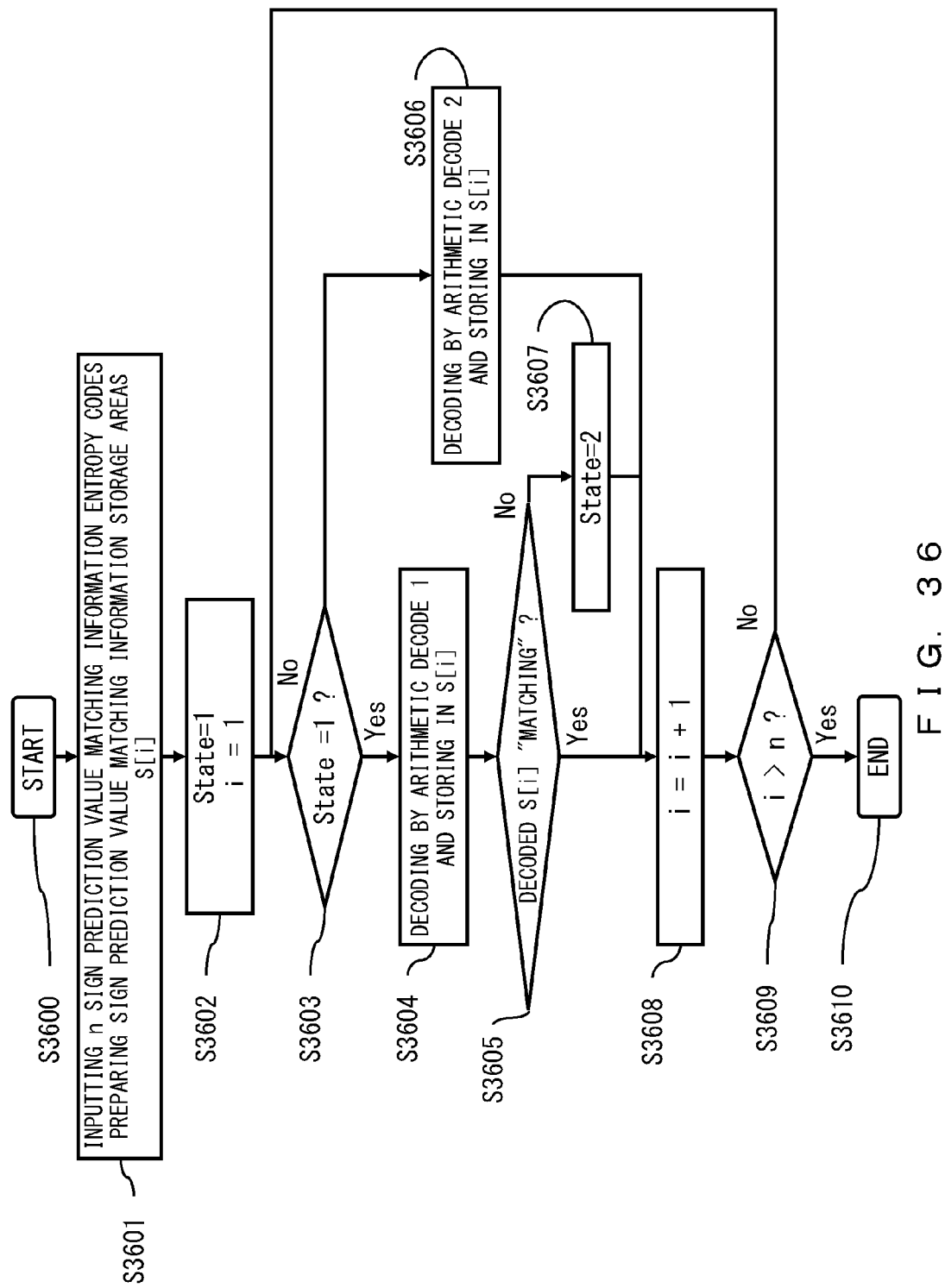
FIG. 36 is a flowchart of the arithmetic sign selecting process for use in decoding the sign prediction value matching information.

FIG. 36 is a flowchart for explanation of the arithmetic sign selecting process for use in decoding the sign prediction value matching information.

In step S3601, after the operation is started in step S3600, n sign prediction value matching information entropy codes are input. In addition, n storage areas S[i] of the sign prediction value matching information are prepared. In step S3602, the state variable State is initialized to 1. The variable is to perform control so that the arithmetic decode 1 is used when State=1 and the arithmetic decode 2 is used when State=2. In this step, the counter i is initialized to 1.

In step S3603, it is checked whether or not the variable State is 1. When it is 1, the i-th sign prediction value matching information entropy code is decoded by the arithmetic decode 1 in step S3604, and the obtained sign prediction value matching information is stored in S[i]. Then, in step S3605, it is determined whether the decoded S[i] is "matching" or "non-matching". When it is "non-matching", the state variable State is set to 2 in step S3607.

When it is determined that the state is not 1, that is, 2, in step S3603, the i-th sign prediction value matching information entropy code is decoded by the arithmetic decode 2 in step S3606, and the obtained sign prediction value matching information is stored in S[i].

The counter i is incremented in step S3608 regardless of the variable State. Then, it is determined in S3609 whether or not the counter i is larger than n. When i is larger than n, the decoding process is terminated. Otherwise, control is passed to step S3603.

Figure 37:
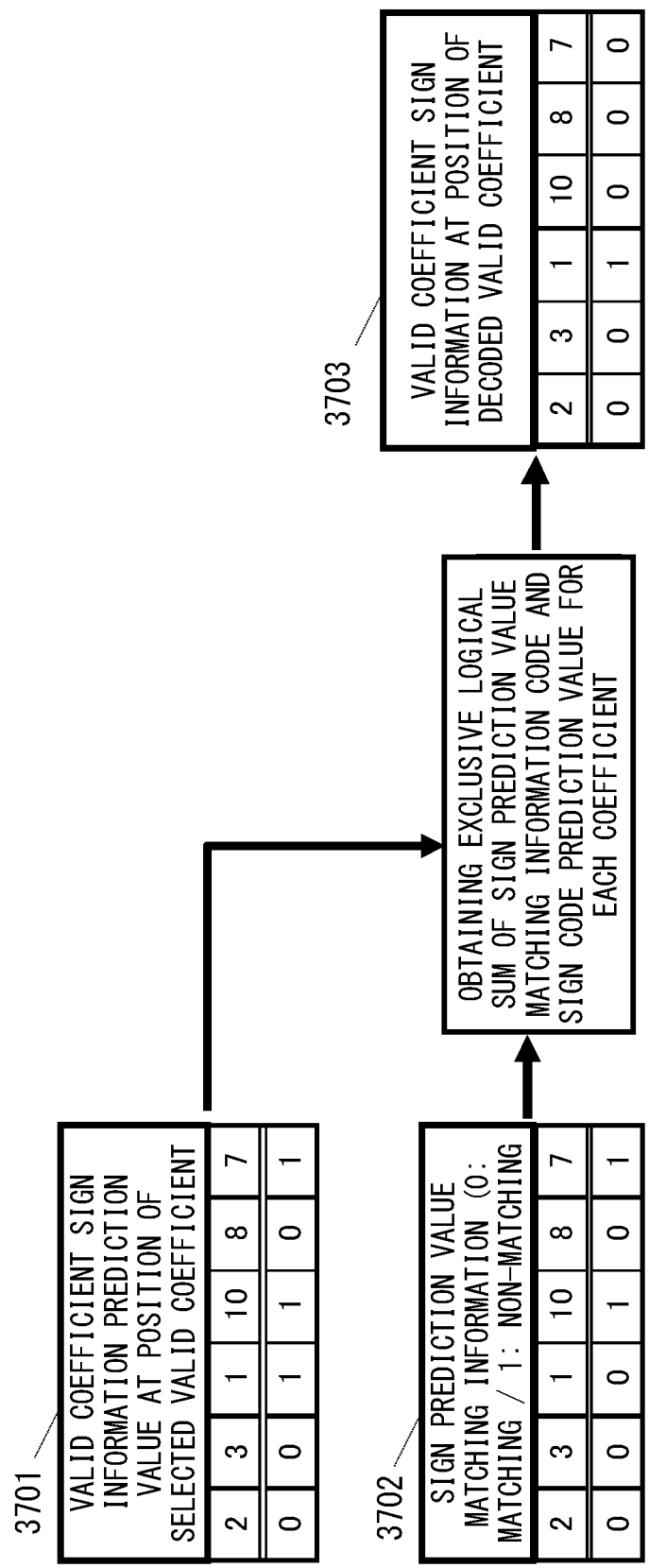
FIG. 37 is an explanatory view of the process of a sign information reproduction unit according to the fifth embodiment.

FIG. 37 is an explanatory view of the process of a sign information reproduction unit 3302 according to the fifth embodiment. In FIG. 37, the upper row stores the position information about the valid coefficient, and the lower row stores the valid coefficient sign information, the valid coefficient sign information prediction value, and the sign prediction value matching information corresponding to the valid coefficient position information.

Sign prediction value matching information 3702 is 0 when the valid coefficient sign information prediction value matches the sign information, and 1 when they do not match. Thus, the sign information reproduction unit 3302 reproduces the valid coefficient sign information 3703 about each valid coefficient by calculating an exclusive logical sum for each sign information of each coefficient on the valid coefficient sign information prediction value 3701 and the sign prediction value matching information 3702.

In the valid coefficient sign information prediction decoding unit 3233 in FIG. 32 collects valid coefficient sign information generated by the valid coefficient sign information fixed-length decoding unit 3303 and the sign information reproduction unit 3302, and output as the valid coefficient sign information of an encoding block.

In a valid coefficient information generation unit 3230 in FIG. 32, the valid coefficient position information, the valid coefficient absolute value information, and the valid coefficient sign information having the values in FIG. 6 are input and the quantized coefficients having the same value as the quantized coefficient block 454 illustrated in FIG. 4 are output.

Then, the quantized coefficients are input to the inverse quantization unit in FIG. 31, and an image is decoded in the same method as the general decoding device.

According to the fifth embodiment, as described above, the encoding block entropy data efficiently encoded according to the fourth embodiment can be correctly decoded.

Described next is the sixth embodiment. The sixth embodiment is another configuration of the valid coefficient sign information prediction unit 1924 (FIGS. 19 and 32) common between the fourth and fifth embodiments. In the sixth embodiment, the 4-point Hadamard transform described with reference to the fourth and fifth embodiments is described with reference to another embodiment of the valid coefficient sign information prediction unit applied to the transform unit 902 and the inverse transform unit 905. The 4-point Hadamard transform is one of the basic orthogonal transformations.

Before description of the sixth embodiment, as the preparation with reference to FIGS. 38 through 41, the relationship between the reproduced frequency coefficient and the upper/leftmost pixels of the reproduced prediction error image, and some definitions are described.

FIG. 38 is an explanatory view of the orthogonal basis vector configuring the 4-point Hadamard transform according to the sixth embodiment. The basis vector of the frequency 0 is defined as $T_0$ (3800), the basis vector of the frequency 1 is defined as $T_1$ (3801), the basis vector of the frequency 2 is defined as $T_2$ (3802), and the basis vector of the frequency 3 is defined as $T_3$ (3803). The 4-point Hadamard transform can be expressed using the orthogonal basis vector as the four horizontal vectors.

For explanation of the sixth embodiment, the coefficient corresponding to the pixel 0 in the basis vector $T_0$ (3800) of the frequency 0 is defined as $t0_0$ (3850), the coefficient corresponding to the pixel 0 in the basis vector $T_1$ (3801) of the frequency 1 is defined as $t0_1$ (3851), the coefficient corresponding to the pixel 0 in the basis vector $T_2$ (3802) of the frequency 2 is defined as $t0_2$ (3852), and the coefficient corresponding to the pixel 0 in the basis vector $T_3$ (3803) of the frequency 3 is defined as $t0_3$ (3853), FIG. 39 is an explanatory view of a weight cumulative sum expression 3920 by each frequency coefficient 3921 of a reproduced frequency coefficient matrix 3955 of a 4×4 2-dimensional orthogonal basis 3922 having a horizontal frequency i and a vertical frequency j as the relationship between the reproduced frequency coefficient matrix 3955 and a reproduced prediction error matrix 3956 in the 2-dimensional 4-point Hadamard transform performed in the inverse transform unit 905 illustrated in FIG. 9.

The reproduced prediction error matrix 3956 as an output of the inverse transform unit 905 in FIG. 9 is generally obtained by multiplying the reproduced frequency coefficient matrix 3955 by the Hadamard orthogonal transform matrix 3910 from the right and a transposed matrix 3911 of the Hadamard orthogonal transform matrix from the left. The Hadamard orthogonal transform matrix 3910 is configured by basis $T_0$ (3800) $T_1$ (3801), $T_2$ (3802), and $T_3$ (3803) of the frequencies 0 through 3 of the Hadamard transform described with reference to FIG. 38. The transposed matrix 3911 of the Hadamard transform is configured by each vertical vector of each of $T_0{}^t$ (3900), $T_1{}^t$(3901), $T_2{}^t$(3902), and $T_3{}^t$(3903).

Therefore, the reproduced prediction error matrix 3956 can be expressed as the cumulative sum expression 3920 of a 4-point Hadamard transform from each coefficient of the Hadamard transforms $T_0$ through $T_4$ and their transposed vectors $T_0{}^t$ through $T_4{}^t$ and the reproduced frequency coefficient. The cumulative sum expression 3920 is obtained by performing a cumulative sum on all horizontal/vertical frequencies after multiplying the 4×4 2-dimensional orthogonal basis 3922 by the reproduced frequency coefficient $X_{ij}$ (3921) having the horizontal frequency i and the vertical frequency j.

FIG. 40 is an explanatory view of the relationship between the four upper edge pixels/four left edge pixels of the reproduced prediction error matrix 4056 and the reproduced frequency coefficients. Four leftmost boundary pixels of the reproduced prediction error matrix are defined as a LeftDiff vector 4000, and four uppermost boundary pixels of the reproduced prediction error matrix are defined as a TopDiff vector 4001.

The LeftDiff vector 4000 can be expressed as a cumulative sum expression 4010 of the LeftDiff vector by extracting the four leftmost pixels of the cumulative sum expression 3920 of the 4-point Hadamard transform in FIG. 39.

The TopDiff vector 4001 can be expressed as a cumulative sum expression 4011 of the TopDiff vector by extracting the four uppermost pixels of the cumulative sum expression 3920 of the 4-point Hadamard transform in FIG. 39.

FIG. 41 is an explanatory view of the definition of the vector expression of the upper/left boundary pixel of the boundary pixel prediction error estimation value generated by the boundary pixel prediction error estimation unit 1511 etc. in FIG. 18 according to the fourth embodiment.

In this example, the four leftmost pixels of a boundary pixel prediction error estimation value 4100 are defined as a LeftEst vector 4100. The four uppermost pixels of the boundary pixel prediction error estimation value 4100 are defined as a TopEst vector 4101.

Based on the explanation above, the sixth embodiment relating to the valid coefficient sign information prediction unit is described below.

Figure 42:
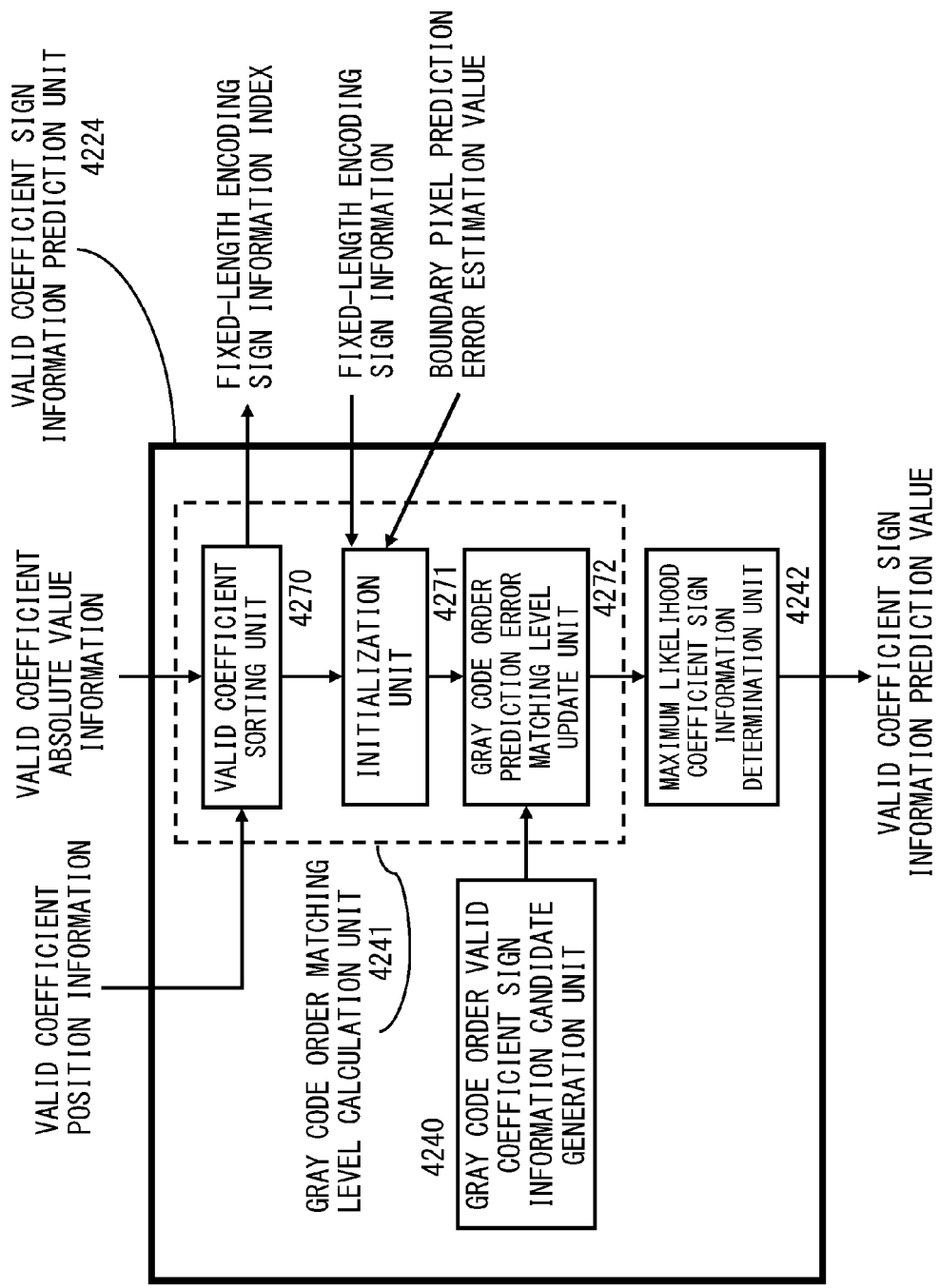
FIG. 42 illustrates the valid coefficient sign information prediction unit according to the sixth embodiment.

FIG. 42 illustrates the valid coefficient sign information prediction unit according to the sixth embodiment. The sixth embodiment provides detail configuration of the third embodiment described with reference to FIG. 14. A gray code order valid coefficient sign information candidate generation unit 4240 corresponds to the gray code order valid coefficient sign information candidate generation unit 1440 in FIG. 14. A Gray code order matching level calculation unit 4141 including a valid coefficient sorting unit 4270, an initialization unit 4271, and a gray code order prediction error matching level update unit 4272 corresponds to the Gray code order matching level calculation unit 1441 in FIG. 14. Furthermore, a maximum likelihood coefficient sign information determination unit 4242 is substantially the same as the maximum likelihood coefficient sign information determination unit 1442 in FIG. 4.

The valid coefficient sorting unit 4270 generates valid coefficient position information and the valid coefficient absolute value information to be encoded using a sign information prediction value and a fixed-length encoding sign information index, from the valid coefficient position information and the valid coefficient absolute value information. In this example, the process may be the same as that by the valid coefficient sorting unit according to the fourth embodiment described with reference to FIGS. 20 and 21.

The initialization unit 4271 initializes some initial values used in the calculation in the method described later from the valid coefficient to be encoded using a sign information prediction value and the coefficient information encoded using a fixed-length code.

The Gray code order valid coefficient sign information candidate generation unit 4240 generates a sign information candidate index in the Gray code order. In this example, the code described by the above specified patent document 1 is called a Gray code which is widely used.

The gray code order prediction error matching level update unit 4272 obtains a prediction error matching level in the Gray code order. According to the feature of the Gray code, since there is at most 1 bit difference between two consecutive Gray codes, the sign information candidate evaluated in this order is different from the previously evaluated sign information candidate by at most one valid coefficient code. Therefore, as described later, the cost of the matching level of the next evaluated sign information candidate only by sequentially adding the cost difference before and after the code change of the valid coefficient different in the previous evaluation and code to the matching level cost of the previously evaluated sign information candidate matching cost, thereby largely reducing the computational complexity on the matching level calculation.

Then, the maximum likelihood coefficient sign information determination unit 4242 outputs the maximum likelihood valid coefficient sign information candidate as a valid coefficient sign information prediction value. This operation may be the process equivalent to the maximum likelihood coefficient sign information determination unit 2042 described with reference to FIG. 20.

Described below are the processes of the initialization unit 4271, the gray code order valid coefficient sign information candidate generation unit 4240, and the gray code order prediction error matching level update unit 4272.

In the sixth embodiment, it is assumed that there are no coefficient for which the sign information is to be encoded by the fixed-length code referred to in FIGS. 20, 21, 23, etc. As described later, when there is sign information to be encoded by a fixed-length code, the explanation of the present embodiment can be used.

First, n indicates the number of valid coefficients to be encoded using the sign information prediction value in the valid coefficient sorting unit 2070, and "check target coefficient" indicates the valid coefficient to be encoded using the sign information prediction value.

The horizontal frequency and the vertical frequency indicated by the respective valid coefficients are defined by the following formula 5.

$(i_0,j_0),(i_1,j_1),\ldots,(i_{n-1},j_{n-1})$:horizontal and vertical frequencies of check target coefficient (total of $n$)  [Formula 5]

In the above-mentioned check target coefficient, the k-th valid coefficient having the horizontal and vertical frequencies of $(i_k, j_k)$ is defined by the following formula 6.

$c_{i_k j_k}$: quantized coefficient absolute value of check target coefficient whose horizontal and vertical frequencies are $(i_k, j_k)$  [Formula 6]

In the check target coefficients above, the code of the sign information candidate generated by the gray code order valid coefficient sign information candidate generation unit 4240 for the k-th valid coefficient whose horizontal and vertical frequencies are $(i_k, j_k)$ is defined by the following formula 7.

$s_{i_k j_k}$: check code (positive:1/negative:−1) of check target coefficient whose horizontal and vertical frequencies are $(i_k,j_k)$  [Formula 7]

Node that the definition of the sign information by formula 7 used in the explanation of the sixth embodiment is different from the definition of sign information (positive:0/negative:1) according to the fourth and fifth embodiments.

For example, assume that the quantized coefficient has the value of the following formula 8.

$$\begin{pmatrix} x_{00} & x_{10} & x_{20} & x_{30} \\ x_{01} & x_{11} & x_{21} & x_{31} \\ x_{02} & x_{12} & x_{22} & x_{32} \\ x_{03} & x_{13} & x_{23} & x_{33} \end{pmatrix} = \begin{pmatrix} 5 & 3 & 0 & -2 \\ 0 & -4 & 0 & 0 \\ 1 & 0 & 0 & 0 \\ 0 & 0 & 0 & 0 \end{pmatrix}$$  [Formula 8]

In this case, the number n of the check target coefficients is 5 (n=5). When the coefficients are sorted in the descending order in the method described with reference to FIG. 20, the frequencies of the check target coefficients are $(i_0, j_0)=(0, 0)$, $(i_1, j_1)=(1, 1)$, $(i_2, j_2)=(1, 0)$, $(i_3, j_3)=(3, 0)$, and $(i_5, j_5)=(0, 2)$ in order from the largest absolute value of the coefficient. The absolute value $C_{i_k j_k}$ of the k-th valid coefficient having the horizontal and vertical frequencies $(i_k, j_k)$ is $C_{i_0 j_0}=5$, $C_{i_1 j_1}=4$, $C_{i_2 j_2}=3$, $C_{i_3 j_3}=2$, $C_{i_4 j_4}=1$ A set including a combination (i, j) of all horizontal and vertical coefficients of a check target coefficient is defined by the following formula 9.

$S_{HV}=\{$set including a combination $(i, j)$ of all horizontal and vertical frequencies of check target coefficient$\}=\{(i_0,j_0),(i_1,j_1),\ldots,(i_{n-1},j_{n-1})\}$  [Formula 9]

When the quantized coefficient is expressed by formula 8, the set $S_{HV}$ is expressed as follows.

$S_{HV}=\{(0,0),(1,1),(1,0),(3,0),(0,2)\}$

From the formulas above, the quantized coefficient provisional value expressed by the codes 2400a through 2400n etc. in FIG. 24 can be expressed by the following formula 10 where each coefficient of the quantized coefficient provisional value of the horizontal frequency i and the vertical frequency j is $Z_{ij}$.

$$z_{ij} = \begin{cases} s_{ij} \cdot c_{ij} & (i,\,j) \in S_{HV} \\ 0 & (i,\,j) \notin S_{HV} \end{cases}$$  [Formula 10]

In the encoding target block, Q indicates the quantizer used in the quantization unit and the inverse quantization unit. As described with reference to FIG. 24, the reproduced prediction error provisional value is obtained by inversely quantizing and inversely transforming the quantized coefficient provisional value. The value is obtained by substituting the quantized coefficient provisional value for the reproduced frequency coefficient, and inversely transforming the result.

If the value obtained by inversely quantizing the quantized coefficient provisional value is substituted for the reproduced frequency coefficient $X_{ij}$ in FIG. 39, it is expressed by the following formula 11.

$$x_{ij} = \begin{cases} z_{ij} \cdot Q = s_{ij} \cdot c_{ij} \cdot Q & (i,j) \in S_{HV} \\ 0 & (i,j) \notin S_{HV} \end{cases} \quad \text{[Formula 11]}$$

Therefore, the LeftDiff vector 4000 as the four leftmost boundary pixels of the reproduced prediction error and the TopDiff vector 4001 as the four uppermost boundary pixels of the reproduced prediction error can be expressed by the following formulas 12 and 13 if formula 11 is substituted for the cumulative sum expression 4010 of the LeftDiff vector and the cumulative sum expression 4011 of the TopDiff vector in FIG. 40.

$$\overrightarrow{LeftDiff} = \sum_{(i,j)\in S_{HV}} s_{ij} \cdot c_{ij} \cdot Q \cdot t0_i \cdot \overrightarrow{T_j^t} \quad \text{[Formula 12]}$$

$$\overrightarrow{TopDiff} = \sum_{(i,j)\in S_{HV}} s_{ij} \cdot c_{ij} \cdot Q \cdot t0_j \cdot \overrightarrow{T_i} \quad \text{[Formula 13]}$$

Assume that $T_x$ and $t0_x$ are defined as follows.

$T_x$: Normal orthogonal basis vector of frequency x of normal orthogonal transform [Formula 14]

$t0_x$: component for the 0-th pixel of the normal orthogonal basis vector $T_x$ of the frequency x of the normal orthogonal transform [Formula 15]

As illustrated in FIG. 24, the cost can be expressed as a cumulative sum of the squares of the difference between the boundary pixel prediction error estimation value and the reproduced prediction error provisional value. Therefore, the matching level (cumulative sum of the square of the difference between the boundary pixel prediction error estimation value and the reproduced prediction error provisional value) for the quantized coefficient provisional value having $(S_{i_0 j_0}, S_{i_1 j_1}, S_{i_2 j_2}, \ldots, S_{i_{n-1} j_{n-1}})$ as the sign information can be defined by the following formula 16 as the absolute value square value of the difference vector of the vectors indicating the reproduced prediction error estimation value and the reproduced prediction error provisional value.

[Formula 16]

$$E(s_{i_0 j_0}, s_{i_1 j_1}, \ldots, s_{i_{n-1} j_{n-1}}) = \left\| \overrightarrow{TopDiff} - \overrightarrow{TopEst} \right\|^2 +$$

$$\left\| \overrightarrow{LeftDiff} - \overrightarrow{LeftEst} \right\|^2$$

$$= \left\| \sum_{(i,j)\in S_{HV}} s_{ij} \cdot c_{ij} \cdot Q \cdot t0_j \cdot \overrightarrow{T_i} - \overrightarrow{TopEst} \right\|^2 +$$

$$\left\| \sum_{(i,j)\in S_{HV}} s_{ij} \cdot c_{ij} \cdot Q \cdot t0_i \cdot \overrightarrow{T_j^t} - \overrightarrow{LeftEst} \right\|^2$$

TopEst and LeftEst are defined as follows as described with reference to FIG. 41.

TopEst: reproduced prediction error estimation value in the uppermost boundary pixel of the block to be checked [Formula 17]

LeftEst: reproduced prediction error estimation value in the leftmost boundary pixel of the block to be checked [Formula 18]

Next, the four following types of sets $S_H$, $S_V$, $S_{H|FreqV=x}$, and $S_{V|FreqH=x}$ are newly defined.

$S_H=\{$horizontal frequency, and having a horizontal frequency component in at least one check target coefficient$\}=\{i|j$ is optional,$(i,j)\in S_{HV}\}$ [Formula 19]

$S_V=\{$vertical frequency, and having a vertical frequency component in at least one check target coefficient$\}=\{j|i$ is optional,$(i,j)\in S_{HV}\}$ [Formula 20]

$S_{H|FreqV=x}=\{$set configured by the horizontal frequency of the check target coefficient whose vertical frequency is $x\}=\{i|(i,x)\in S_{HV}\}$ [Formula 21]

$S_{V|FreqH=x}=\{$set configured by the vertical frequency of the check target coefficient whose horizontal frequency is $x\}=\{j|(x,j)\in S_{HV}\}$ [Formula 22]

When the quantized coefficient has the value in formula 8, the sets $S_H$ and $S_V$ are expressed as follows.

$S_H=\{0, 1, 3\}$ $S_V=\{0, 1, 2\}$

Similarly, when the quantized coefficient has the value in formula 8, the sets $S_{H|FreqV=x}$, and $S_{V|FreqH=x}$ are respectively expressed as follows with x=0, 1, 2, 3.

$S_{H|FreqV=0}=\{0, 1, 2\}$ $S_{H|FreqV=1}=\{1\}$ $S_{H|FreqV=2}=\{0\}$ $S_{H|FreqV=3}=\phi$ $S_{V|FreqH=0}=\{0, 2\}$ $S_{V|FreqH=1}=\{0, 1\}$ $S_{V|FreqH=2}=\phi$ $S_{V|FreqH=3}=\{0\}$ $\phi$ is an empty set.

Formula 16 an be expressed by formula 23, if formula 16 is modified in a manner in which the coefficients by which the orthogonal basis vectors $T_i$, $T_j$ are multiplied using the set definitions of the formulas 19-22 are unified, and then by developing the absolute value square calculation of the vector.

[Formula 23]

$$E(s_{i_0 j_0}, s_{i_1 j_1}, \ldots, s_{i_{n-1} j_{n-1}}) =$$

$$\left\| \sum_{i \in S_H} \left( \sum_{j \in S_V | FreqH=i} s_{ij} \cdot c_{ij} \cdot Q \cdot t0_j \right) \cdot \vec{T_i} - \overrightarrow{TopEst} \right\|^2 +$$

$$\left\| \sum_{j \in S_V} \left( \sum_{i \in S_H | FreqV=j} s_{ij} \cdot c_{ij} \cdot Q \cdot t0_i \right) \cdot \vec{T_j^t} - \overrightarrow{LeftEst} \right\|^2 =$$

$$\sum_{i \in S_H} \left( \sum_{j \in S_V | FreqH=i} s_{ij} \cdot c_{ij} \cdot Q \cdot t0_j \right)^2 -$$

$$2 \cdot \sum_{i \in S_H} \left( \sum_{j \in S_V | FreqH=i} s_{ij} \cdot c_{ij} \cdot Q \cdot t0_j \right) \cdot \left\langle \vec{T_i}, \overrightarrow{TopEst} \right\rangle +$$

$$\left\| \overrightarrow{TopEst} \right\|^2 + \sum_{j \in S_V} \left( \sum_{i \in S_H | FreqV=j} s_{ij} \cdot c_{ij} \cdot Q \cdot t0_i \right)^2 -$$

$$2 \cdot \sum_{j \in S_V} \left( \sum_{i \in S_H | FreqV=j} s_{ij} \cdot c_{ij} \cdot Q \cdot t0_i \right) \cdot \left\langle \vec{T_j^t}, \overrightarrow{LeftEst} \right\rangle + \left\| \overrightarrow{LeftEst} \right\|^2$$

Assume that <A, B> is an inner product of the vectors A and B. Since $T_x$ is a normal orthogonal basis, the relationship in the following formula 24 is used in developing from formula 16 to formula 23.

$$<T_i, T_j> = \delta_{ij} \quad \text{[Formula 24]}$$

$\delta_{ij}$ is Kronecker's delta

As described above, the two consecutive values are different by 1 bit at most in Gray code. FIG. 43 is an example of a valid coefficient sign information candidate according to the Gray code when four coefficients are to be checked. For the valid coefficient sign information candidate index, the definition is made so that the value of the k-th bit of the Gray code expression can be the valid coefficient sign information candidate of the k-th valid coefficient. The diagonally shaded area in FIG. 43 is a code different from the valid coefficient sign information candidate immediately before. As illustrated in FIG. 43, between the valid coefficient sign information candidates, there is a change by one valid coefficient code at most. On the right hand side area in FIG. 43, with respect to the coefficient different from the valid coefficient sign information candidate immediately before, the position (4300) of the valid coefficient having a change, and a code change (4301) indicating whether the change in sign information from positive to negative, or from negative to positive are stored.

As described above, the sign information about at most one coefficient changes by the evaluation in the order of the Gray code.

Assume that the code of the m-th check target coefficient has been inverted between the idx-th and the (idx+1)th valid coefficient sign information candidate. As described with reference to formula 7, since the definition of the sign information according to the sixth embodiment is 1 for the positive sign information, and −1 for the negative sign information, it can be assumed that the code inversion indicates the change in sign information from $S_{i_m j_m}$ to $-S_{i_m j_m}$. Therefore, assuming that the sign information about the idx-th valid coefficient sign information candidate is $(S_{i_0 j_0}, S_{i_1 j_1}, S_{i_2 j_2}, \ldots, S_{i_m j_m}, \ldots, S_{i_{n-1} j_{n-1}})$, the sign information about the (idx+1)th valid coefficient sign information candidate can be expressed as $(S_{i_0 j_0}, S_{i_1 j_1}, S_{i_2 j_2}, \ldots, -S_{i_m j_m}, \ldots, S_{i_{n-1} j_{n-1}})$. Accordingly, the difference between the cost of the matching level of the (idx+1)th sign information candidate and the cost of the matching level of the idx-th sign information candidate can be expressed by the following formula 25 after substituting the respective sign information for formula 23 and obtaining the difference.

[Formula 25]

$$E(s_{i_0 j_0}, s_{i_1 j_1}, \ldots, -s_{i_m j_m}, \ldots, s_{i_{n-1} j_{n-1}}) -$$
$$E(s_{i_0 j_0}, s_{i_1 j_1}, \ldots, s_{i_m j_m}, \ldots, s_{i_{n-1} j_{n-1}}) =$$

$$\left( -2 \cdot s_{i_m j_m} \cdot c_{i_m j_m} \cdot Q \cdot t0_{j_m} + \sum_{j \in S_V | FreqH=i_m} s_{i_m j} \cdot c_{i_m j} \cdot Q \cdot t0_j \right)^2 -$$

$$\left( \sum_{j \in S_V | FreqH=i_m} s_{i_m j} \cdot c_{i_m j} \cdot Q \cdot t0_j \right)^2 -$$

$$2 \cdot \left( -2 \cdot s_{i_m j_m} \cdot c_{i_m j_m} \cdot Q \cdot t0_{j_m} + \sum_{j \in S_V | FreqH=i_m} s_{i_m j} \cdot c_{i_m j} \cdot Q \cdot t0_j \right) \cdot$$

$$\left\langle \vec{T_{i_m}}, \overrightarrow{TopEst} \right\rangle + 2 \cdot \left( \sum_{j \in S_V | FreqH=i_m} s_{i_m j} \cdot c_{i_m j} \cdot Q \cdot t0_j \right) \cdot \left\langle \vec{T_{i_m}}, \overrightarrow{TopEst} \right\rangle +$$

$$\left( -2 \cdot s_{i_m j_m} \cdot c_{i_m j_m} \cdot Q \cdot t0_{i_m} + \sum_{i \in S_H | FreqV=j_m} s_{i j_m} \cdot c_{i j_m} \cdot Q \cdot t0_i \right)^2 -$$

$$\left( \sum_{i \in S_H | FreqV=j_m} s_{i j_m} \cdot c_{i j_m} \cdot Q \cdot t0_i \right)^2 -$$

$$2 \cdot \left( -2 \cdot s_{i_m j_m} \cdot c_{i j_m} \cdot Q \cdot t0_{i_m} + \sum_{i \in S_H | FreqV=j_m} s_{i j_m} \cdot c_{i j_m} \cdot Q \cdot t0_i \right) \cdot$$

$$\left\langle \vec{T_{j_m}^t}, \overrightarrow{LeftEst} \right\rangle + 2 \cdot \left( \sum_{i \in S_H | FreqV=j_m} s_{i j_m} \cdot c_{i j_m} \cdot Q \cdot t0_i \right) \cdot \left\langle \vec{T_{j_m}^t}, \overrightarrow{LeftEst} \right\rangle$$

Furthermore, formula 25 can be developed and simplified into formula 26 as follows.

[Formula 26]

$$E(s_{i_0 j_0}, s_{i_1 j_1}, \ldots, -s_{i_m j_m}, \ldots, s_{i_{n-1} j_{n-1}}) -$$
$$E(s_{i_0 j_0}, s_{i_1 j_1}, \ldots, s_{i_m j_m}, \ldots, s_{i_{n-1} j_{n-1}}) =$$

$$-s_{i_m j_m} \cdot \frac{(2 \cdot c_{i_m j_m} \cdot Q \cdot t0_{j_m})}{(A_m)} \cdot$$

$$\left( -s_{i_m j_m} \cdot \frac{(2 \cdot c_{i_m j_m} \cdot Q \cdot t0_{j_m})}{(A_m)} + 2 \cdot \frac{\sum_{j \in S_V | FreqH=i_m} s_{i_m j} \cdot c_{i_m j} \cdot Q \cdot t0_j}{(X)} \right) -$$

$$s_{i_m j_m} \cdot \frac{(2 \cdot c_{i_m j_m} \cdot Q \cdot t0_{i_m})}{(B_m)} \cdot$$

$$\left( -s_{i_m j_m} \cdot \frac{(2 \cdot c_{i_m j_m} \cdot Q \cdot t0_{i_m})}{(B_m)} + 2 \cdot \frac{\sum_{i \in S_H | FreqV=j_m} s_{i j_m} \cdot c_{i j_m} \cdot Q \cdot t0_i}{(Y)} \right) -$$

$$s_{i_m j_m} \cdot \frac{\left( -4 \cdot c_{i_m j_m} \cdot Q \cdot \left( t0_{j_m} \cdot \left\langle \vec{T_{i_m}}, \overrightarrow{TopEst} \right\rangle + t0_{i_m} \cdot \left\langle \vec{T_{j_m}^t}, \overrightarrow{LeftEst} \right\rangle \right) \right)}{(C_m)}$$

In formula 26, the difference between them indicates only the information about the horizontal frequency component $i_m$ and the vertical frequency component $j_m$ of the coefficient whose sign information has been inverted. Therefore, the calculation of the difference of the cost of the matching level between the idx-th and (idx+1)th valid coefficient sign information candidates by formula 26 is largely reduced in computational complexity as compared with the case in which all costs of the matching levels are obtained in formula 23. The cost of the matching level for the (idx+1)th candidate can be obtained only by adding the value obtained by formula 26 to the cost of the matching level of the idx-th candidate. Therefore, in the method of adding the value of formula 26 to the cost of the matching level of the idx-th candidate, the cost of the matching level of the (idx+1)th candidate can be obtained by considerably low computational complexity as compared with the method of calculating the cost of the matching level each time by formula 23.

Furthermore, in formula 26, term $(a_m)$, term $(B_m)$, and term $(C_m)$ are constants relating to the m-t check target coefficient. Therefore, the calculation of the difference in the matching level cost can be performed with further lower computational complexity by associating the values of the terms $(A_m)$, $(B_m)$, and $(C_m)$ relating to all check target coefficients with the number m of the check target coefficient as a table in advance.

The terms (X) and (Y) including $\Sigma$ respectively a weight coefficient of the orthogonal basis vector $T_{im}$ whose horizontal frequency is $i_m$ and a weight coefficient of the orthogonal basis vector $T_{jm}$ whose vertical frequency is $j_m$ when the valid coefficient sign information candidate index is idx in formula 23. Therefore, it is necessary to update the terms (X) and (Y) into the weight coefficients whose valid coefficient sign information candidate is (idx+1) after the calculation of the cost of the matching level of (idx+1).

The value of (X) of the horizontal information frequency $i_m$ when the valid coefficient sign information candidate index is idx is defined as Weight_$H_{(idx)}$ [$i_m$] by formula 27.

$$\text{Weight\_H}_{(idx)}[i_m] = \sum_{j \in S_V | FreqH=i_m} s_{i_m j} \cdot c_{i_m j} \cdot Q \cdot t0_j \quad \text{[Formula 27]}$$

Similarly, the value of (X) of the horizontal information frequency $i_m$ when the valid coefficient sign information candidate index to be next obtained is (idx+1) is defined as Weight_$H_{(idx+1)}$ [$i_m$]. Then, as indicated by formula 27, Weight_$H_{(idx+1)}$ [$i_m$] is expressed by the following formula 28 from the value Weight_$H_{(idx)}$ [$i_m$] of (X) when the valid coefficient sign information candidate index is idx and the constant $(A_m)$ associated with the number m of the check target coefficient.

$$\begin{aligned}\text{Weight\_H}_{(idx)}[i_m] &= \sum_{j \in S_V | FreqH=i_m} s_{i_m j} \cdot c_{i_m j} \cdot Q \cdot t0_j - \\ & \quad 2 \cdot s_{i_m j_m} \cdot c_{i_m j_m} \cdot Q \cdot t0_{j_m} \\ &= \sum_{j \in S_V | FreqH=i_m} s_{i_m j} \cdot c_{i_m j} \cdot Q \cdot t0_j - \\ & \quad s_{i_m j_m} \cdot (2 \cdot c_{i_m j_m} \cdot Q \cdot t0_{j_m}) \\ &= \text{Weight\_H}_{(idx)}[i_m] - s_{i_m j_m} \cdot (A_m)\end{aligned} \quad \text{[Formula 28]}$$

That is, Weight_$H_{(idx+1)}$ [$i_m$] can be obtained by subtracting the value obtained by multiplying $(A_m)$ by the sign information $S_{i_m j_m}$ (positive:1/negative:−1) about the coefficient m of the idx-th sign information candidate index from Weight_$H_{(idx)}$ [$i_m$].

Similarly, the value of (Y) of the vertical information frequency $j_m$ when the valid coefficient sign information candidate index is idx is defined as Weight_$V_{(idx)}$ [$i_m$] by formula 29.

$$\text{Weight\_V}_{(idx)}[j_m] = \sum_{i \in S_H | FreqV=j_m} s_{i j_m} \cdot c_{i j_m} \cdot Q \cdot t0_i \quad \text{[Formula 29]}$$

Similarly, the value of (Y) of the vertical information frequency $j_m$ when the valid coefficient sign information candidate index is (idx+1) is defined as Weight_$V_{(idx+1)}$ [$j_m$]. Then, as indicated by formula 29, Weight_$V_{(idx+1)}$ [$j_m$] is expressed by the following formula 30 from the value Weight_$V_{(idx)}$ [$j_m$] of (Y) when the valid coefficient sign information candidate index is idx and the constant $(B_m)$ associated with the number m of the check target coefficient.

[Formula 30]

$$\begin{aligned}\text{Weight\_V}_{(idx+1)}[j_m] &= \sum_{i \in S_H | FreqV=j_m} s_{i j_m} \cdot c_{i j_m} \cdot Q \cdot t0_i - \\ & \quad 2 \cdot s_{i_m j_m} \cdot c_{i_m j_m} \cdot Q \cdot t0_{i_m} \\ &= \sum_{i \in S_H | FreqV=j_m} s_{i j_m} \cdot c_{i j_m} \cdot Q \cdot t0_i - \\ & \quad s_{i_m j_m} \cdot (2 \cdot c_{i_m j_m} \cdot Q \cdot t0_{i_m}) \\ &= \text{Weight\_V}_{(idx)}[j_m] - s_{i_m j_m} \cdot (B_m)\end{aligned}$$

That is, Weight_$V_{(idx+1)}$ [$j_m$] can be obtained by subtracting the value obtained by multiplying $(B_m)$ by the sign information $S_{i_m j_m}$ (positive:1/negative:−1) about the coefficient m of the idx-th sign information candidate index from Weight_$V_{(idx)}$ [$j_m$].

Therefore, according to formulas 28 and 30, since the values of terms (X) and (Y) of the (idx+1)th sign information candidate index are obtained by adding or subtracting the values of the constants $(A_m)$ and $(B_m)$ to and from the terms (X) and (Y) of the idx-th sign information candidate indexes depending on the sign information $S_{i_m j_m}$, the terms (X) and (Y) can be calculated with lower computational complexity.

Usually, as described above with reference to FIG. 24 etc., an inverse frequency transformation is performed with high computational complexity to the boundary pixel prediction error provisional value of the error image area for each sign information candidate to perform a cost calculation depending on the difference from the boundary pixel prediction error estimation value. On the other hand, according to the sixth embodiment, the Gray code order sign information candidate index is adopted. Under the conditions, formulas 26, 28, and 30 indicate the cost calculation of each sign information candidate index can be performed by the recurrence formula for adding the cost difference value to the cost calculation value of the immediately previous sign information candidate index. Therefore, in the sixth embodiment, the cost calculation is performed based on the inverse quantization and the inverse frequency transformation process only on the first sign information candidate index, and only the recurrence formula calculation is performed in the cost calculation on the second and subsequent sign information candidate indexes. Thus, the cost calculation on all sign information candidate indexes can be completed.

Therefore, the method of sequentially adding the cost of the matching level based on formula 26 using the table expression of $(A_m)$, $(B_m)$, and $(C_m)$, and the method of updating (X) and (Y) by formulas 28 and 30 can reduce the computational complexity much more than the method of calculating the cost of the matching level each time by formula 23.

According to the above described method, the processes of the initialization unit 4271, the Gray code order valid coefficient sign information candidate generation unit 4240, and the Gray code order prediction error matching level update unit 4272 for sequentially updating the cost of the matching level using a table etc. are described below.

FIG. 44 is a flowchart of the process of deriving a valid coefficient sign information prediction value according to the sixth embodiment.

In step S4401, a variable and a constant necessary for a calculation are set. FIG. 45 is an explanatory view of the detailed operation in step S4401.

Step S4501 is to define each variable and constant. L indicates a degree of an orthogonal basis. In the sixth embodiment, L is 4, but is not limited to 4. The degree of orthogonal basis may be different between horizontal and vertical frequencies.

Q indicates a value of a quantizer. "t0x" indicates a coefficient of the pixel 0 of the orthogonal basis of the frequency x. "n" indicates the number of check target coefficients. $(i_k, j_k)$ indicates the horizontal and vertical frequencies of the k-th check target coefficient to be checked, and k can be a value from 1 to n. $C_{ikjk}$ indicates an absolute value of the quantized value of the k-th check target coefficient in n check target coefficients.

Weight_H [0 . . . L−1] and Weight_V[0 . . . L−1]=0 are tables of size L storing the weight of each orthogonal basis of horizontal and vertical frequency. Weight_H[0 . . . L−1] is to hold the value of term (X) of formula 26 for each horizontal frequency, and Weight_V[0 . . . L−1] is to hold the value of term (Y) of formula 26 for each vertical frequency.

Table_H[1 . . . n], Table_V[1 . . . n], and Table_HV[1 . . . n] are tables storing terms $(A_k)$, $(B_k)$, and $(C_k)$ of formula 26 where m indicates the number (k can be from 1 to n) of a check target coefficient.

"m" is a variable indicating the position of the check target coefficient having different sign information between the valid coefficient sign information candidate index (idx) and the next valid coefficient sign information candidate index (idx+1). "s" indicates the information about a change of the code of the m-th check target coefficient, and 0 indicates the case in which the sign information changes from a negative value to a positive value, and 1 indicates the case in which it changes from a positive value to a negative value. An example of n=4 for m and s indicates a valid coefficient (4300) and a code change (4301) in FIG. 43.

"idx" is a variable for indicating an index of a valid coefficient sign information candidate to be checked. min_idx is a variable for indicating an index of a valid coefficient sign information candidate having the minimum cost of the matching level during the process of sequential evaluation.

"cost" is a variable for indicating the cost of the matching level in the index of the valid coefficient sign information candidate to be checked. "min_cost" is a variable for indicating the minimum cost of the matching level corresponding to min_idx. PredSign[1 . . . n] is a valid coefficient sign information prediction value output from the valid coefficient sign information prediction unit 4224 in FIG. 42.

In step S4402, the valid coefficient sign information candidate index idx is set to 1. The "cost" as the cost of the matching level is set to 0. The cost corresponds to idx of 0, that is, sign information for of n check target coefficients is all positive. The cost of the matching level of idx=0 is obtained by formula 23. However, as described above with reference to formula 26, since the cost of the matching level can be updated based on the difference, that is, the relative value, and it is only necessary that "idx" for assignment of the minimum value of the cost can be obtained, there is no undesired influence in deriving idx for assignment of the minimum cost although the initial value of the cost is 0. In addition, min_cost and min_idx are set to be 0 corresponding to idx=0.

In step S4403, the table is initialized. FIG. 46 is an explanatory view of a table initializing step S4403 according to the sixth embodiment. The step S4403 corresponds to the process of the initialization unit 4271.

In step S4601, the tables Weight_H[0 . . . L−1] and Weight_V[0 . . . L−1] are initialized to 0. The counter variable k is initialized to 1.

In step S4602, Table_H[1 . . . n], Table_V[1 . . . n], and Table_HV[1 . . . n] are initialized. For each of Table_H[k], Table_V[k], and Table_HV[k], the values to be initialized are $(A_k)$, $(B_k)$, and $(C_k)$ in formula 26, that is, the values are set according to formulas 31, 32, and 33.

$$\text{Table\_}H[k] = 2 \cdot c_{i_k j_k} \cdot Q \cdot t0_{j_k} \quad \text{[Formula 31]}$$

$$\text{Table\_}V[k] = 2 \cdot c_{i_k j_k} \cdot Q \cdot t0_{i_k} \quad \text{[Formula 32]}$$

$$\text{Table\_}HV[k] = -4 \cdot c_{i_k j_k} \cdot Q \cdot (t0_{j_k} \langle \vec{T_{i_k}}, \overrightarrow{\text{TopEst}} \rangle + t0_{i_k} \langle \vec{T_{j_k}'}, \overrightarrow{\text{LeftEst}} \rangle) \quad \text{[Formula 33]}$$

The value set in each table according to formulas 31, 32, and 33 can be an approximation obtained by rounding each formula by an appropriate bit length to reduce a necessary bit length to store the value.

Weight_H[0 . . . L−1] and Weight_V[0 . . . L−1] are obtained by adding the weight contribution to the orthogonal basis vector of each frequency of the respective coefficients based on the definitions of the terms (X) and (Y) of formula 23 or 26. First, idx=0, that is, the codes of all check target coefficients are positive. Thus, the contribution when the sign information is positive for the horizontal frequency $i_k$ and vertical frequency $j_k$ of the check target coefficient in the i-th frequency to be checked is to be cumulatively added to Weight_H[$i_k$] and Weight_V[$j_k$]. Therefore, the values of Weight_H[$i_k$] and Weight_V[$j_k$] are updated by formulas 34 and 35 for the k-th check target coefficient, thereby obtaining the terms (X) and (Y) when the codes of all check target coefficients are positive (idx=0).

$$\text{Weigth\_}H[i_k] = \text{Weigth\_}H[i_k] + c_{i_k j_k} \cdot Q \cdot t0_{j_k} = \text{Weigth\_}H[i_k] + (\text{Table\_}H[k]/2) \quad \text{[Formula 34]}$$

$$\text{Weight\_}V[j_k] = \text{Weight\_}V[j_k] + c_{i_k j_k} \cdot Q \cdot t0_{i_k} = \text{Weight\_}V[j_k] + (\text{Table\_}V[k]/2) \quad \text{[Formula 35]}$$

In step S4603, the counter k is incremented. When k is larger than n in step S4603, the process is terminated. Otherwise, the process in step S4602 is performed on the check target coefficient not set yet.

In step S4404 in FIG. 44, the coefficient m for which the sign information about the valid coefficient sign information candidate changes between the idx of the index of the Gray code valid coefficient sign information candidate and the prior index (idx−1) and the information s about the code change are generated. Step S4404 corresponds to the process of the Gray code order valid coefficient sign information candidate generation unit 4240 in FIG. 42.

FIG. 47 is an explanatory view of the process in step S4404 according to the sixth embodiment.

In step S4702, each variable is set. The valid coefficient sign information candidate index prev_idx is obtained by subtracting 1 from the current idx. Then, the binary expression CandGrayCode of the Gray code of the current valid coefficient sign information candidate is obtained. According to the notation of the C language, the CandGrayCode can be obtained by the following formula 36 where "^" indicates an exclusive logical sum, and "x>>n" indicates the n bit right shift of x.

$$\text{CandGrayCode} = idx \char`\^ (idx >> 1) \quad \text{[Formula 36]}$$

When the k-bit value is 0 for the obtained result, the sign information candidate of the k-th coefficient in the check target coefficients is positive, and when it is 1, the sign information candidate is negative. An example of generating a value by formula 36 is described with reference to FIG. 43. In FIG. 43, when the value of the column of "valid coefficient sign information candidate index" is assigned, the binary expression of the Gray code obtained by formula 36 is the value described in the column of "Gray code of a candidate index".

Similarly, the Gray code corresponding to prey idx is defined as PrevCandGrayCode, and is obtained by the following formula 37.

$$\text{PrevCandGrayCode} = prev\_idx \char`\^ (prev\_idx >> 1) \quad \text{[Formula 37]}$$

In step S4703, CandGrayCode and PrevCandGrayCode are expressed in binary, and bit position m having different values is specified. For example, when valid coefficient sign information candidate index idx=6 in FIG. 43, CandGrayCode="0101", and prev_idx=4, thereby resulting in PrevCandGrayCode="0111". In this case, since the first bit value is different, m=1.

In step S4704, it is checked whether or not the value of the m-th bit of CandGrayCode is 0. If it is 0, s=0 is set in step S4705. Otherwise, s=1 is set in step S4706. In this example, s=0 indicates that the sign information about the m-th coefficient has changed from negative to positive, and s=1 indicates that it has changed from positive to negative.

In the case of the example above, since "m=1", the first bit of CandGrayCode is checked and detected as 0. Therefore, "s=0" is output. Then, in step S4707, the process is terminated.

Step S4404 can be realized as a table of m and s having the corresponding values in a valid coefficient 4300 and a code change 4301 indicating the changes in FIG. 43 using the valid coefficient sign information candidate index as a key according to FIG. 43 etc.

Step S4405 in FIG. 44 is to obtain the cost of the matching level of the value of idx of the valid coefficient sign information candidate index. This step corresponds to the process of the Gray code order prediction error matching level update unit 4272 in FIG. 42.

Figure 48:
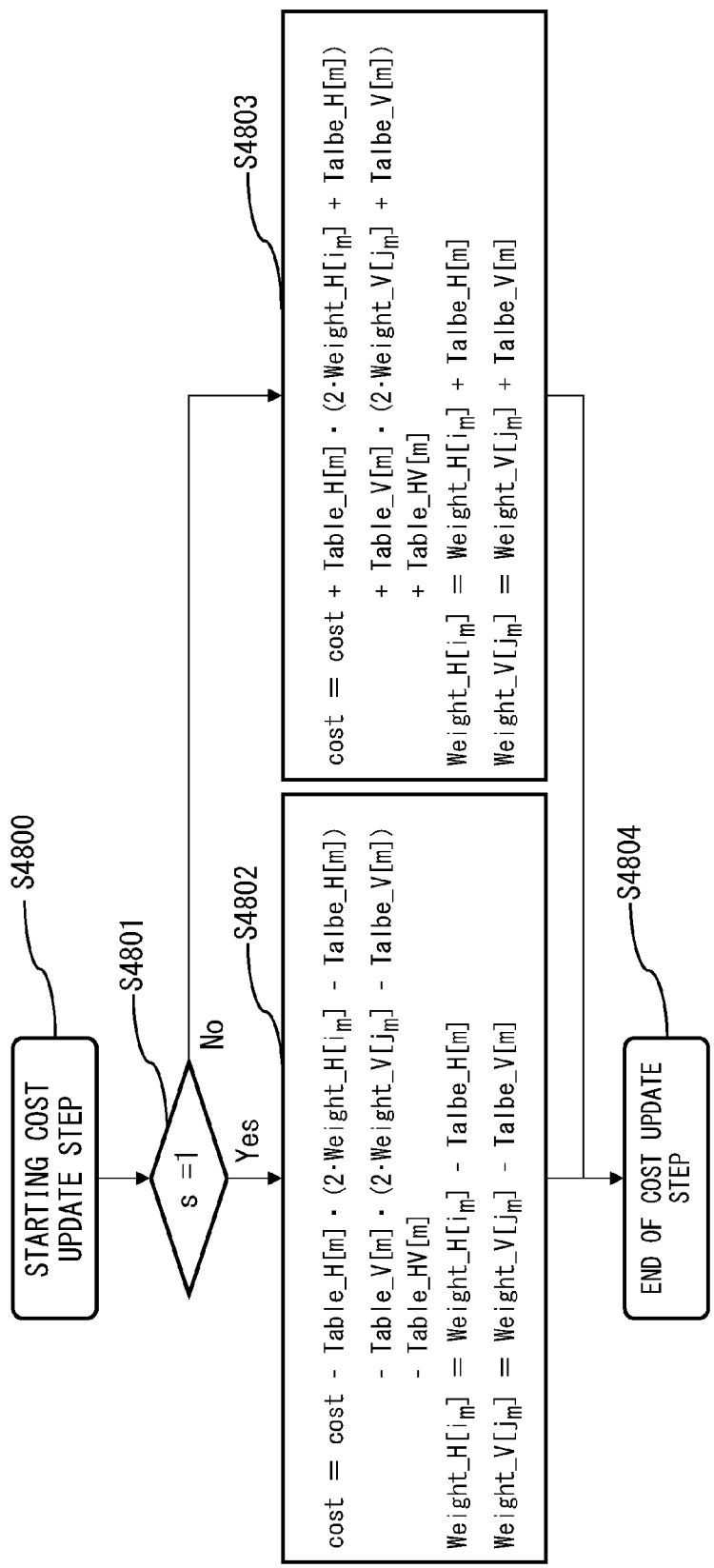
FIG. 48 is a flowchart of a cost updating step according to the sixth embodiment.

FIG. 48 is a flowchart of updating the cost of the matching level in step S4405. First, in step S4801, it is determined whether or not s is 1. When s=1, it is known that the code of the previous valid coefficient sign information candidate index is inverted from positive to negative. In this case, in the process in step S4802, the cost of the matching level and the variables Weight_H [0 ... L−1] and Weight_V[0 ... L−1] are updated.

In S4802, the calculation of the cost of the matching level is performed. The update is performed by formula 38.

$$\text{cost} = \text{cost} - \text{Table\_}H[m] \cdot (2 \cdot \text{Weight\_}H[i_m] - \text{Table\_}H[m]) - \text{Table\_}V[m] \cdot (2 \cdot \text{Weight\_}V[j_m] - \text{Table\_}V[m]) - \text{Table\_}HV[m] \quad \text{[Formula 38]}$$

The form is prepared from formula 26 using the sign information candidate $S_{imjm}$ of the previous m-th coefficient of 1 (positive), Table_H[m], Table_V[m], and Table_HV[m] as term ($A_m$), term ($B_m$), and term ($C_m$), Weight_H[$i_m$] as the term (X), and Weight_V[$j_m$] as the term (Y). $i_m$ and $j_m$ are the horizontal and vertical frequencies of the m-th check target coefficient.

As the updating process on the weight coefficient of the basis vector, the calculation by formulas 39 and 40 obtained by substituting 1 for $S_{imjm}$ in formulas 27 and 30 is performed.

$$\text{Weight\_}H[im] = \text{Weight\_}H[im] - \text{Table\_}H[m]) \quad \text{[Formula 39]}$$

$$\text{Weight\_}V[jm] = \text{Weight\_}V[jm] - \text{Table\_}V[m] \quad \text{[Formula 40]}$$

When s=0, the code of the previous valid coefficient sign information candidate index is inverted from negative to positive. In this case, in the process in step S4803, the cost of the matching level and the variables Weight_H[0 ... L−1] and Weight_V[0 ... L−1] are updated.

In step S4803, the cost of the matching level is first calculated. The update is performed by formula 41.

$$\text{cost} = \text{cost} + \text{Table\_}H[m] \cdot (2 \cdot \text{Weight\_}H[i_m] + \text{Table\_}H[m]) + \text{Table\_}V[m] \cdot (2 \cdot \text{Weight\_}V[j_m] + \text{Table\_}V[m]) + \text{Table\_}HV[m] \quad \text{[Formula 41]}$$

The form is prepared from formula 26 using the sign information candidate $S_{imjm}$ of the previous m-th coefficient of −1 (negative), Table_H[m], Table_V[m], and Table_HV[m] as term ($A_m$), term ($B_m$), and term ($C_m$), Weight_H[$i_m$] as the term (X), and Weight_V[$j_m$] as the term (Y). $i_m$ and $j_m$ are the horizontal and vertical frequencies of the m-th check target coefficient.

As the updating process on the weight coefficient of the basis vector, the calculation by formulas 39 and 40 obtained by substituting −1 for $S_{imjm}$ in formulas 42 and 43 is performed.

$$\text{Weight\_}H[im] = \text{Weight\_}H[im] + \text{Table\_}H[m]) \quad \text{[Formula 42]}$$

$$\text{Weight\_}V[jm] = \text{Weight\_}V[jm] + \text{Table\_}V[m] \quad \text{[Formula 43]}$$

Since the updating calculation of the cost of the matching level in steps S4802 or S4803 can be updated by seven adding operations, two multiplying operations, and two arithmetic shifts (when the operation of doubling Weight_H[$i_m$] and Weight_V[$j_m$] is realized by an arithmetic shift), the computational complexity is very low.

It is determined in step S4406 in FIG. 44 whether or not the cost obtained in step S4405 is smaller than min_cost. Only when the cost is smaller than min_cost, cost is substituted for min_cost to update the minimum cost, and idx is substituted for min_idx, thereby updating the sign information candidate index for assignment of the minimum cost of the matching level.

In step S4408, the valid coefficient sign information candidate index idx is incremented, and the value is compared with $2^n$ in step S4409, thereby determining whether or not all valid coefficient sign information candidate indexes have been evaluated.

When all valid coefficient sign information candidate indexes have been evaluated, a valid coefficient sign information prediction value is generated in step S4410.

FIG. 49 is a flowchart of a valid coefficient sign information prediction value generating method in step S4410.

In step S4901, a corresponding Gray code is obtained from the valid coefficient sign information candidate index min_idx for assignment of the minimum cost of the matching level, and set it in the variable MinGrayCode. The calculating method corresponds to that described with reference to step S4404. Then, in step S4902, the counter k is initialized. "k" corresponds to the number of the check target coefficient.

In S4903, it is determined whether or not the value of the k-th bit of MinGrayCode is 0. If it is 0, the k-th entry PredSign [k] of the valid coefficient sign information prediction value table PredSign is set to 0 in step S4904. Otherwise, it is set to 1 in step S4905. Then, the counter k is incremented in step S4906, and it is determined in step S4907 whether or not the valid coefficient sign information prediction values of all check target coefficients have been obtained. If the valid coefficient sign information prediction values of all check target coefficients are set, the step is terminated.

Then, in S4411 in FIG. 44, the process of the valid coefficient sign information prediction value is terminated, and the n obtained valid coefficient sign information prediction value PredSign[1 ... n] is output as a valid coefficient sign information prediction value in FIG. 42.

The process of the maximum likelihood coefficient sign information determination unit 4242 corresponds to steps of S4406-S4410.

When a fixed-length code is used, the influence of the fixed-length code on the reproduced prediction error is calculated in advance, and the reproduced prediction error estimation value is corrected based on the influence. An example of the correcting method is described below. The set of the horizontal and vertical frequencies of the coefficient using the fixed-length code is defined as $S_{1HV\_Fix}$ in formula 44.

$$S_{HV\_Fix} = \{\text{set including a combination } (i,j) \text{ of all horizontal and vertical frequencies using fixed-length code}\} = \{(i_n, j_n), (i_{n+1}, j_{n+1}), \ldots, (i_{p-1}, j_{p-1})\}$$ [Formula 44]

The cumulative sum expression 4010 of the LeftDiff vector is expressed by the following formula 45

$$\overrightarrow{LeftDiff} = \sum_{(i,j) \in S_{HV}} s_{ij} \cdot c_{ij} \cdot Q \cdot t0_i \cdot \overrightarrow{T_j^t} + \sum_{(i,j) \in S_{HV\_Fix}} s_{ij} \cdot c_{ij} \cdot Q \cdot t0_i \cdot \overrightarrow{T_j^t}$$ [Formula 45]

Similarly, the cumulative sum expression 4010 of the TopDiff vector is expressed by the following formula 46.

$$\overrightarrow{TopDiff} = \sum_{(i,j) \in S_{HV}} s_{ij} \cdot c_{ij} \cdot Q \cdot t0_j \cdot \overrightarrow{T_i} + \sum_{(i,j) \in S_{HV\_Fix}} s_{ij} \cdot c_{ij} \cdot Q \cdot t0_j \cdot \overrightarrow{T_i}$$ [Formula 46]

Then, as the cost of the matching level, the absolute value of square of the difference vector between the vectors of the reproduced prediction error estimation value and the reproduced prediction error provisional value is obtained as by formula 16, thereby obtaining formula 47.

$$E(s_{i_0 j_0}, s_{i_1 j_1}, \ldots, s_{i_{n-1} j_{n-1}}) =$$ [Formula 47]

$$\left\| \overrightarrow{TopDiff} - \overrightarrow{TopEst} \right\|^2 + \left\| \overrightarrow{LeftDiff} - \overrightarrow{LeftEst} \right\|^2 =$$

$$\left\| \sum_{(i,j) \in S_{HV}} s_{ij} \cdot c_{ij} \cdot Q \cdot t0_j \cdot \overrightarrow{T_i} - \left( \overrightarrow{TopEst} - \sum_{(i,j) \in S_{HV\_Fix}} s_{ij} \cdot c_{ij} \cdot Q \cdot t0_j \cdot \overrightarrow{T_i} \right) \right\|^2$$

$$+$$

$$\left\| \sum_{(i,j) \in S_{HV}} s_{ij} \cdot c_{ij} \cdot Q \cdot t0_i \cdot \overrightarrow{T_j^t} - \left( \overrightarrow{LeftEst} - \sum_{(i,j) \in S_{HV\_Fix}} s_{ij} \cdot c_{ij} \cdot Q \cdot t0_i \cdot \overrightarrow{T_j^t} \right) \right\|^2$$

The vectors TopEst' and LeftEst' are defined as by formula 48.

$$\overrightarrow{TopEst'} = \overrightarrow{TopEst} - \sum_{(i,j) \in S_{HV\_Fix}} s_{ij} \cdot c_{ij} \cdot Q \cdot t0_j \cdot \overrightarrow{T_i}$$ [Formula 48]

$$\overrightarrow{LeftEst'} = \overrightarrow{LeftEst} - \sum_{(i,j) \in S_{HV\_Fix}} s_{ij} \cdot c_{ij} \cdot Q \cdot t0_i \cdot \overrightarrow{T_j^t}$$

If the vectors TopEst' and LetEst' are used instead of the vectors TopEst and LeftEst in and after formula 23, the valid coefficient sign information prediction value can be obtained in the same method as in the case in which there is no coefficient using a fixed-length code.

If the values of the terms (Am), (Bm), and (Cm) explained with reference to formula 26 according to the sixth embodiment are large, it is expected that the change of the value in formula 26 is also large, that is, the influence on the cost of the matching level is also large, when the sign information of the corresponding coefficient changes. As explained above with reference to the fourth embodiment, the computational complexity can be expected much more by sorting the coefficients that largely changes matching level with priority. Therefore, the valid coefficient sorting unit 4270 (FIG. 42) according to the sixth embodiment obtains the values of the terms (Am), (Bm), and (Cm) of all coefficients in advance, and the larger the values of all or a part of their absolute values or the values obtained by adding some values with a weight are, the higher possibility the coefficients can be prioritized in sorting.

The method of realizing a valid coefficient sign information prediction unit according to the sixth embodiment described above can be applied to an encoding device and a decoding device according to the fourth and fifth embodiments. According to the sixth embodiment, as described above with reference to an example of a 4-point Hadamard transform, the method can be applied without losing generality in the 4-point orthogonal transformation and other orthogonal transformations used in the ITU-T H.264. Furthermore, the method described in the sixth embodiment can be applied without losing generality on the 8-point, 16-point, or other grades of orthogonal transformation as clearly indicated without depending on a specific grade of orthogonal transformation in any of horizontal and vertical directions in each form, for example, formulas 31, 32, 33, etc. Similarly, those skilled in the art can easily realize the application to encoding using an orthogonal transformation having different degrees in the horizontal and vertical directions. Since the method described in the sixth embodiment can easily realize a normal orthogonal basis by performing a constant multiplication on the basis when the encoding operation using an orthogonal basis having a norm other than 1, that is, a non-normal orthogonal basis, those skilled in the art can easily realize the application by correcting the method. Furthermore, those skilled in the art can also easily realize in other variations by, for example, performing a calculation by the formulas in the sixth embodiment for a table, obtaining data in a table by each calculation according to the sixth embodiment, etc. In addition, according to the sixth embodiment, the same quantizer is used for all coefficients, but those skilled in the art can use a different quantizer depending on each frequency coefficient to realize the application because it is only necessary to make a change of Q by formula 26 etc. into a quantizer depending on the frequency.

Furthermore, an example of a transformation according to the first through sixth embodiments is applied not only to moving images encoding and decoding but also to encoding/decoding a still image. Each variation example according to the present embodiments and other variation examples easily realized by those skilled in the art according to the present embodiments are also included in the technological scope of the present invention.

Figure 50:
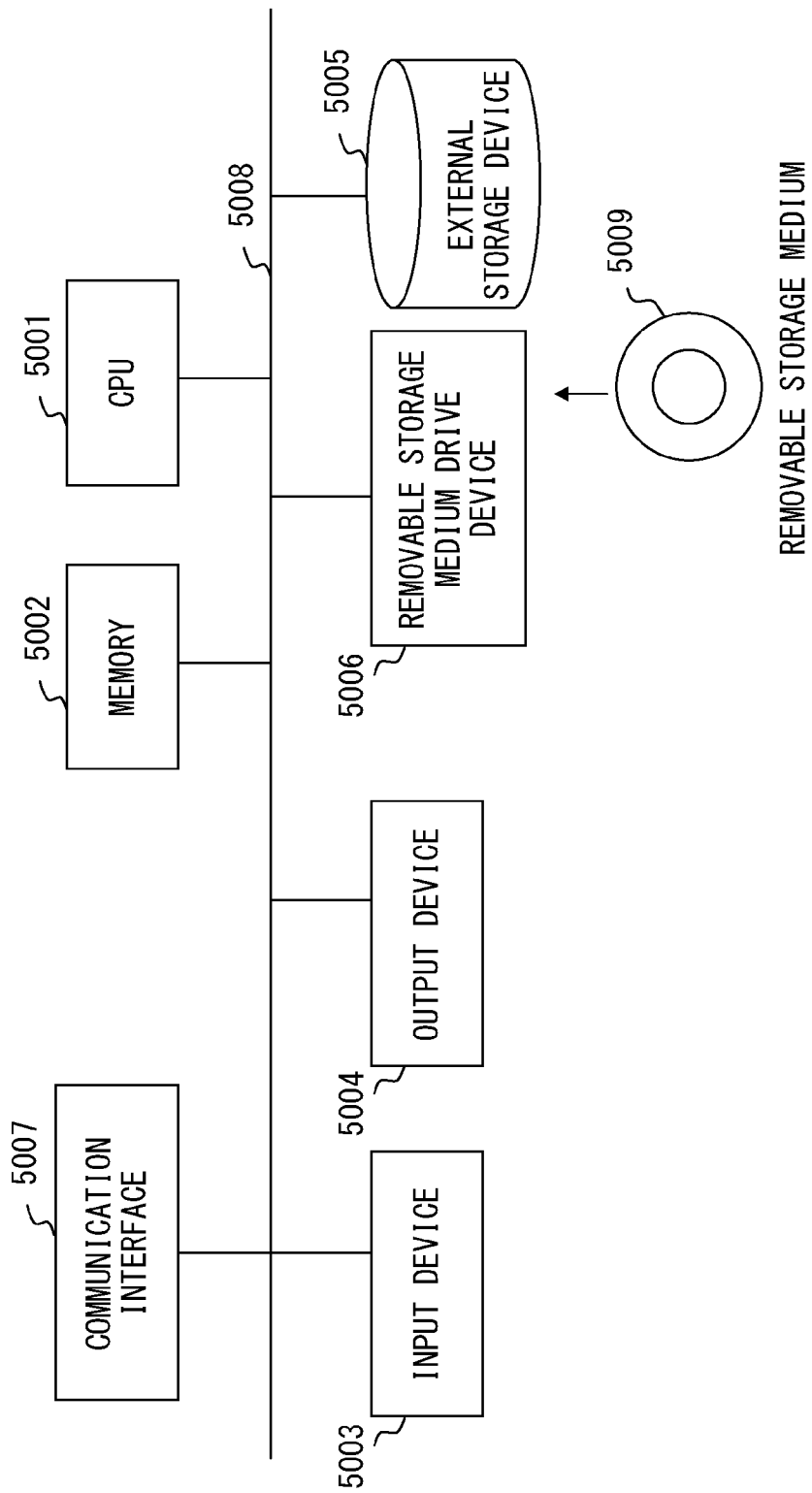
FIG. 50 is an example of a hardware configuration of the computer for realizing the embodiments and the variation examples.

FIG. 50 illustrates an example of a hardware configuration of the computer for realizing an encoding device, a decoding device, and the variation example according to the first through sixth embodiments of the present invention.

A computer illustrated in FIG. 50 includes a CPU 5001, memory 5002, an input device 5003, an output device 5004, an external storage device 5005, a removable storage medium drive device 5006 into which the removable storage medium 5009 is inserted, and a communication interface 5007. These components are interconnected by bus 5008.

The CPU 5001 controls the entire computer. The memory 5002 can be RAM etc. for temporarily storing a program or data stored in the external storage device 5005 (or the removable storage medium 5009) when the program is executed and data is updated. The CPU 5001 performs the entire control by reading the program to the memory 5002 and executing it.

The input device 5003 detects an inputting operation by a user, reports the detection result to the CPU 5001, and outputs the data transmitted by the control of the CPU 5001 to the output device such as a display device and a printing device.

The external storage device 5005 is, for example, a hard disk storage device (or HDD), and is used for storing various types of data and programs.

The removable storage medium drive device 5006 accommodates the removable storage medium 5009 such as an optical disk, SDRAM, CompactFlash (registered trademark) etc., and functions as a support of the external storage device 5005.

The communication interface 5007 connects a communication circuit of, for example, a LAN (local area network) or a WAN (wide area network).

The above-mentioned first through sixth embodiments are realized by the CPU 5001 executing each control program corresponding to the function block and flowchart for realizing the function of each embodiment. The program can be recorded and distributed on, for example, the external storage device 5005 and the removable storage medium 5009, or can be acquired over a network by the communication interface 5007. Data is stored and operated on the external storage device 5005 or the memory 5002. A work area in which each control program is executed as necessary is developed on the memory 5002.

According to the embodiments of the invention, sign information of one symbol per pixel can be encoded less than one bit in average by performing appropriate entropy encoding on sign information matching information in which sign information match corresponding prediction value, the volume of the sign information is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A moving image encoding device which encodes each encoding block obtained by dividing an encoding target image into a plurality of blocks, the moving image encoding device comprising:
   a processor which executes a process including:
      generating an encoding block prediction image of a target encoding block;
      generating a prediction error image as a difference between the target encoding block and the encoding block prediction image;
      transforming the prediction error image into frequency coefficients;
      quantizing the frequency coefficients to generate quantized coefficients;
      inversely quantizing the quantized coefficients to generate reproduced frequency coefficients;
      inversely transforming the reproduced frequency coefficients into a reproduced prediction error image;
      generating a locally decoded image from the reproduced prediction error image and the encoding block prediction image;
      generating a boundary pixel prediction value as a prediction value of a boundary pixel adjacent to an encoded block in the target encoding block from a locally decoded image of a plurality of encoded blocks adjacent to the target encoding block;
      generating boundary pixel prediction error estimation information from the boundary pixel prediction value and the encoding block prediction image with respect to the boundary pixel; and
      generating encoding block entropy encoded data from the quantized coefficients and the boundary pixel prediction error estimation information, wherein
   the generating encoding block entropy encoded data includes:
      extracting non-zero coefficient as a valid coefficient from the quantized coefficients, and generating valid coefficient position information indicating a frequency position of the valid coefficient, valid coefficient absolute value information as an absolute value of the valid coefficient, and valid coefficient sign information indicating a positive/negative code of the valid coefficient;
      generating a valid coefficient sign information prediction value as a prediction value of sign information indicating whether the valid coefficient is positive or negative from the boundary pixel prediction error estimation information, the valid coefficient position information, and the valid coefficient absolute value information;
      entropy encoding the valid coefficient position information and generating a valid coefficient position code;
      entropy encoding the valid coefficient absolute value information and generating a valid coefficient absolute value code;
      entropy encoding sign prediction value matching information indicating whether or not the valid coefficient sign information prediction value matches the valid coefficient sign information, and generating a valid coefficient sign code; and
      generating the encoding block entropy encoded data from the valid coefficient position code, the valid coefficient absolute value code, and the valid coefficient sign code.

2. The moving image encoding device according to claim 1, wherein
the generating the valid coefficient sign information prediction value includes:
generating as valid coefficient sign information candidates a plurality of combinations of valid coefficient sign information in which a positive or negative code is assigned to each of the valid coefficients according to the valid coefficient position information and the valid coefficient absolute value information in the target encoding block;
calculating a matching level between each reproduced prediction error signal obtained from the valid coefficient position information, the valid coefficient absolute value information, and each valid coefficient sign information candidate in the target encoding block and the boundary pixel prediction error estimation information; and
outputting a valid coefficient sign information candidate having a highest matching level as a valid coefficient sign information prediction value.

3. The moving image encoding device according to claim 2, wherein
the calculating the matching level includes:
sorting the valid coefficients in order from a valid coefficient expected to have high accuracy of a generated valid coefficient sign information prediction value to a valid coefficient having low accuracy using the valid coefficient position information and the valid coefficient absolute value information of the target encoding block;
applying a code of each valid coefficient sign information candidate to the sorted valid coefficient, and generating a quantized coefficient provisional value for each valid coefficient sign information candidate;
generating a boundary pixel prediction error provisional value for each valid coefficient sign information candidate by inversely quantizing and inversely and orthogonally transforming the quantized coefficient provisional value and selecting only a boundary pixel; and
calculating a matching level between each boundary pixel prediction error provisional value and the boundary pixel prediction error estimation value.

4. The moving image encoding device according to claim 1, wherein
the generating the valid coefficient sign information prediction value includes:
generating a plurality of combinations of valid coefficient sign information assigned a positive or negative code to each valid coefficient provided by the valid coefficient position information and the valid coefficient absolute value information in the target encoding block as valid coefficient sign information candidates so that each of the combinations corresponds to 0 or 1 of corresponding bit position;
designating a valid coefficient having a different code between a immediately previous valid coefficient sign information candidate and a valid coefficient sign information candidate to be evaluated, obtaining an influence on a process of cost calculating a matching level from a change of a code of a valid coefficient, calculating a difference between a cost of a matching level of the immediately previous valid coefficient sign information candidate and a cost of a matching level of the valid coefficient sign information candidate to be evaluated in consideration of only a change on a process of calculating a cost of the matching level, and calculating a cost of a matching level of the valid coefficient sign information candidate to be evaluated by adding the difference to the cost of a matching level of the immediately previous valid coefficient sign information candidate; and
outputting a valid coefficient sign information candidate having a highest matching level as a valid coefficient sign information prediction value.

5. The moving image encoding device according to claim 1, wherein
the entropy encoding sign prediction value matching information performs arithmetic encoding as the entropy encoding.

6. A moving image decoding device which decodes, for each block, encoding block entropy encoded data encoded by a moving image encoding device which encodes an encoding target image for each encoding block obtained by dividing a encoding target image into a plurality of blocks, the moving image decoding device comprising:
a processor which executes a process including:
generating an encoding block prediction image of a target encoding block;
generating a boundary pixel prediction value as a prediction value of a boundary pixel adjacent to the encoded block in the target encoding block from a decoded image of a plurality of adjacent encoded blocks to the target encoding block;
generating boundary pixel prediction error estimation information from the boundary pixel prediction value and the encoding block prediction image, for the boundary pixel;
generating quantized coefficients from the encoding block entropy encoded data and boundary pixel prediction error estimation information;
inversely quantizing the quantized coefficients to generate reproduced frequency coefficients;
inversely transforming the reproduced frequency coefficients into a reproduced prediction error image; and
generating a decoded image from the reproduced prediction error image and the encoding block prediction image, wherein
the generating quantized coefficients includes:
decoding valid coefficient position information as a frequency position of a valid coefficient of the target encoding block from the encoding block entropy encoded data;
decoding valid coefficient absolute value information as an absolute value of a valid coefficient of the target encoding block from the encoding block entrophy encoded data;
generating valid coefficient sign information prediction value as a prediction value of sign information indicating whether the valid coefficient is positive or negative from the boundary pixel prediction error estimation information, the valid coefficient position information, and the valid coefficient absolute value information;
decoding valid coefficient sign information as sign information about the valid coefficient according to the valid coefficient sign information prediction value and sign prediction value matching information decoded from the encoding block entropy encoded data; and
generating a quantized coefficient of the target encoding block from the valid coefficient absolute value information, the valid coefficient position information, and the valid coefficient sign information.

7. The moving image decoding device according to claim 6, wherein
the generating valid coefficient sign information prediction value includes:
generating as valid coefficient sign information candidate a plurality of combinations of valid coefficient sign information assigned a positive of negative code to each valid coefficient provided by the valid coefficient position information and the valid coefficient absolute value information in the target encoding block;
calculating a matching level between each reproduced prediction error signal obtained from the valid coefficient position information, the valid coefficient absolute value information, and each valid coefficient sign information candidate in the target encoding block and the boundary pixel prediction error estimation information; and
outputting a valid coefficient sign information candidate having a highest matching level as a valid coefficient sign information prediction value.

8. The moving image decoding device according to claim 7, wherein
the calculating the matching level includes:
sorting the valid coefficients in order from a valid coefficient expected to have high accuracy of a generated valid coefficient sign information prediction value to a valid coefficient having low accuracy using the valid coefficient position information and the valid coefficient absolute value information of the target encoding block;
applying a code of each valid coefficient sign information candidate to the sorted valid coefficient, and generating a quantized coefficient provisional value for each valid coefficient sign information candidate;
generating a boundary pixel prediction error provisional value for each valid coefficient sign information candidate by inversely quantizing and inversely and orthogonally transforming the quantized coefficient provisional value and selecting only a boundary pixel; and
calculating a matching level between each boundary pixel prediction error provisional value and the boundary pixel prediction error estimation value.

9. The moving image decoding device according to claim 6, wherein
the generating valid coefficient sign information prediction value includes:
generating a plurality of combinations of valid coefficient sign information assigned a positive or negative code to each valid coefficient provided by the valid coefficient position information and the valid coefficient absolute value information in the target encoding block as a valid coefficient sign information candidate so that the each of the combinations corresponds to 0 or 1 of corresponding bit position;
designating a valid coefficient having a different code between a immediately previous valid coefficient sign information candidate and a valid coefficient sign information candidate to be evaluated, to obtain an influence on a process of cost calculating a matching level from a change of a code of a valid coefficient, calculating a difference between a cost of a matching level of the immediately previous valid coefficient sign information candidate and a cost of a matching level of the valid coefficient sign information candidate to be evaluated in consideration of only a change on a process of calculating a cost of the matching level, and calculating a cost of a matching level of the valid coefficient sign information candidate to be evaluated by adding the difference to the cost of a matching level of the immediately previous valid coefficient sign information candidate; and
outputting a valid coefficient sign information candidate having a highest matching level as a valid coefficient sign information prediction value.

10. An encoding device which encodes each encoding block obtained by dividing a target image into a plurality of blocks, the encoding device comprising:
a processor which executes a process including:
obtaining an estimation value of a prediction error of a boundary pixel adjacent to an encoded block in a target encoding block from an image included in a decoded block obtained by local decoding and an encoding block prediction image as a prediction value of the target encoding block;
obtaining a valid coefficient which is a non-zero quantized coefficient of quantized coefficients obtained by quantizing frequency coefficients obtained by performing frequency transformation of a prediction error image as a difference between the target encoding block and the encoding block prediction image, valid coefficient absolute value information as an absolute value of the valid coefficient, and valid coefficient position information indicating a frequency position of the valid coefficient;
obtaining a closest set from sets of sign information indicating whether the valid coefficient is positive or negative common to all valid coefficients under the conditions that the valid coefficient absolute value information and the valid coefficient position information are known such that a reproduced prediction error generated from the closest set is closest to the estimation value of the prediction error;
generating a prediction value of valid coefficient sign information as the closet set; and
entropy encoding the sign information based on the prediction value.

11. A decoding device for information encoded for each encoding block obtained by dividing a target image into a plurality of blocks, the decoding device comprising:
a processor which executes a process including:
obtaining an estimation value of a prediction error of a boundary pixel adjacent to an encoded block in a target encoding block from an image included in a decoded block and an encoding block prediction image as a prediction value of the target encoding block;
obtaining a valid coefficient which is a non-zero quantized coefficient of quantized coefficients obtained by quantizing frequency coefficients obtained by performing frequency transformation of a prediction error image as a difference between the target encoding block and the encoding block prediction image, valid coefficient absolute value information as an absolute value of the valid coefficient, and valid coefficient position information indicating a frequency position of the valid coefficient;
obtaining a closest set from sets of sign information indicating whether the valid coefficient is positive or negative common to all valid coefficients under the conditions that the valid coefficient absolute value information and the valid coefficient position information are known such that a reproduced prediction error generated from the closest set is closest to the estimation value of the prediction error;

generating a prediction value of valid coefficient sign information as the closet set; and decoding the sign information based on the prediction value.

12. An encoding method of encoding each encoding block obtained by dividing a target image into a plurality of blocks, the encoding method comprising:

obtaining an estimation value of a prediction error of a boundary pixel adjacent to an encoded block in a target encoding block from an image included in a decoded block obtained by local decoding and an encoding block prediction image as a prediction value of the target encoding block;

obtaining a valid coefficient which is a non-zero quantized coefficient of quantized coefficients obtained by quantizing frequency coefficients obtained by performing frequency transformation of a prediction error image as a difference between the target encoding block and the encoding block prediction image, valid coefficient absolute value information as an absolute value of the valid coefficient, and valid coefficient position information indicating a frequency position of the valid coefficient;

obtaining a closest set from sets of sign information indicating whether the valid coefficient is positive or negative common to all valid coefficients under the conditions that the valid coefficient absolute value information and the valid coefficient position information are known such that a reproduced prediction error generated from the closest set is closest to the estimation value of the prediction error;

generating a prediction value of valid coefficient sign information as the closet set; and entropy encoding the sign information based on the prediction value.

13. A decoding method for information encoded for each encoding block obtained by dividing a target image into a plurality of blocks, the decoding method comprising:

obtaining an estimation value of a prediction error of a boundary pixel adjacent to an encoded block in a target encoding block from an image included in a decoded block and an encoding block prediction image as a prediction value of the target encoding block;

obtaining a valid coefficient which is a non-zero quantized coefficient of quantized coefficients obtained by quantizing frequency coefficients obtained by performing frequency transformation of a prediction error image as a difference between the target encoding block and the encoding block prediction image, valid coefficient absolute value information as an absolute value of the valid coefficient, and valid coefficient position information indicating a frequency position of the valid coefficient;

obtaining a closest set from sets of sign information indicating whether the valid coefficient is positive or negative common to all valid coefficients under the conditions that the valid coefficient absolute value information and the valid coefficient position information are known such that a reproduced prediction error generated from the closest set is closest to the estimation value of the prediction error;

generating a prediction value of valid coefficient sign information as the closet set; and decoding the sign information based on the prediction value.

14. A moving image encoding method for encoding each encoding block obtained by dividing an encoding target image into a plurality of blocks, the moving image encoding method comprising:

generating an encoding block prediction image of a target encoding block;

generating a prediction error image as a difference between the target encoding block and the encoding block prediction image;

transforming the prediction error image into frequency coefficients;

quantizing the frequency coefficients to generate quantized coefficients;

inversely quantizing the quantized coefficients to generate reproduced frequency coefficients;

inversely transforming the reproduced frequency coefficients into a reproduced prediction error image;

generating a locally decoded image from the reproduced prediction error image and the encoding block prediction image;

generating a boundary pixel prediction value as a prediction value of a boundary pixel adjacent to an encoded block in the target encoding block from a locally decoded image of a plurality of encoded blocks adjacent to the target encoding block;

generating boundary pixel prediction error estimation information from the boundary pixel prediction value and the encoding block prediction image with respect to the boundary pixel; and performing quantized coefficient encoding by generating encoding block entropy encoded data from the quantized coefficients and the boundary pixel prediction error estimation information, wherein the quantized coefficient encoding includes:

extracting a non-zero coefficient as a valid coefficient from the quantized coefficients;

generating valid coefficient position information indicating a frequency position of the valid coefficient, valid coefficient absolute value information as an absolute value of the valid coefficient, and valid coefficient sign information indicating a positive/negative code of the valid coefficient;

generating a valid coefficient sign information prediction value as a prediction value of sign information indicating whether the valid coefficient is positive or negative from the boundary pixel prediction error estimation information, the valid coefficient position information, and the valid coefficient absolute value information;

generating a valid coefficient position code by entropy encoding the valid coefficient position information;

generating a valid coefficient absolute value code by entropy encoding the valid coefficient absolute value information;

generating a valid coefficient sign code by entropy encoding sign prediction value matching information about whether or not the valid coefficient sign information prediction value matches the valid coefficient sign information; and generating the encoding block entropy encoded data from the valid coefficient position code, the valid coefficient absolute value code, and the valid coefficient sign code.

15. A moving image decoding method for decoding, for each block, encoding block entropy encoded data encoded by a moving image encoding device which encodes an encoding target image for each encoding block obtained by dividing a encoding target image into a plurality of blocks, the moving image decoding method comprising:

generating an encoding block prediction image of a target encoding block;

generating a boundary pixel prediction value as a prediction value of a boundary pixel adjacent to the encoded block in the target encoding block from a decoded image of a plurality of adjacent encoded blocks to the target encoding block;

generating boundary pixel prediction error estimation information from the boundary pixel prediction value and the encoding block prediction image, for the boundary pixel;

performing quantized coefficient decoding by generating quantized coefficients from the encoding block entropy encoded data and boundary pixel prediction error estimation information;

inversely quantizing the quantized coefficients to generate reproduced frequency coefficients;

inversely transforming the reproduced frequency coefficients into a reproduced prediction error image; and generating a decoded image from the reproduced prediction error image and the encoding block prediction image, wherein the quantized coefficient decoding includes:

decoding valid coefficient position information as a frequency position of a valid coefficient of the target encoding block from the encoding block entropy encoded data;

decoding valid coefficient absolute value information as an absolute value of a valid coefficient of the target encoding block from the encoding block entropy encoded data;

generating valid coefficient sign information prediction value as a prediction value of sign information indicating whether the valid coefficient is positive or negative from the boundary pixel prediction error estimation information, the valid coefficient position information, and the valid coefficient absolute value information;

decoding valid coefficient sign information as sign information about the valid coefficient according to the valid coefficient sign information prediction value and the sign prediction value matching information decoded from the encoding block entropy encoded data; and generating a quantized coefficient of the target encoding block from the valid coefficient absolute value information, the valid coefficient position information, and the valid coefficient sign information.

\* \* \* \* \*